United States Patent
Roy et al.

(10) Patent No.: US 11,725,948 B2
(45) Date of Patent: *Aug. 15, 2023

(54) NAVIGATING AN INDOOR TRANSIT SYSTEM USING A MOBILE DEVICE

(71) Applicant: Honeywell International Inc., Charlotte, NC (US)

(72) Inventors: Sanjay Roy, Plymouth, MN (US); Murugan Gopalan, Bangalore (IN); Arun Vijayakumari Mahasenan, Hopkins, MN (US); Roshan Lawrence Valder, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/489,057

(22) Filed: Sep. 29, 2021

(65) Prior Publication Data

US 2022/0018662 A1    Jan. 20, 2022

Related U.S. Application Data

(63) Continuation of application No. 16/737,677, filed on Jan. 8, 2020, now Pat. No. 11,156,465, which is a
(Continued)

(51) Int. Cl.
*G06F 1/16* (2006.01)
*G01C 21/20* (2006.01)
(Continued)

(52) U.S. Cl.
CPC ........... *G01C 21/206* (2013.01); *G06F 16/29* (2019.01); *H04W 4/024* (2018.02)

(58) Field of Classification Search
CPC ........ G01C 21/206; G01C 21/32; G06T 7/70; H04M 1/72572; H04M 15/80;
(Continued)

(56) References Cited

U.S. PATENT DOCUMENTS 8,369,264 B2    2/2013   Brachet et al.
8,866,673 B2   10/2014   Mendelson
(Continued)

OTHER PUBLICATIONS

"Indoor Navigation and Indoor Positioning, Asset Tracking, Indoor Analytics and Maps," Steerpath, 9 pages, date accessed Aug. 14, 2019.
(Continued)

*Primary Examiner* — Phuoc H Doan
(74) *Attorney, Agent, or Firm* — Seager, Tufte & Wickhem, LLP

(57) ABSTRACT

Devices, methods, and systems for navigating an indoor area such as an indoor transit system using a mobile device are described herein. The method may include navigating a network of indoor pathways and a plurality of access points for entering/exiting the indoor pathways. The indoor pathways may be mapped and may include a plurality of beacons distributed at designated locations throughout the indoor pathways. The beacons may be detected using a mobile computing device and an indoor location of the mobile computing device may be determined and depicted on the map of the indoor pathways. The location of the mobile computing device may be used to determine a route from the location of the mobile computing device to a destination in or adjacent the mapped indoor pathways.

20 Claims, 42 Drawing Sheets

Related U.S. Application Data continuation of application No. 16/258,458, filed on Jan. 25, 2019, now Pat. No. 10,539,424.

(60) Provisional application No. 62/622,412, filed on Jan. 26, 2018.

(51) Int. Cl.
*G06F 16/29* (2019.01)
*H04W 4/024* (2018.01)

(58) Field of Classification Search
CPC ....... H04W 4/023; H04W 4/008; H04W 4/04; G06Q 10/06315; H04L 41/5054; G16H 40/20
See application file for complete search history.

(56) References Cited

U.S. PATENT DOCUMENTS

| | | | |
|---|---|---|---|
| 8,896,485 | B2 | 11/2014 | Mendelson |
| 9,046,373 | B2 | 6/2015 | Bandyopadhyay et al. |
| 9,204,251 | B1 | 12/2015 | Mendelson |
| 9,204,257 | B1 | 12/2015 | Mendelson |
| 9,538,332 | B1 | 1/2017 | Mendelson |
| 9,696,165 | B2 | 7/2017 | Shin et al. |
| 9,961,507 | B1 | 5/2018 | Mendelson |
| 9,970,776 | B2 | 5/2018 | Sankaradas et al. |
| 10,520,328 | B2 | 12/2019 | Grel et al. |
| 10,753,762 | B2 | 8/2020 | Shelby et al. |
| 2007/0001904 | A1 | 1/2007 | Mendelson |
| 2012/0004841 | A1 | 1/2012 | Schunder |
| 2013/0144525 | A1 | 6/2013 | Yang |
| 2014/0113665 | A1* | 4/2014 | Li .................. G06T 11/40 455/457 |
| 2014/0114568 | A1 | 4/2014 | Park |
| 2014/0309924 | A1 | 10/2014 | Varoglu et al. |
| 2015/0052460 | A1 | 2/2015 | Mohammad Mirzaei et al. |
| 2016/0210578 | A1 | 7/2016 | Raleigh et al. |
| 2016/0247098 | A1 | 8/2016 | Bongiorno |
| 2017/0099571 | A1 | 4/2017 | Aggarwal et al. |
| 2018/0181091 | A1 | 6/2018 | Funk et al. |

OTHER PUBLICATIONS

"Indoor Positioning Systems Based on BLE Beacons-Basics," Locatify, 9 pages, date accessed Aug. 14, 2019.
"Why the world's best airport selected Steerpath?" Steerpath, 5 pages, date accessed Aug. 14, 2019.
"Target Field, Twins Way, Minneapolis, MN to U.S. Bank Stadium," Google Maps Search, 2 pages, date accessed Aug. 14, 2019.
"Indoor GPS and Indoor Mapping Platform for Large Venues," SPREO, 9 pages, date accessed Aug. 14, 2019.
Cox, "Indoor-positioning Underground: Improving the Customer Experience in a Complex Environment," CapTech, 8 pages, May 23, 2016.
"Microsoft Research," Microsoft, 12 pages, date accessed Aug. 14, 2019.
"The Insider Way to Navigate Downtown Minneapolis," Honeywell, 8 pages, 2019.
"Hardware for Indoor Positioning Projects, Tracking and Navigation," 2 pages, 2016, https://webarchive.org/web/2016072921143/https://www.infsoft.com, downloaded Jun. 9, 2021.
"Indoor Location Analytics", Infsoft, 4 pages, 2016, https://web.archive.org/web/20160630053311/http://www.infsoft.com/Products/Indoor-Location-Analytics, downloaded Jun. 9, 2021.
"Indoor Navigation" by Infsoft, 5 pages, 2016, https://web.archive.org/web/20160710084540/http://www.infsoft.com/Products/Indoor-Navigation, downloaded Jun. 9, 2021.
"Indoor Navigation, Indoor Positioning and Indoor Tracking" by Infsoft, 5 pages, 2017. https://webarchive.org/web/20170602201808/https://www.infsoft.com, downloaded Jun. 9, 2021.
"Indoor Navigation—Solutions by Infsoft", 3 pages, 2021, https://www.infsoft.com/solutions/application-fields/indoor-navigation, downloaded Jun. 4, 2021.
"Indoor Navigation Solutions" by Infsoft, 4 pages, 2016, https://web.archive.org/web/20161031112123/https://www.Infsoft.com/solutions/indoor-navigation, downloaded Jun. 9, 2021.
"Indoor Positioning Analytics", Inpixon, 2017, 6 pages, https://web.archive.org/web/20180130171031/https://inpixon.com/solutions/ipa/, downloaded Jun. 9, 2021.
"Indoor Tracking," Infsoft, 4 pages, 2016, https://web.archive.org/web/20160628053024/http://www.infsoft.com/Products/Indoor-Tracking, downloaded Jun. 9, 2021.
"Indoor Positioning and Navigation," Infsoft GmbH, 32 pages, updated Aug. 24, 2016.
"Infsoft Wayfinding" 4 pages, 2021, https://www.infsoft.com/solutions/products/infsoft-wayfinding, downloaded Jun. 4, 2021.
"Location Based Services", Infsoft GmbH, 4 pages, 2016, https://web.archive.org/web/20160628202412/http://www.infsoft.com/Products/Location-Based-Services, downloaded Jun. 9, 2021.
"Dynamic Outdoor-Indoor Navigation", Inpixion, 8 pages, 2021. https://www.inpixon.com/use-cases/outdoor-indoor-navigation, downloaded Jun. 7, 2021.
"Last meter accuracy through technology fusion" Positioning Technology—Indoor Atlas, 7 pages, 2021, https://www.indooratlas.com/positioning-technology/, downloaded Jun. 4, 2021.
"SDK 2.3 Now Generally Available", Indoor Atlas, 6 pages, Feb. 2, 2017, https://www.indooratlas.com/2017/02/02/sdk-2-3-now-generally-available/, downloaded Jun. 4, 2021.

* cited by examiner ately ineffective. GPS signals and cellular data signals can become weak and unreliable in indoor environments. Also, outdoor maps typically do not cover or include sufficient detail of many indoor spaces such indoor transit systems to provide adequate navigation support to the user once in the indoor transit system. What would be desirable is an improved tool to help users navigate indoor spaces such as indoor transit systems.

NAVIGATING AN INDOOR TRANSIT SYSTEM USING A MOBILE DEVICE

This is a continuation application of co-pending U.S. patent application Ser. No. 16/737,677, filed Jan. 8, 2020, which is a continuation application of co-pending U.S. patent application Ser. No. 16/258,458, filed Jan. 25, 2019, now U.S. Pat. No. 10,539,424, which claims the benefit of U.S. Provisional Application No. 62/622,412, filed Jan. 26, 2018, both of which are hereby incorporated by reference.

TECHNICAL FIELD

The present disclosure relates generally to devices, methods, and systems for navigating an indoor transit system such as a skyway system or subway system using a mobile device.

BACKGROUND

Many types of navigation systems and applications exist for navigating outdoor areas, such as highways, streets, bicycle paths, trails, etc. For instance, there are many types of mobile apps available for mobile devices that can be used by the user of the mobile device to navigate outdoor areas. Such apps may utilize publicly created and/or existing maps (e.g., street maps, road maps, etc.) in combination with location services of the mobile device that typically leverage the Global Positioning System (GPS), cellular triangularization, and/or WiFi connection to a WiFi hotspot at a known location to identify the current location of the mobile device. However, in some indoor environments, one or more of these location services may not be available or may be otherwise ineffective. GPS signals and cellular data signals can become weak and unreliable in indoor environments. Also, outdoor maps typically do not cover or include sufficient detail of many indoor spaces such indoor transit systems to provide adequate navigation support to the user once in the indoor transit system. What would be desirable is an improved tool to help users navigate indoor spaces such as indoor transit systems.

SUMMARY

The present disclosure generally relates to navigating an indoor area using a computing device. In one example configuration, a method of navigating an indoor transit system may be provided. The indoor transit system may include a network of indoor pathways, a plurality of access points for entering/exiting the indoor transit system, and a plurality of beacons distributed at designated locations throughout the indoor transit system. The method may include detecting one or more of the beacons of the indoor transit system using a mobile computing device (e.g. via Bluetooth) and determining when the mobile computing device is inside the indoor transit system based on the detected one or more of the beacons. The method may further include identifying the location of the mobile computing device within the indoor transit system based on which of the plurality of beacons are detected by the mobile computing device and displaying an indoor map of at least part of the indoor transit system on a user interface of the user's mobile computing device, including the identified location of the mobile computing device. Further, the method may include receiving a destination accessible by the indoor transit system via the user interface of the mobile computing device, computing a route through the indoor transit system to the destination, and displaying on the user interface of the mobile computing device the computed route on the indoor map. In some cases, the indoor transit system comprises one or more of a skyway system and a subway system.

In another example configuration, a method of navigating an indoor transit system that is situated in a geographic region, where an outdoor map is defined for the geographic region and the outdoor map identifies the geographic location of at least some of the plurality of access points of the indoor transit system. The method may include detecting one or more of the beacons of the indoor transit system using a mobile computing device and determining when the mobile computing device is inside the indoor transit system or outside of the indoor transit system based on the detected one or more of the beacons. When it is determined that the mobile computing device is inside of the indoor transit system, the method may include identifying the location of the mobile computing device within the indoor transit system based on which of the plurality of beacons are detected by the mobile computing device and displaying an indoor map of at least part of the indoor transit system on a user interface of the user's mobile computing device, including the identified location of the mobile computing device. When it is determined that the mobile computing device is outside of the indoor transit system, the method may include identifying the location of the mobile computing device in the geographic region based on location services of the mobile computing device and displaying the outdoor map of at least part of the geographic region on the user interface of the mobile computing device, including the identified location of the user's mobile computing device. The method may further include receiving a destination accessible using at least part of the indoor transit system via the user interface of the mobile computing device, computing a route to the destination that includes at least part of the indoor transit system, and displaying on the user interface of the mobile computing device the computed route.

In a further example configuration, program code for use by a mobile computing device connectable to a network may be provided, where the program code may cause the mobile computing device to execute a method of navigating an indoor transit system such as a skyway system and/or a subway system. The method may include detecting one or more of a plurality of beacons of the indoor transit system by the mobile computing device and determine when the mobile computing device is inside the indoor transit system based on the detected one or more of the beacons. The method may further include identifying the location of the mobile computing device within the indoor transit system based on which of the plurality of beacons are detected by the mobile computing device and displaying an indoor map of at least part of the indoor transit system on a user interface of the mobile computing device, including the identified location of the user's mobile computing device. Further, the method may include receiving a destination accessible by the indoor transit system via the user interface of the mobile computing device, computing a route through the indoor transit system to the destination, and displaying on the user interface of the mobile computing device the computed route on the indoor map.

DETAILED DESCRIPTION

Figure 1:
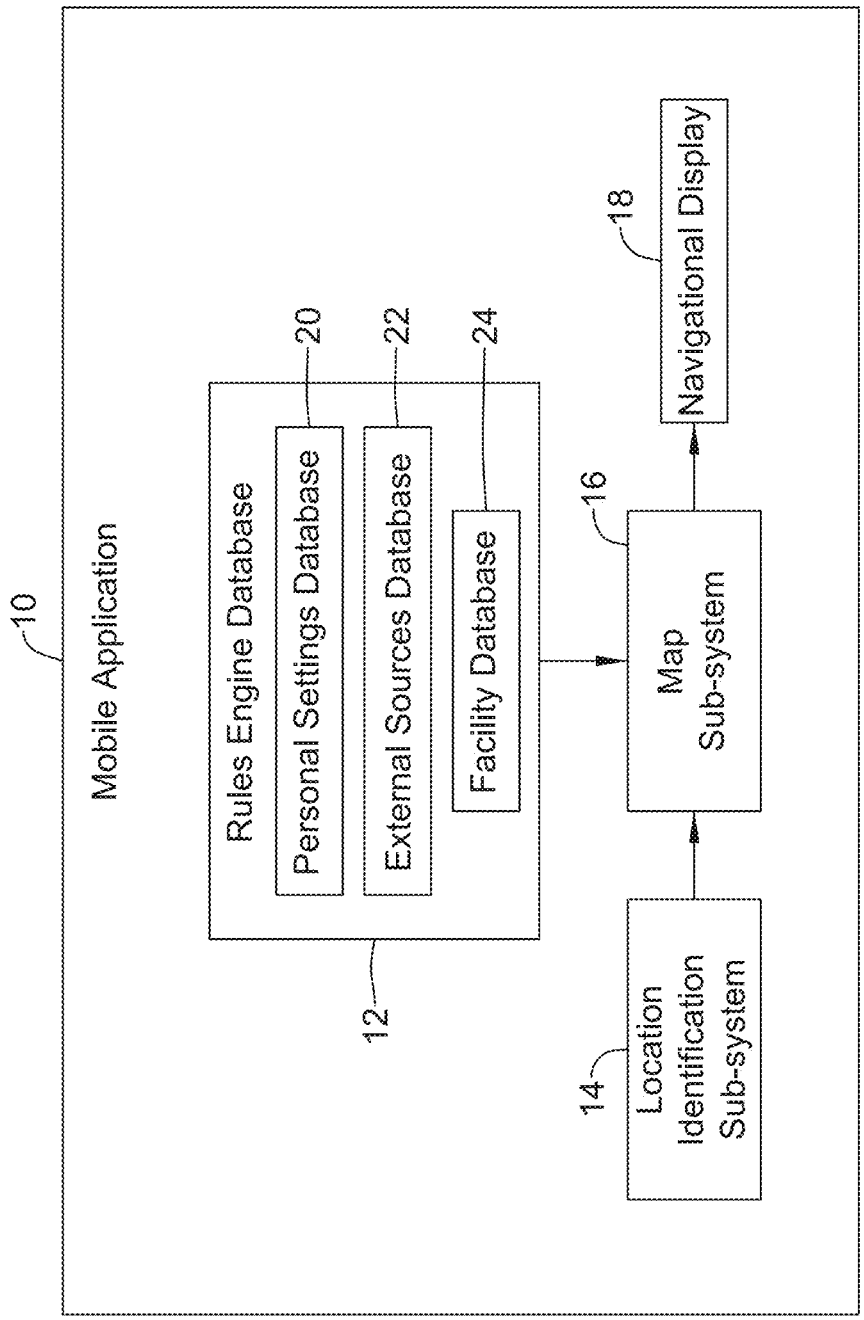
FIG. 1 is schematic diagram of an illustrative system for navigating an indoor area using a mobile device in accordance with an embodiment of the present disclosure.

The present system and approach may incorporate one or more processors, computers, controllers, user interfaces, wireless and/or wire connections, and/or the like, in an implementation described and/or shown.

Devices, methods, and systems for navigating an indoor area of a structure using a computing device (e.g., a mobile device) are described herein. As an example, embodiments of the present disclosure may include an application program code (e.g., a mobile app or mobile application) for navigating an indoor area of (e.g., an interior of) one or more structures. In some cases, two or more structures may include and/or may be connected by an indoor transit system, such as a skyway system, a tunnel system, a subway system, and/or other suitable connecting systems and/or combinations thereof. As used herein, a transit system may include a network of indoor pathways and a plurality of access points for entering and/or exiting the indoor pathways. As used herein, a skyway system (e.g., a transit system that may be or may include a skyway) may refer to and/or include an above-ground, interlinked connection of enclosed pedestrian footbridges that connect various buildings, such as office buildings, bars and restaurants, hotels, retail and shopping facilities, sports facilities, convention centers, concert facilities, parking ramps and garages, etc., thereby allowing for indoor travel therebetween. Restaurants, shops, and other retail spaces may also be located within the skyway itself.

Existing navigational apps for mobile devices that are useful for navigating outdoor areas (e.g., highways, streets, bicycle paths, trails, etc.) may not be as useful or effective in navigating indoor areas or interiors of one or more structures (e.g., such as indoor transit systems, including skyway systems, tunnel systems, subway systems, etc.). For example, a single, publicly created, or existing map of the indoor area or interiors of one or more structures may not be available, and the Global Positioning System (GPS), cellular coverage, and/or WiFi coverage (e.g., signals from antennas) utilized by the mobile device for the outdoor navigation may be weak, inconsistent, or unavailable in the indoor areas and/or interior of one or more structures.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things, while "a plurality of" something can refer to more than one of such things. For example, "a number of mobile devices" can refer to one or more mobile devices, while "a plurality of mobile devices" can refer to more than one mobile device.

FIG. 1 illustrates a conceptual block diagram of a mobile application 10 for navigating an indoor transit system. In one example, the mobile application 10 may include a rules engine database 12, a location identification sub-system 14, a map sub-system 16, a navigational display, 18, and/or one or more other suitable databases or sub-systems. In some cases, the rules engine database 12 may include one or more databases including information and/or rules for filtering and/or providing map data to be displayed through the navigational display 18. Example databases include, but are not limited to, a personal settings database 20, an external sources database 22, a facility database 24, and/or one or more other suitable databases to facilitate outputting the navigational display 18. Although the mobile application 10 is depicted in FIG. 1 as comprising a variety of components, one or more components may be added to the mobile application 10 and/or one more of the depicted components of mobile application 10 may be separate from the mobile application 10 (e.g. on a remote server) and interact with other components of the mobile application 10 through an application programming interface (API) or the like.

As used herein, a mobile app, a mobile application, and an application program code may include and/or refer to computer readable and/or executable instructions (e.g., a computer program) designed to run on a mobile computing device (e.g., on a mobile device such as a smart phone and/or other suitable mobile computing device). In one example, the mobile application 10 illustrated in FIG. 1 may be run on a smart phone.

Although the indoor area or interior of one or more structures may be described herein primarily with respect to a skyway system, it should be recognized that embodiments of the present disclosure are not so limited. For instance, in some examples, the indoor area or interior of one or more structures may be one or more of indoor transit systems such as a tunnel system, a subway system, a railway tunnel system, a city sewer system transited by maintenance workers, a mine system transited by miners, among other types of indoor areas or interiors of one or more structures.

The mobile application 10 may receive indoor location inputs via the location identification sub-system 14. The received indoor location inputs may be used by the mobile application 10 to determine a current location of a computing device on which the mobile application 10 may be loaded (e.g., the current location of the user of the computing device) within the indoor area. The map sub-system 16 may then use the indoor location inputs to select a map for display (skyway map, subway map, etc.) along with the location of the computing device on the selected map in the navigational display 18.

In some cases, the indoor location inputs as determined by the location and identification sub-system 14 may include communications (e.g., signals) from one or more (e.g., a network of) beacons, where one or more beacons may be located (e.g., installed and/or distributed) at different respective locations (e.g., designated locations) throughout the indoor area or interior of the indoor transit system and/or one or more other structures. Each of the beacons may have a known, designated location within the indoor area or the interior of the one or more structures and the location of the beacon may be identified using the location identification sub-system 14 when the computing device connects to or senses the beacon. Once a location of the computing device is known, the map sub-system 16 may identify a map to display on the navigational display 18.

In some cases, and to help identify locations of beacons to users, stickers and/or other notifications may be placed in the indoor areas to provide an indication to the user of the computing device that he or she is located within the beacon network, and therefore can utilize the mobile application. In some cases, the mobile application 10 may automatically provide a notification that the computing device is within the beacon network when the computing device senses and/or connects to one or more beacons.

The beacons may be devices capable of direct wireless communication with the computing device, and may facilitate the determination of the location of the computing device within the indoor area. For example, respective beacons of two or more beacons in a network may each have a different predetermined location in the indoor area, and can communicate with the computing device when the computing device is within a particular proximity (e.g., range) of the beacon such that the computing device can determine its location based on the communication (e.g., signal strength) it is receiving from the beacon(s) and a location of beacon(s) from which it is currently receiving signals. In one example, the location and identification sub-system 14 of the mobile application 10 may be configured to determine a location of the beacon based on the predetermined locations for each beacon of the beacon network and a location of the computing device based on a signal strength between the beacon(s) and the computing device. The beacons can be, for example, Bluetooth beacons that can communicate with the computing device via Bluetooth Low Energy (BLE) technology (e.g., as an iBeacon). Further, the communications from the beacons may include (e.g. be) randomized signals that are only decodable (e.g., recognizable) by the mobile application 10 (e.g., the location identification sub-system 14), to prevent unauthorized use (e.g., hacking) of the beacon network.

Because the computing device (e.g., the user of the computing device) is indoors as determined, for example, by detecting one or more beacons of the beacon network, the mobile application 10 may determine the location of the computing device within the indoor area more quickly and/or more accurately using the communications from the beacons than using GPS, cellular, and/or WiFi signals. GPS, cellular, and/or WiFi signals may be weak or nonexistent in the indoor area or interior of the one or more structures.

The mobile application 10 may include and/or receive attributes or information (e.g., data) relating to one or more indoor areas or interiors of the structures (e.g., indoor area attributes) and such attributes or information may be received at and/or saved in the facility database 24 or other suitable database. The indoor area attributes or information may be publicly available or uploaded or otherwise provided by facility managers of the one or more structures and/or indoor transit systems connecting the one or more structures. The indoor area attributes may include, for example, maps of the indoor area or interior of the one or more structures, physical attributes of the indoor area or interior of the one or more structures, events associated with the indoor area or interior of the one or more structures, and/or landmarks, features, restaurants, wheelchair accessibility, restrooms, hours of operation, and points of interest in the indoor area or interior of the one or more structures.

In an example in which the indoor area or interior of the one or more structures includes a skyway system, the received and/or stored attributes or information may include locations of entries and exits into and out of the skyway system from the outside, hours during which the entries and exits are opened and closed, locations of doors within the skyway system, hours during which the doors are opened and closed, handicap (e.g., wheelchair) accessible locations within the skyway system, locations of particular buildings or types of buildings (e.g., parking lots, ramps, and garages, sports facilities, concert facilities, convention centers, hotels, restaurants, etc.) within and/or near the skyway system, locations of restrooms and/or elevators within the skyway, locations of concert facilities within or near the skyway system, and/or locations of museums within and/or near the skyway system, among other attributes or information relating to use of the skyway system.

The mobile application 10 may include and/or receive attributes or information (e.g., data) associated with the indoor area or interior of the one or more structures from external data sources and such attributes or information may be received at and/or saved in the external sources database 22 or other suitable database. The attributes or information associated with the indoor area or interior of the one or more structures may include, for example, weather reports for exterior the one or more structures, traffic reports interior of and/or exterior of the one or more structures, news reports, date and time of day, usage reports (e.g., information regarding the availability of public and/or private transportation, the occurrence of crowd drawing events occurring within or near the area, etc.), and/or safety incidents occurring within or near the area, among other types of external information. The external data sources may include third party mobile applications (e.g., applications other than mobile application 10, which may be provided by the provider of the mobile application 10 or other suitable provider) that interface with the mobile application 10 via an API and/or other suitable technique.

The mobile application 10 may receive personal settings from the user of the computing device and selected personal settings from the user may be received at and/or stored in the personal settings database 20 or other suitable database whether permanently saved or saved for a single use. In one example, a personal setting may be input by the user via a user interface of the computing device, as will be further described herein. The personal settings may include, for example, an intended destination of the user, personal preferences of the user, the personal calendar of the user, special route requirements (e.g., wheelchair accessible, etc.), and/or identifications for the computing devices of friends, family, and/or other acquaintances of the user, among other personal settings.

As shown in FIG. 1, the map sub-system 16 may output a navigational display 18 of the indoor area or interior of one or more structures based on the received inputs (e.g., the indoor location inputs, the indoor area attributes, the information from external data sources, the personal settings, and/or other suitable inputs). The navigational display 18 may include, for instance, a plurality of mapped route options, a mapped route (e.g., including turn-by-turn directions) through the indoor area to a destination, as well as additional relevant information about the indoor area along the route overlaid on the display (e.g., where the additional relevant information may be provided via visual indicators), as determined using the received inputs which will be further described via the examples herein. In one example, a sequence (e.g., a flow) of the route mapping and navigation to a selected destination may be included within the navigational display 18. The navigational display 18 may be provided (e.g., displayed) to a user of the computing device on a display of or associated with the computing device, as will be further described herein (e.g., in connection with FIG. 2).

The navigational display 18 may be used to display various features and/or functionalities of the mobile application 10, some of which are depicted in FIGS. 4-25 within a context of a skyway system. Examples of the functionalities of the mobile application 10 that may be depicted via the navigational display 18 may include, but are not limited to: dynamic (e.g., updated) routing based on the hours which the entries, exits, and/or doors of the skyway system are open and closed, usage reports, safety incidents, traffic reports, weather reports, news reports, and/or other suitable attributes or information received from external sources and/or from facility managers of the one or more structures over time; a save-and-share feature that may be used to locate friends, family, and/or other acquaintances of the user of the mobile device; routing based on wheelchair accessibility and/or the location of elevators and/or restrooms (e.g., by detecting and providing a route to the nearest elevator or restroom); an emergency request feature, which a user may use to raise an emergency request with the user's current location; a route to the user's car currently parked in a parking facility; features to change (e.g., hand off) to an outdoor map or third-party mapping application if the user moves outside of the indoor area or interior of the one or more structures, and can be changed back to the navigational display 18 if the user returns to the indoor area or interior of the one or more structures; features to track family, friends, or other acquaintances; features to set up tours; an indication (e.g., alert or warning) to the user if it is detected that the user is going the wrong way (e.g., based on the distance between the user and the destination increasing rather than decreasing); and/or the displaying one or more other functions and/or features of the mobile application 10.

Figure 2:
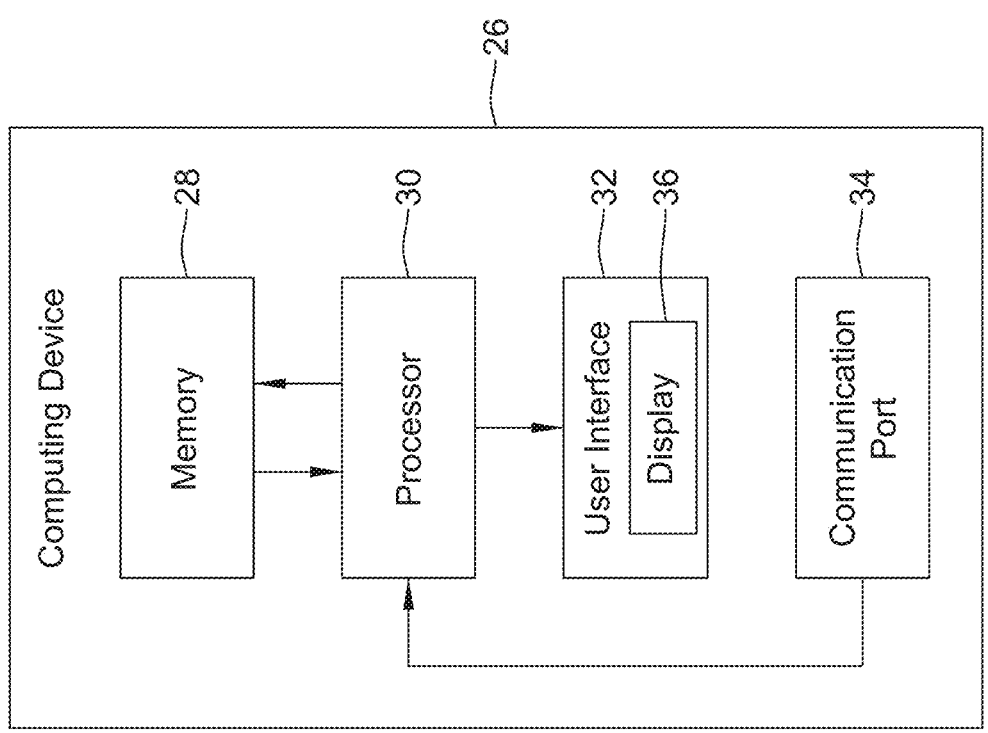
FIG. 2 is a schematic diagram of an illustrative mobile computing device usable for navigating an indoor area or interior of one or more structures in accordance with an embodiment of the present disclosure.

FIG. 2 illustrates an example of a computing device 26 for use in navigating an indoor area or interior of one or more structures in accordance with an embodiment of the present disclosure. The computing device 26 may be, for instance, a smart phone, tablet, a personal digital assistant (PDA), a personal computer, and/or other suitable computing device. However, configurations of the present disclosure are not limited to a particular type of computing device 26.

As shown in FIG. 2, the computing device 26 may include memory 28 and a processor 30 that may communicate with one another such that the processor 30 may execute instructions (e.g., application program code of the mobile application 10, among other instructions) stored on the memory 28. The computing device 26 may further include a user interface 32, a communications port 34, and/or one or more other suitable components.

The memory 28 may be any type of storage medium that can be accessed by the processor 30 to perform various examples of the present disclosure. For example, the memory 28 may be a non-transitory computer readable medium having computer readable instructions (e.g., computer or application program instructions) stored thereon, such as, for instance, the mobile application 10 previously described in connection with FIG. 1, that are executable by the processor 30 for navigating (e.g., providing a navigational display for) an indoor area or interior of one or more structures in accordance with the present disclosure. That is, the processor 30 can execute the executable instructions stored in the memory 28 to provide a navigational display for an indoor area or interior of the one or more structures in accordance with the present disclosure.

The memory 28 may be can be volatile or nonvolatile memory. The memory 28 may also be removable (e.g., portable) memory, or non-removable (e.g., internal) memory. For example, the memory 28 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the memory 28 is illustrated as being located in the computing device 26, embodiments of the present disclosure are not so limited. For example, the memory 28 can also be located internal to another computing resource (e.g., enabling computer readable instructions to be downloaded over the Internet or another wired or wireless connection).

As shown in FIG. 2, the computing device 26 may include the user interface 32. A user of the computing device 26 may interact with the computing device 26 via the user interface 32. For example, the user interface 32 may provide information to and receive information from the user of the computing device 26. For instance, navigational displays 18 for an indoor area or interior of one or more structures in accordance with the present disclosure may be displayed to the user of the computing device 26 via the user interface 32.

In some cases, the user interface 32 may include a graphical user interface (GUI) that may have a display 36 (e.g., a screen) that may provide and/or receive information to and/or from the user of the computing device 26. The display 36 may be, for instance, a touch-screen (e.g., the GUI can include touch-screen capabilities). As an additional example, the user interface 32 may include a keyboard or keyboard functionality, a pointer (e.g., a mouse, touch pad, or touch ball) or pointer functionality, a microphone, a speaker, a light system, a haptic system, a camera, a video camera, and/or other suitable user interface 32 features the user may use to input information into and/or receive information from the computing device 26. Configurations of the present disclosure, however, are not limited to a particular type(s) of user interface 32.

The communications port 34 may be any type of communication port(s) and may facilitate wired and/or wireless communication with one or more networks. In one example, the communications port 34 may facilitate communication with one or more networks and/or other devices (e.g., beacons, other computing devices, mobile devices, servers, and/or other suitable devices) through any suitable connection including, but not limited to, radio communication, Ethernet, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wired or wireless protocol. In one example, the communications port 34 may at least include a port configured to communicate over a Bluetooth connection with a beacon.

Figure 3:
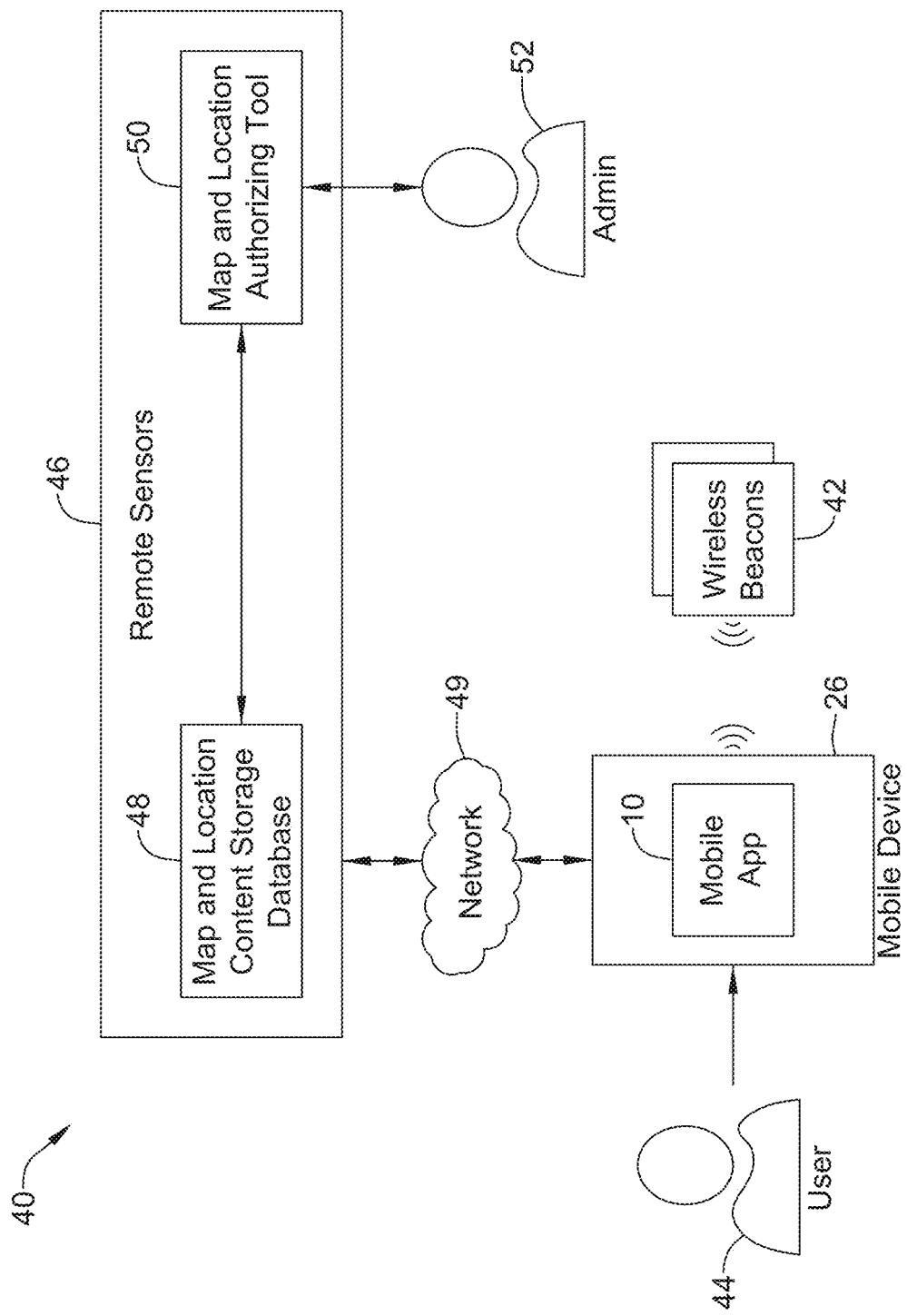
FIG. 3 is a schematic diagram of an illustrative system for navigating an indoor area using a mobile device in accordance with an embodiment of the present disclosure.

FIG. 3 illustrates a block diagram of a system 40 for navigating an indoor area or interior of one or more structures using the computing device 26 in accordance with a configuration of the present disclosure. As shown in FIG. 3, the system 40 may include a plurality (e.g., network) of beacons 42 (e.g., beacons capable of outputting signals to communicate with computing devices 26, such as Bluetooth beacons) and the computing device 26 having the mobile application 10. The plurality of beacons 42 may be distributed at designated locations through an indoor transit system and/or at other locations to facilitate locating a computing device 26 in an indoor area and/or navigating through the indoor transit system. The computing device 26 may receive personal settings from a user 44 and the computing device 26 may receive indoor location inputs from the beacons 42 via the communications port 34 (e.g., the Bluetooth communication port or other suitable communication port). In one example, the computing device 26 may communicate with the beacons 42 over a Bluetooth communications protocol.

Further, as shown in FIG. 3, the system 40 may include one or more remote servers 46 (e.g., content delivery edge servers and/or other suitable servers), which may be located remotely from computing device 26 and/or the beacons 42. The computing device 26 may receive (e.g., download) indoor area attributes from third parties through a user of the servers 46 via a network 48.

The network 48 may include one or more networks and may include one or more types of networks. The network 48 may be a wired and/or wireless network. For example, the network 48 may be a network relationship through which the computing devices and servers can communicate. Examples of such a network relationships may include one or more of a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For example, the network 48 may include a number of servers 46 that receive the indoor area attributes, personal settings, and/or external source attributes, and transmit such attributes to the computing device 26 via a wired or wireless network.

As used herein, a "network" may provide a communication system that directly or indirectly links two or more computers and/or peripheral devices and allows users to access resources on other computing devices and exchange messages with other users. A network may allow users to share resources on their own systems with other network users and to access information on centrally located systems or on systems that are located at remote locations. For example, a network may tie a number of computing devices together to form a distributed control network (e.g., cloud).

The network 48 may provide connections to the Internet and/or to the networks of other entities (e.g., organizations, institutions, etc.). Users may interact with network-enabled software applications to make a network request, such as to get a file or print on a network printer. Applications on a computing device may also communicate with network management software, which can interact with network hardware to transmit information between devices on the network.

In some embodiments, the servers 46 from which the computing device 26 may receive the indoor area attributes, personal settings, external source attributes, and/or other suitable attributes or information may not all be in the same physical location (e.g., different servers may be located at different locations). In such embodiments, the computing device 26 may determine which of the servers 46 is located closest to it, and download attributes from that server 46. For instance, the computing device 26 may automatically default to (e.g., try to download the attributes from) the closest server 46, then move on to the next closest server 46 if the closest server is unavailable. This may increase the speed at which the computing device 26 receives the attributes or information.

As shown in FIG. 3, the system 40 may include a database 49 (e.g., map and location content storage database and/or other suitable databases) that may store the attributes or information. The servers 46 may retrieve (e.g., search for and locate) the attributes or information to send to the computing device 26 from the database 49. As shown in FIG. 3, the system 40 may include an authoring tool 50 (e.g., a map and location authoring tool or other suitable authoring tool), which may be used (e.g., by an administrator 52 of the system 40) to create attributes or information (e.g., the maps and location content) to be stored in the database(s) 48. The communications (e.g., communication protocol) between the computing device 26, beacons 42, servers 46, database(s) 48, authoring tool 50, and/or other computing component of the system 40 can be secure communications such as, for instance, HTTPS communications.

FIGS. 4-25 illustrate flow diagrams of how an example of the mobile application 10 operates in one or more illustrative configurations and example screen shots of an illustrative navigational display 18 depicting features of the mobile application 10 in accordance with configurations of the present disclosure. In one example, the navigational display 18 may be output by the mobile application 10 and displayed to the user (e.g., the user 44 or other suitable user) on the display 36 of the computing device 26. The navigational display 18 illustrated in FIG. 4 depicts a map of a skyway system 60 and the buildings connected by the skyway system 60 (e.g., an overall, high-level view of an indoor area or interior of one or more structures), including a convention center 62 and sports facilities 64.

Figure 4:
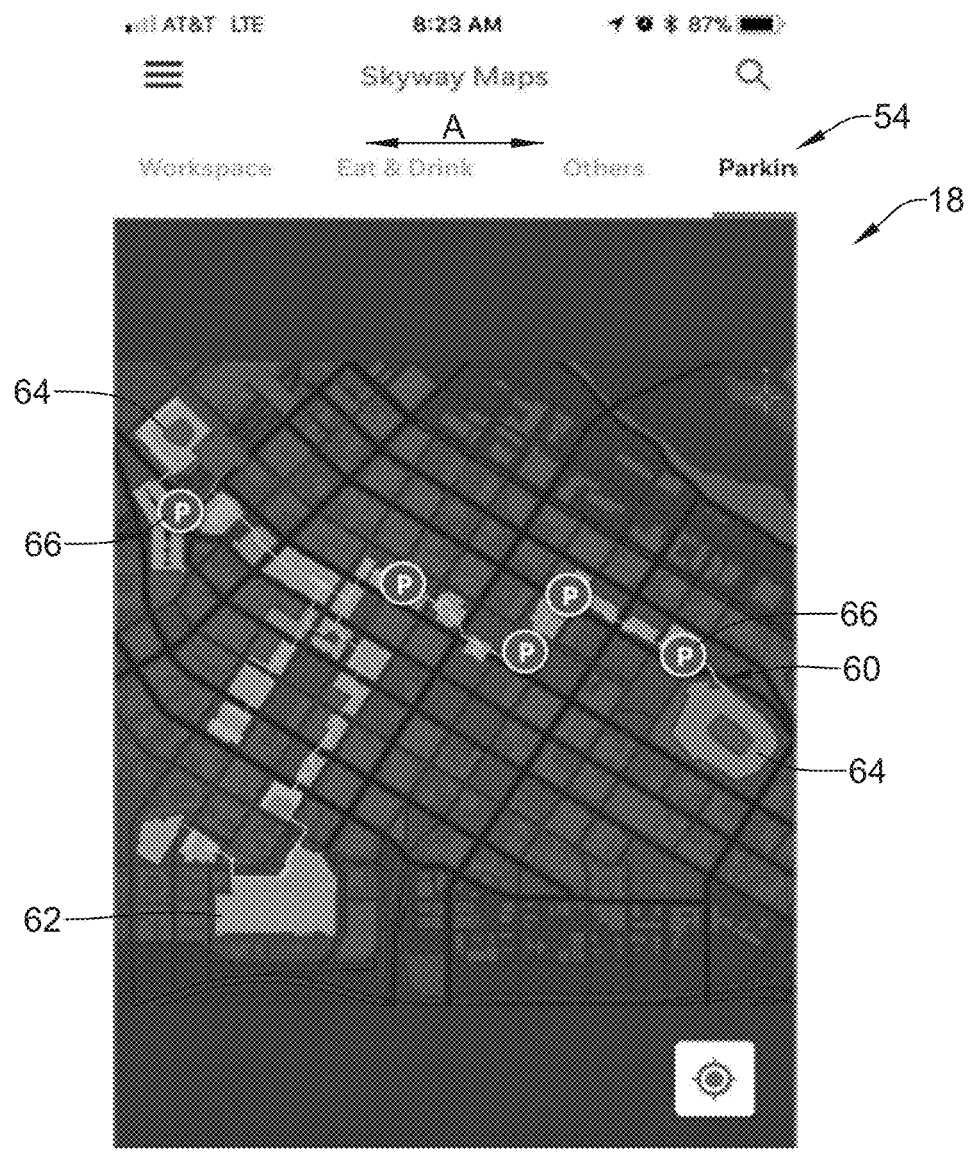
FIG. 4 is a schematic diagram of an illustrative display of a mobile application for a mobile computing device.

The skyway system 60 depicted in FIG. 4 is located in a geographic region (e.g. Minneapolis, Minn.) and the map (e.g. an outdoor and/or indoor map) depicted in the navigational display 18 may be defined for the geographical region. The map of the geographical region including the skyway system 60 and depicting at least some outside areas around the skyway system 60 may include at least some entry/exit points or access points for the skyway system 60 and/or other indoor transit systems in the geographic region. In some cases, as a map is zoomed in to show a smaller geographic region, additional details of the smaller geographic region may be depicted in the map on the navigational display 18.

As shown in FIG. 4, the navigational display 18 may include a scrollable list 54 (e.g., scrollable in the direction of arrows A) of different types of locations and/or destinations in or connected to the skyway system 60, such as workspace, eat & drink (e.g., restaurants and bars), parking, sport venues, shops, exhibits, events and others. In the example illustrated in FIG. 4, the user has selected the parking tab from this scrollable list 54. Accordingly, the navigational display 18 displays parking visual indicators 66 (e.g., the letter 'P' with a circle around it) overlaid on the map in the navigational display 18 indicating the locations of parking facilities part of and/or connected to the skyway system 60. Additional or alternative visual indicators may be overlaid on the map in the navigational display 18 when other locations and/or destinations are selected from the scrollable list.

Figure 5:
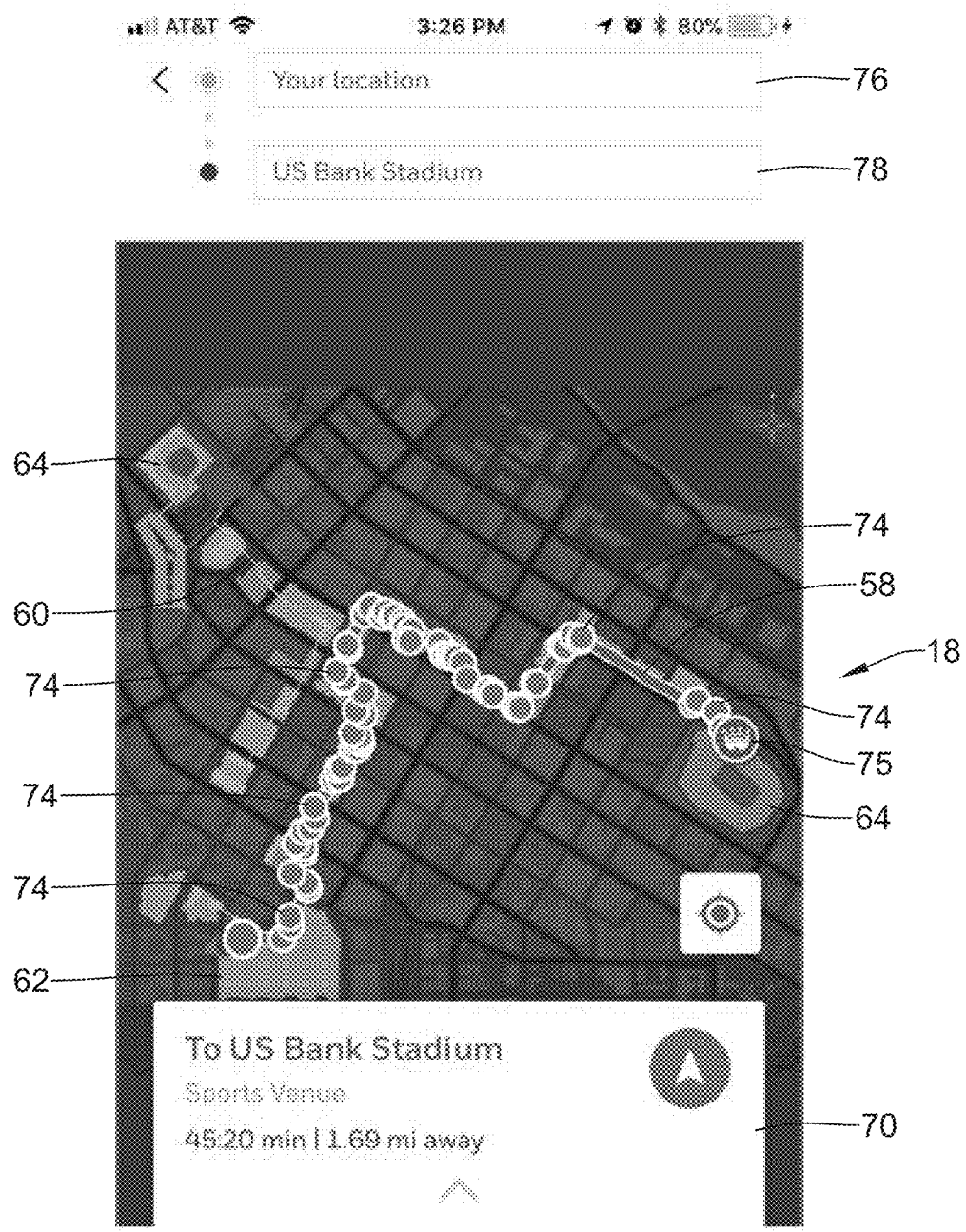
FIG. 5 is a schematic diagram of an illustrative display of a mobile application for a mobile computing device.

FIG. 5 shows a map of the skyway system 60 (e.g., indoor transit system), as well as a route 58 through the skyway system 60 from a first location (e.g., a current location of a computing device 26 or other suitable location) near the convention center 62 to a second location (e.g., a destination, such as US Bank Stadium 64 in the example of FIG. 5). In the example illustrated in FIG. 5, a current location of the computing device 26 is indicated with a current location visual indicator (e.g., a dot) and the destination of the user is shown and labelled in the navigational display 18 as a destination indicator 75 (e.g., a circular dot that includes a symbol of the destination, such as a stadium symbol or other suitable destination symbol).

A current location of the computing device 26 may be determined by detecting one or more beacons 42 associated with and/or located in the mapped skyway system 60. It may then be determined when the computing device 26 is inside the skyway system 60 based on the one or more beacons 42 (if any) that are detected. In one example, when the computing device 26 detects a beacon 42, the mobile application 10 may determine (e.g., using the location identification sub-system 14 or other suitable system and/or database) whether the detected beacon 42 has a designated location associated with the skyway system 60. When the detected beacon 42 has a designated location associated with the skyway system 60, the mobile application 10 may determine the computing device 26 is within the skyway system 60. The mobile application 10 may identify a particular location (e.g., a current location) of and/or track the computing device 26 within the skyway system 60 based on which beacon(s) 42 or set of beacons 42 are detected by the computing device 26 and/or a strength of a signal between the detected beacon(s) 42 and the computing device 26. Once a location of the computing device 26 is known with respect to the skyway system 60, the current location may be depicted on an indoor map on the navigational display 18. In some cases, the mobile application 10 may display the current location using a visual indicator 68 on the indoor map at the current location of the computing device 26.

When the detected beacon(s) 42 does not have a designated location associated with the skyway system 60 (e.g., an indoor transit system displayed in the map on the navigational display 18), the mobile application 10 may search (e.g., using the map sub-system 16 or other suitable system and/or database) to determine whether the detected beacon 42 has a designated location within one or more other indoor transit systems mapped on a known indoor map, such as a subway system. If the detected beacon(s) 42 has a designated location within one or more other indoor transit system mapped on a known indoor map, the mobile application 10 may display the corresponding known indoor map and identify the current location of the computing device 26 thereon. If the detected beacon(s) 42 does not have a designated location within one or more other indoor transit systems mapped on a known map, the mobile application 10 may continue to monitor for detected beacon(s) 42 having a designated location within a transit system on a known indoor map, determine the computing device 26 is not within a transit system on a known indoor map, and/or take one or more other suitable actions. In some cases, if it is determined that the mobile device 26 is not within a transit system on a known indoor map, the mobile device 26 may switch to an outdoor map and may use GPS, cellular triangulation or other location service and display the current location of the computing device 26 on the outdoor map.

In some instances, a first location may be entered into the mobile application 10 at a starting location box 76 and the second location may be entered into the mobile application 10 at a destination location box 78 via the user interface 32 of the computing device 26. The to locations entered into the starting location box 76 and the destination location box 78 may be entered and/or received as a street address, a business address, as a nearest bathroom, a nearest restaurant, a bathroom, restaurant, or other feature nearest a place of interest, GPS coordinates, longitudinal/latitude and/or other suitable location identifier. To determine a location of a "nearest" feature, the mobile application 10 may select the noted feature that is closest to a current location of the computing device 26 or specified place of interest and enter that location as the starting and/or destination address.

The first location and the second location may be entered into boxes 76, 78, respectively, via the user interface 32 of the computing device 26 (e.g., via typing, voice, and/or other suitable input means). In some cases, one or both of the first location and the second location may be automatically entered into a respective box by the mobile application 10 based on a current location of the computing device 26, as in the example of FIG. 5, and/or a location selected in the map depicted on the navigational display 18. Once the first location (e.g., a current location of the computing device 26) and the second location (e.g., US Bank Stadium or other suitable destination) are entered, the mobile application 10 may determine one or more routes 58 through the skyway system 60 from the first location to the second location and display the one or more routes 58 in the map on the navigational display 18.

In some cases, based on personal settings and/or other information or data, the mobile application 10 may determine and/or display one or more routes 58 that extend at least partially through the skyway system 60 or other indoor transit system and at least partially exterior of the skyway system 60 or other indoor transit system (e.g., exterior the network of beacons 42). In one example, the route 58 may extend from inside the skyway system 60 or other indoor transit system, through an access point of the skyway system 60 or other transit system, along a geographical region exterior of the skyway system 60 or other indoor transit system, through a further access point of the skyway system 60 or other indoor transit system, and back into the skyway system 60 or other indoor transit system to the destination. In another example, the route 58 may extend (e.g. start) from a location outside of the skyway system 60 or other indoor transit system, along at least part of a geographical region exterior of the skyway system 60 or other indoor transit system, through an access point of the skyway system 60 or other indoor transit system, and into the skyway system 60 or other indoor transit system to a destination.

When the route 58 extends along an indoor transit system and then exterior the indoor transit system, the mobile application 10 may facilitate switching between an outdoor map (e.g. third-party outdoor mapping service) and the indoor map. In some cases, the mobile application 10 may initiate a third-party outdoor mapping service (e.g., mobile app), send a starting location or sub-starting location and a destination or sub-destination to the third-party outdoor mapping service when the user exits the indoor transit system. The mobile application 10 may monitor for when the computing device 26 re-enters the indoor transit system and automatically initiate navigating via the navigational display 18 to the destination.

As shown in FIG. 5, in a destination display 70 (e.g., a menu), the navigational display 18 may display a distance and an estimated time (e.g., based on past movements of the computing device 26 with a user and/or based on general population averages) to the destination from the current location of the user's computing device 26 when following the displayed and/or selected route 58. In the example illustrated in FIG. 5, the destination is located 1.69 miles away from the current location of a user's computing device 26 and it will take approximately forty-five (45) minutes and twenty (seconds) to walk to the destination when following the displayed route 58, as indicated in the destination display 70.

The navigational display 18 may include turn-by-turn directions for the entire route. In some cases, a location of each respective turn along the entire route may be labelled in the display with directional visual indicator(s) 74. For example, a location of a turn along the route may be labelled with directional visual indicators 74 overlaid on the map depicted in the navigation display 18, as depicted in FIG. 5 (note, only some of the directional visual indicators 74 are labeled for clarity). The directional visual indicator 74 may be a dot that has a smaller diameter than the current location visual indicator 68, but this is not required and the directional visual indicator 74 may take on one or more other suitable configurations, including, but not limited to, a depiction of a direction of a turn.

Figure 6:
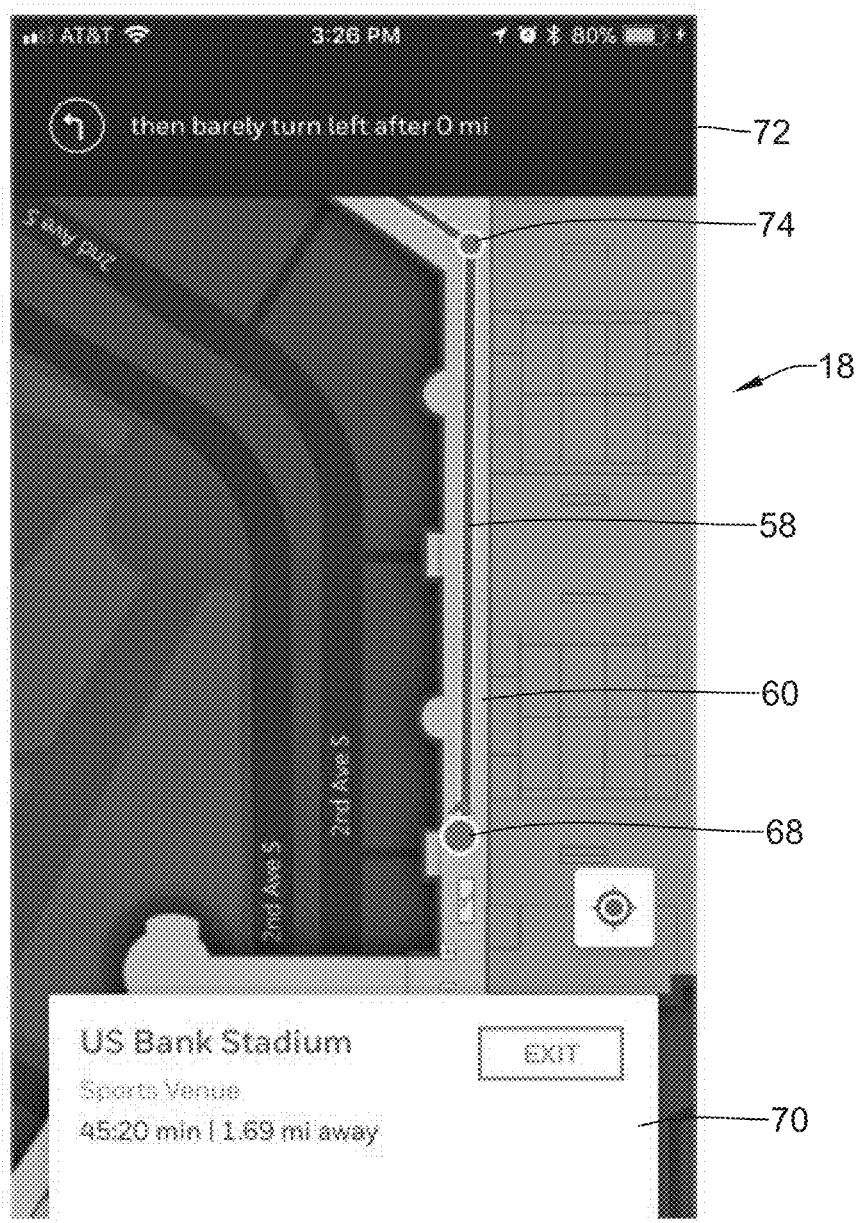
FIG. 6 is a schematic diagram of an illustrative display of a mobile application for a mobile computing device.

The navigational display 18 depicted in FIG. 6 depicts a portion of the mapped route through the skyway system 60 depicted in FIG. 5, including the current location of the computing device 26 of the user (as indicated by the current location visual indicator 68). The navigational display 18 may include turn-by-turn directions in a navigation display 72 for the route 58 through the skyway system 60 to a destination selected by the user. In the example depicted in FIG. 6, the navigational display 18 depicts turn-by-turn directions in the navigation display 72 for a portion of the route depicted on the display. For example, a textual description of the turn depicted in the navigational display 18 (e.g., "then barely turn left after 0 mi") may be depicted in the navigation display 72.

Figure 7A:
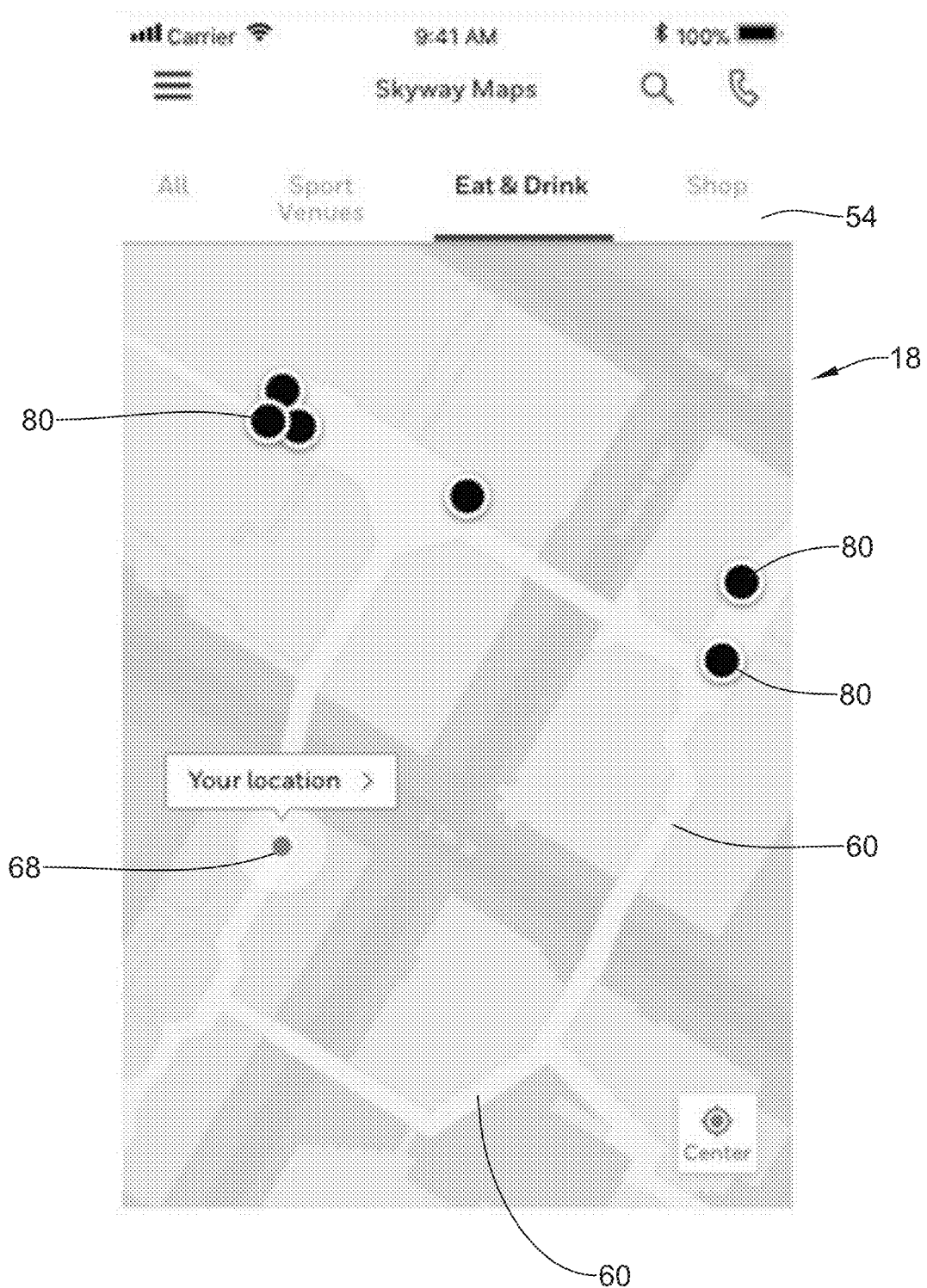
FIGS. 7A-7D are schematic diagrams of illustrative displays of a mobile application for a mobile computing device.

The navigational displays 18 depicted in FIGS. 7A-7D show an example of a sequence (e.g., flow) of the route mapping and navigation to a selected destination within the navigational display 18 of the mobile application 10. In FIG. 7A, the navigational display 18 displays a map including a portion of a skyway system 60, a current location of the computing device 26 as indicated by the current location visual indicator 68, and "Eat & Drink" locations, as selected from the scrollable list 54, which are represented by restaurant visual indicators 80 (e.g., dots, in the example depicted, and/or other suitable configurations) (note, not all restaurant visual indicators are labeled 80 for clarity). In some cases, a textual indicator may be displayed as or with the visual indicators, such as "Your location>" associated with the current location of the computing device 26 or "Restaurant A" associated with a selected restaurant. In some cases, a textual indicator may be displayed when an associated other visual indicator is selected by a user. In some cases, and as shown in FIG. 7A, the indoor map of the skyway system 60 may be overlaid on top of an outdoor map that shows the streets and other features outside of the skyway system 60. This may provide context for the indoor map relative to the geographic region around the indoor map.

Figure 7B:
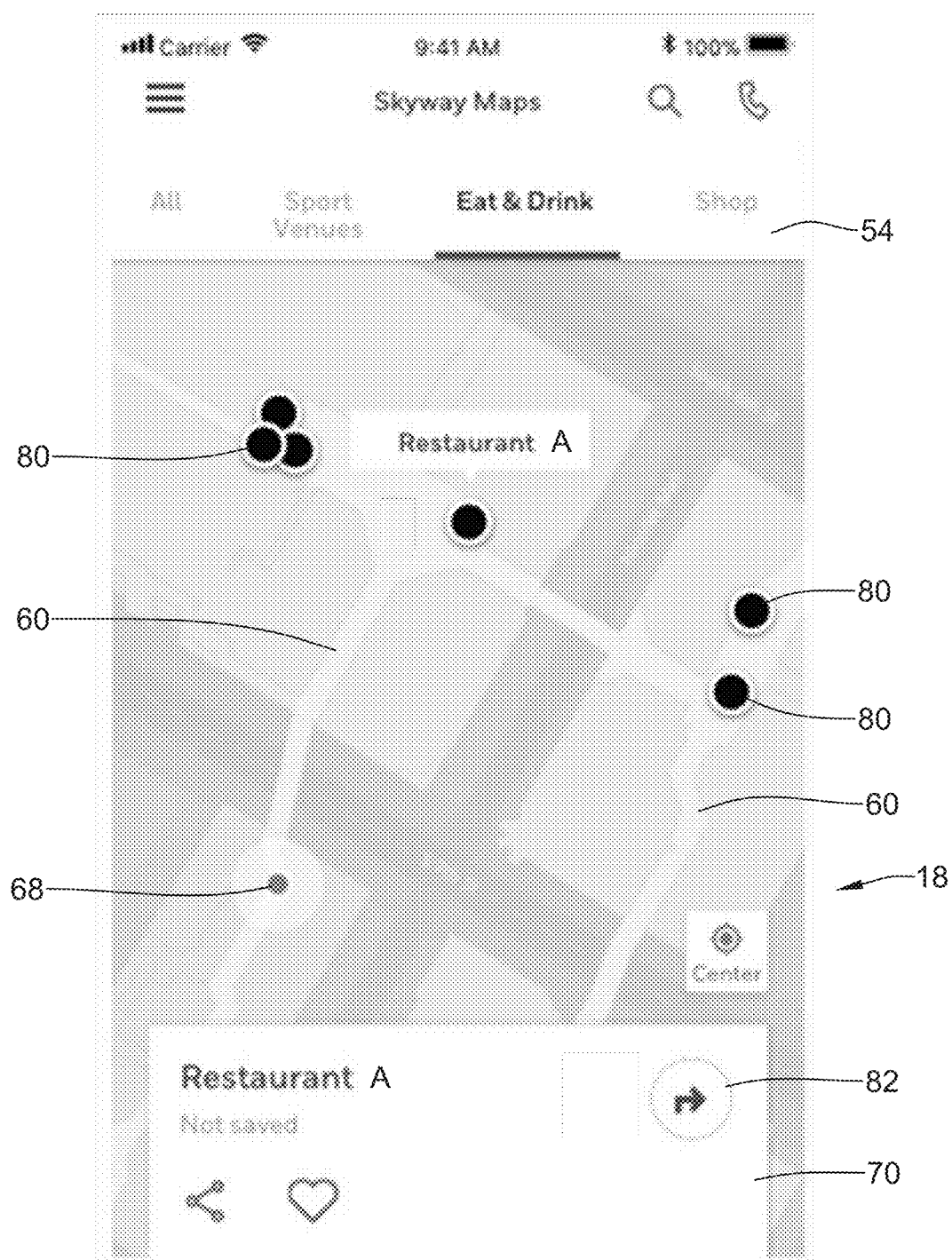

In FIG. 7B, the user has selected one of the restaurants, Restaurant A to which to find a route. The user may select the restaurant by, for instance, tapping the restaurant visual indicator 80 in the display for that restaurant. The selection is indicated in the navigational display 18 by a textual indicator (e.g., a restaurant name, such as Restaurant A) overlaid on the display at the location of the selected restaurant and in the destination display 70 being displayed in the navigational display 18. To initiate the mobile application 10 to obtain one or more routes to the selected destination, a user may select a directions button 82 or voice a direction command to the user interface 32 of the computing device 26, and/or initiate directions in one or more other suitable manners.

Figure 7C:
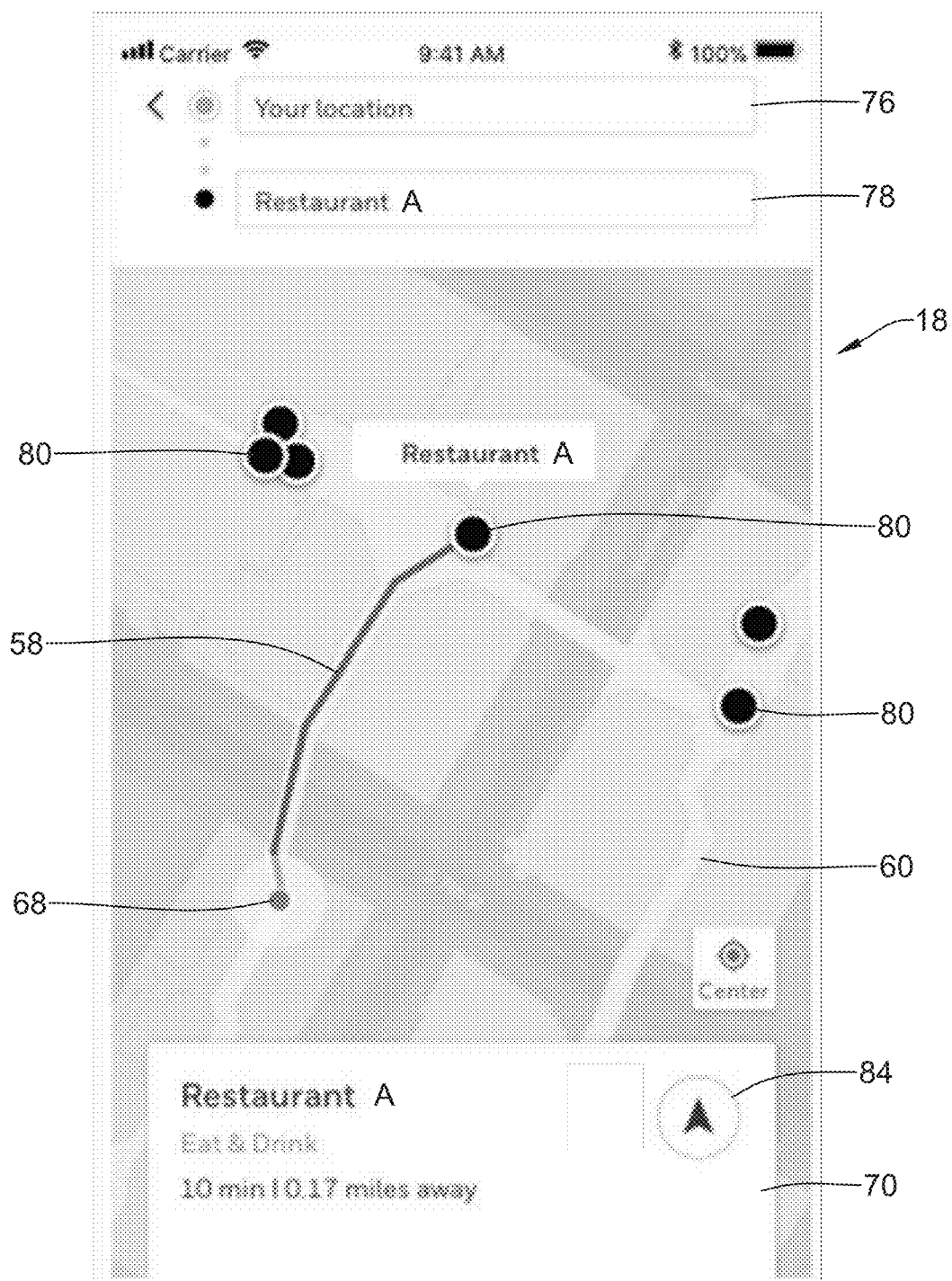

In FIG. 7C, the navigational display 18 displays a route 58 through the skyway system 60 as determined by the mobile application 10 based on the current location of the computing device 26 (e.g., see "Your location" in the starting location box 76) and the user selected destination (e.g., see "Restaurant A" in the destination location box 78). Additionally, the destination display 70 overlaid on the map in the navigational display 18 may provide a distance and an estimated time to the destination (e.g., Restaurant A) from the current location of the computing device 26. To initiate turn-by-turn navigation directions, a user may select a navigation button 84 in the destination display 70 or voice a turn-by-turn navigation command to the user interface 32 of the computing device 26, and/or initiate turn-by-turn navigation in one or more other suitable manners.

Figure 7D:

Once the turn-by-turn navigation has been initiated by the mobile application 10, textual descriptions of each turn may be provided in the navigation display 72 and the map may be zoomed in to focus on a portion of the route 58, but this is not required in all cases. In FIG. 7D, a textual description of the first turn along the route (e.g., "keep forward and turn left after 69 ft") may be provided in the navigation display 72, which may be overlaid on the map in the navigational display 18. Additionally or alternatively, the destination display 70 may continue to display the selected destination and a distance and estimated time to the destination. In some cases, the distance and estimated time to the destination may be updated in real time as updates are calculated due to changes in signal strengths between the computing device 26 and a beacon 42 and/or due to the computing device 26 connecting to or sensing a new or different beacon than a previous sensed or connected beacon.

Figure 8A:
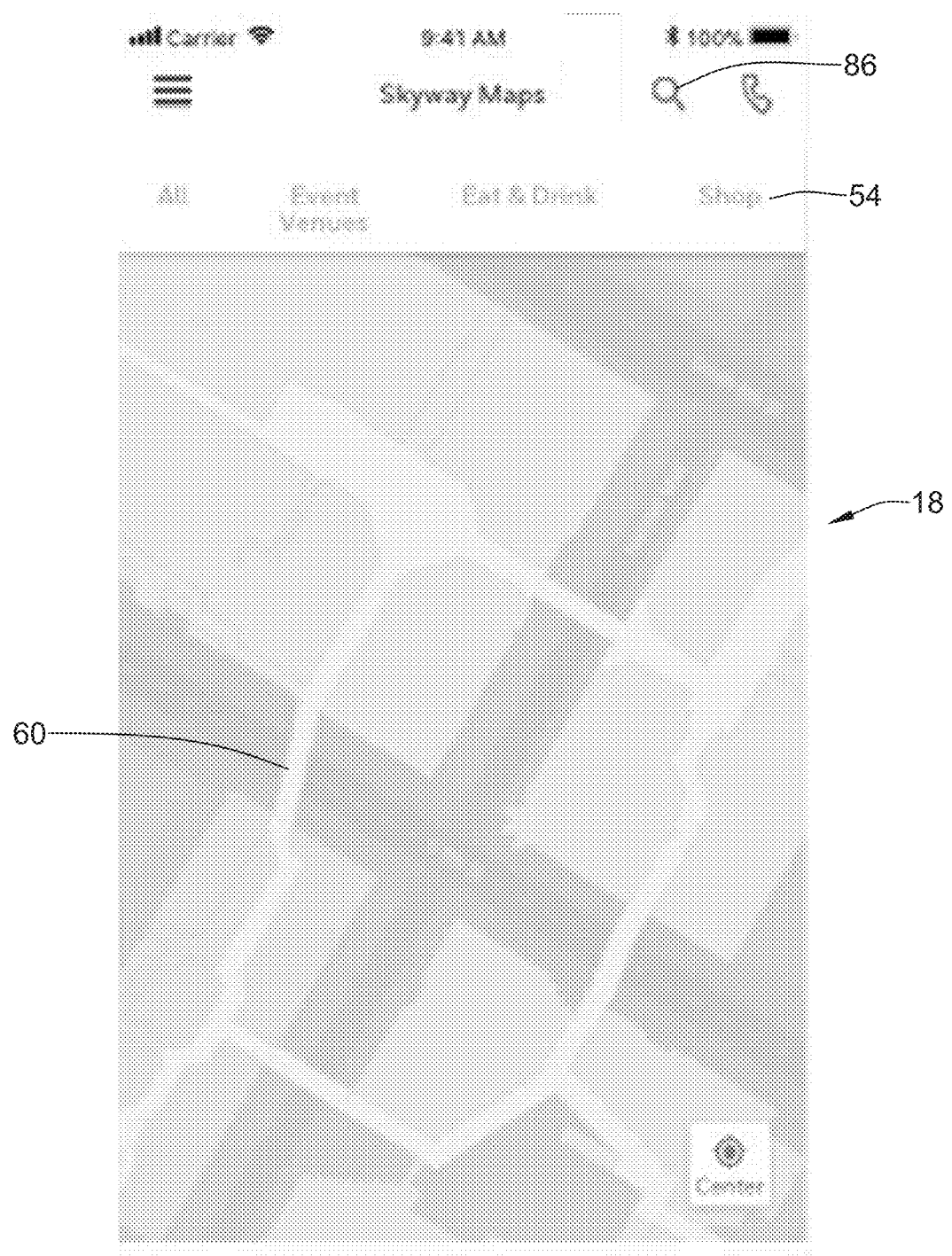
FIGS. 8A-8E are schematic diagrams of illustrative displays of a mobile application for a mobile computing device.

FIGS. 8A-8E depict an example of a sequence (e.g., flow) of the route mapping and navigation to a selected destination within the navigational display 18 of the mobile application 10 in which the user searches for a destination location. In FIG. 8A, a user may initiate a search for a place of interest in or connected to the skyway system 60 depicted in the map on the navigational display 18 by selecting a search button 86 and/or other interactions with the user interface 32 of the computing device 26 may be utilized to initiate a search.

Figure 8B:
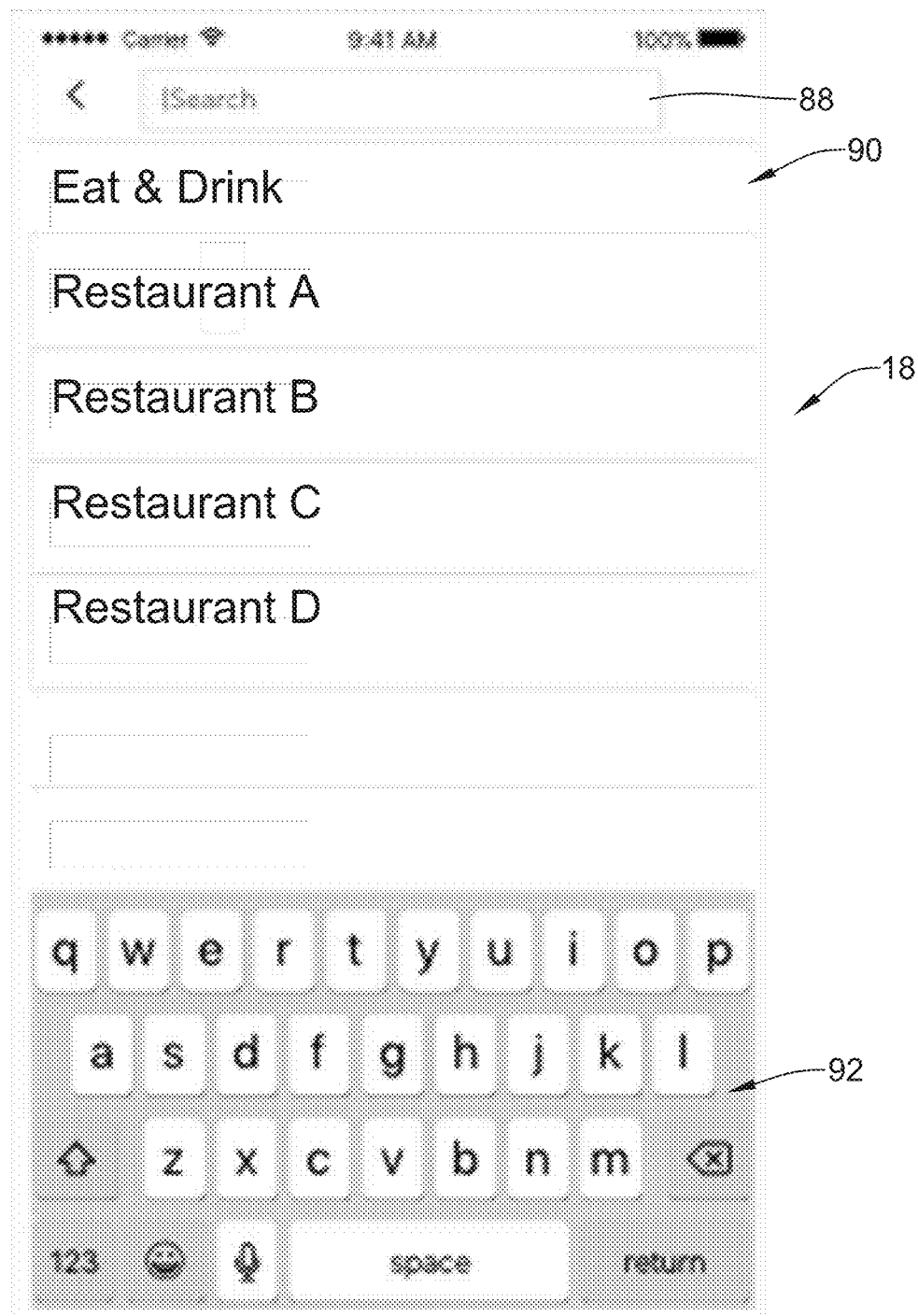

Once the search button 86 has been selected and a search has been initiated by the mobile application 10, a search screen may be displayed in the navigational display 18, as depicted in FIG. 8B. The search screen may include a search box and and a results box 90. If a user wants to search for a place of interest, the user may enter a place of interest or a type of place in the search box 88 (e.g., via a keyboard 92 or via other suitable manners) and the results box 90 may display relevant places of interest with respect to what was entered into the search box 88. In some cases, prior to entering any terms into the search box 88, the results box 90 may display places of interest for popular categories of places of interest (e.g., for the categories listed in the scrollable list 54), but this is not required. If the user sees a desired place of interest in the results box 90, the user may select the desired place of interest to select the place of interest as a destination.

Figure 8C:
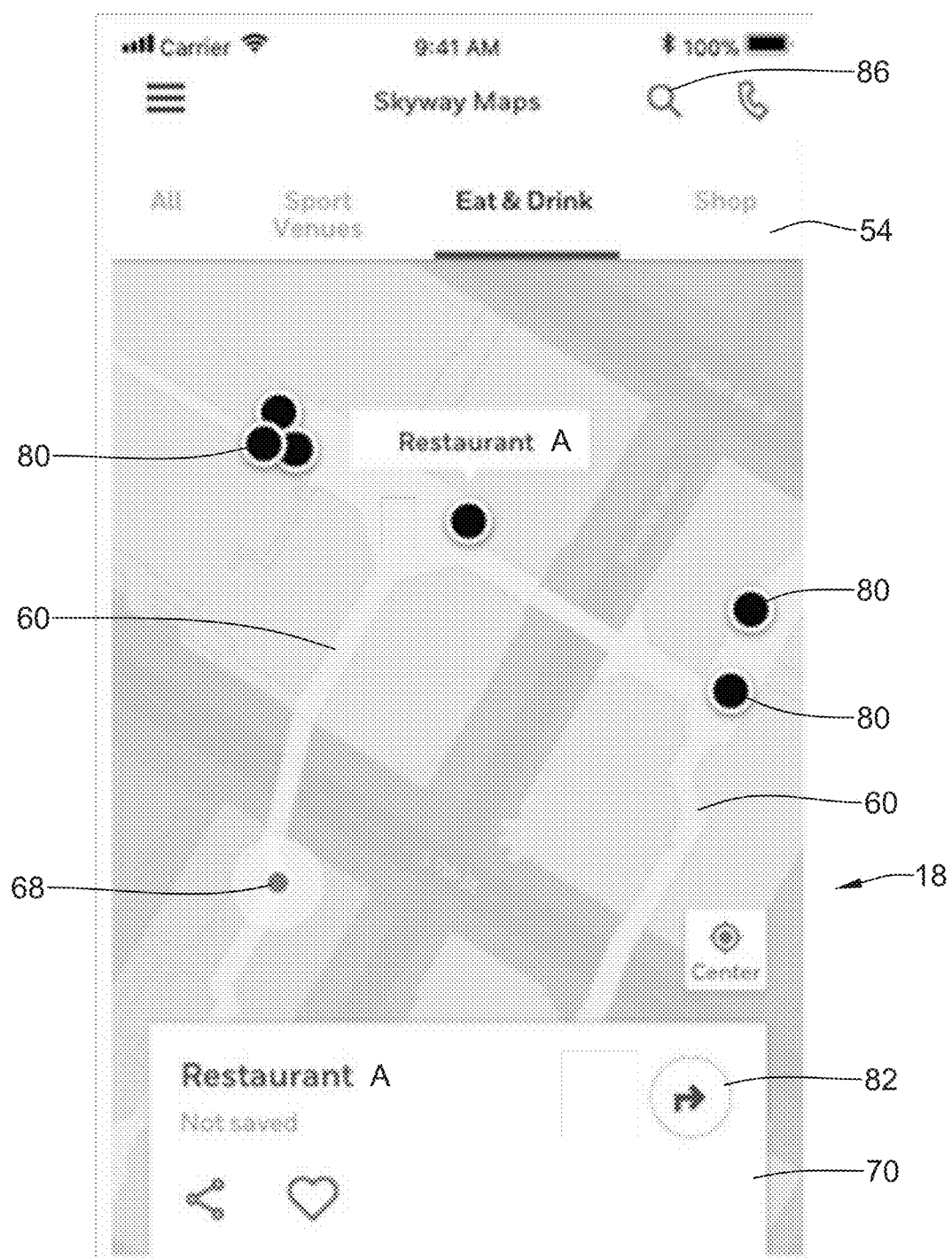
Figure 8D:
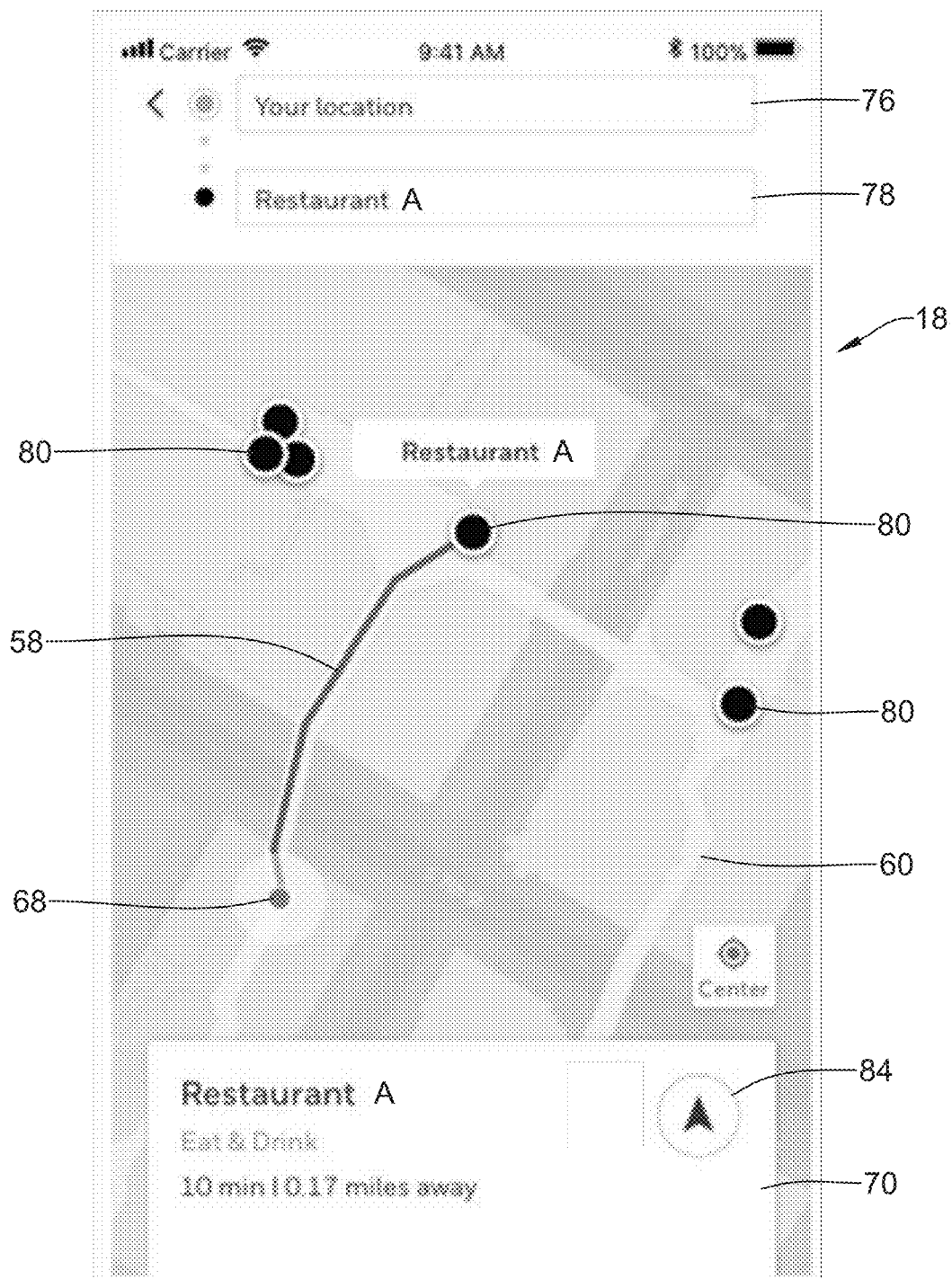
Figure 8E:

FIGS. 8C-8E are similar to FIGS. 7B-7D, respectively. For example, in FIG. 8C, the user has selected a destination and the mobile application 10 may display the destination in the destination display 70 and a user may select the directions button 82 to initiate the mobile application 10 finding directions from a current location of the computing device 26 to the selected destination. In FIG. 8D, the mobile application 10 has computed a route 58 from the current location of the computing device 26 to the selected destination and displayed the route 58 on the navigational display 18. The distance and estimated time until arrival at the selected destination may be display in the destination display 70. Turn-by-turn directions may be initiated by selecting the navigation button 84 in the destination display 70 of FIG. 8D. The mobile application 10 may depict turn-by-turn directions in the navigation display 72 and distance and estimated time to destination information in the destination display 70, as depicted in FIG. 8E. Further, when turn-by-turn navigation has been initiated by the mobile application 10, the map may zoom in on the current location of the computing device as indicated by the current location visual indicator 68 and an adjacent portion of the route 58.

Figure 9:
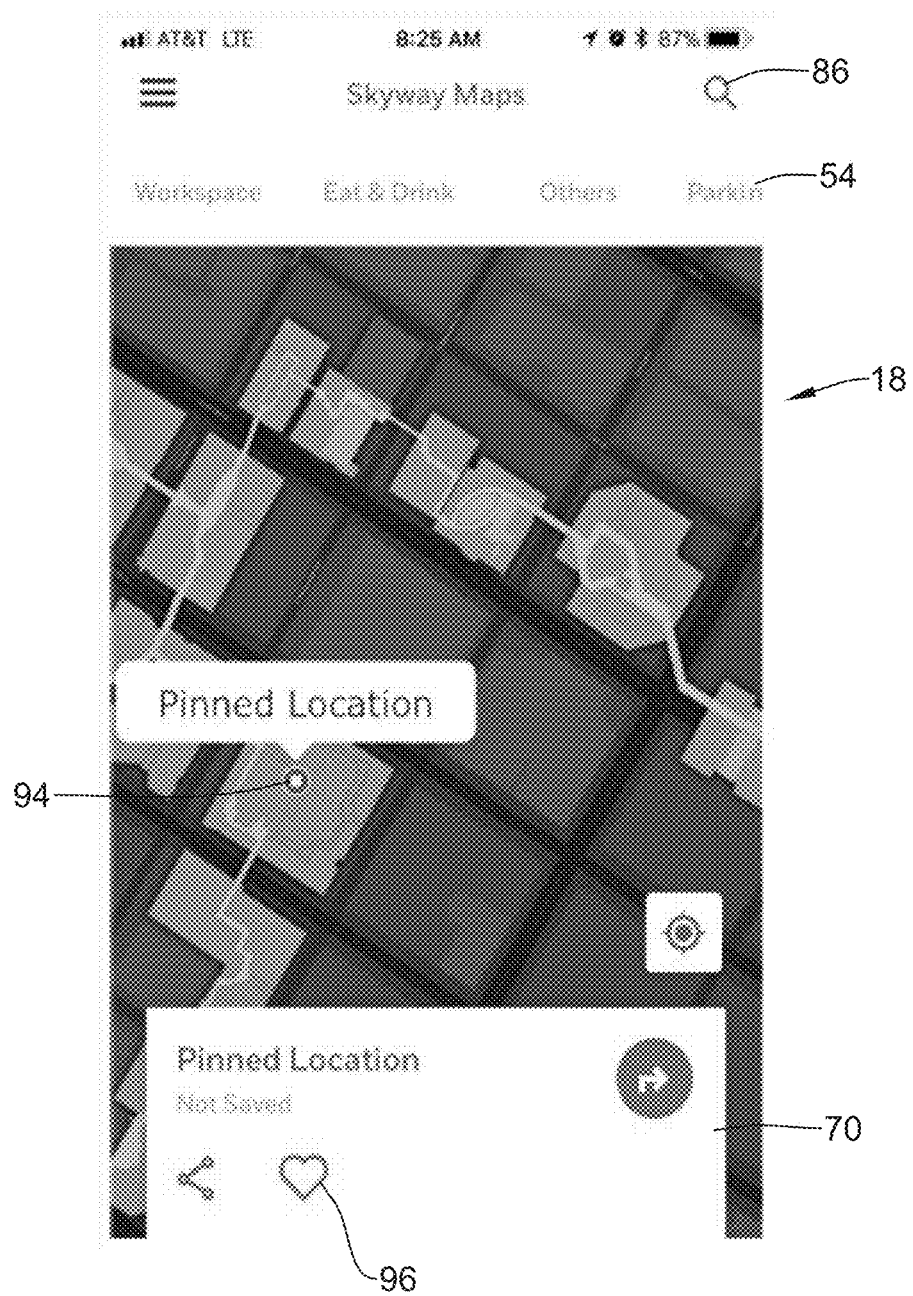
FIG. 9 is a schematic diagram of an illustrative display of a mobile application for a mobile computing device.

FIG. 9 depicts a map of the skyway system 60 in the navigational display 18, with a pinned location represented by a pinned location visual indicator 94. The pinned location visual indicator 94 may be a circle with a square in the circle, but other configurations for the pinned location visual indicator 94 are contemplated. In some cases, a textual visual indicator (e.g., "Pinned Location" and/or other suitable label) may be displayed with the pinned location visual indicator 94 and/or displayed in response to selection of the displayed pinned location visual indicator 94. Further, the destination display 70 may be overlaid on the map depicted in the navigational display 18 and provide a selected pinned location and a directions button 82 initiating the mobile application to compute a route from a current location of the computing device 26 (or other suitable location) to the pinned location in a manner similar to the routing and navigating discussed above with respect to FIGS. 7A-8E. In some cases, the destination display 70 may include a favorites or pin button 96 to initiate pinning a selected location or place of interest. The pin button 96 may be shaped like a heart, as in FIG. 9, and/or may have one or more other suitable configurations.

Figure 10:
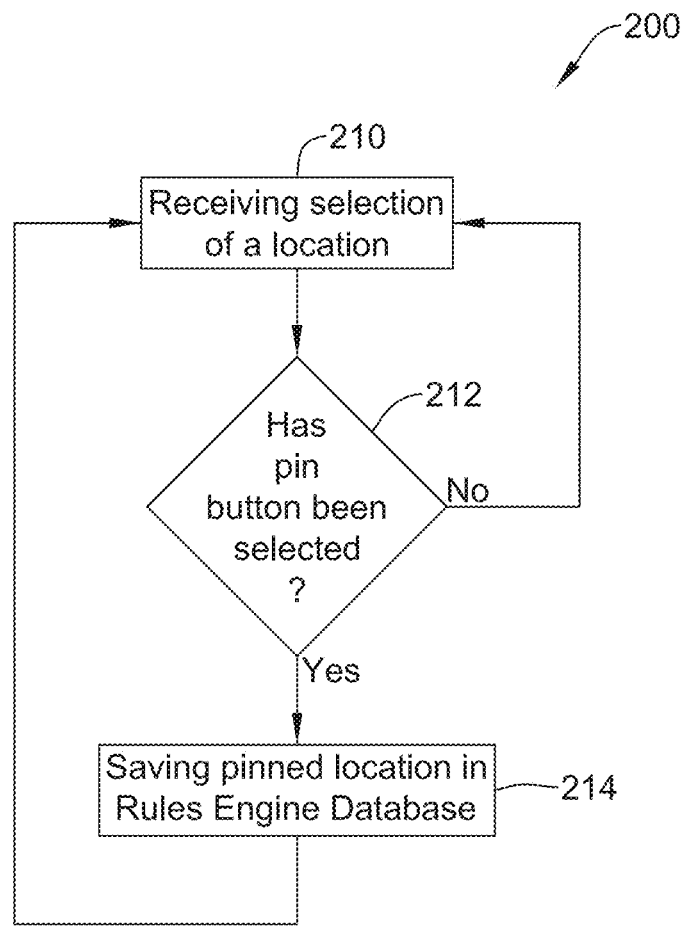
FIG. 10 is a schematic diagram of an illustrative method for pinning a location.

FIG. 10 is a flow diagram of an example schematic method 200 that the mobile application 10 may follow to pin a place of interest. The mobile application 10 may be programed to receive 210 a selection of a location (e.g., a place of interest). In response to a selection of a location, the mobile application 10 may display a destination display 70, as discussed above, which may include the pin button 96. The mobile application 10 may be programed to ask or inquire 212 whether the pin button 96 has been selected. If the mobile application 10 determines the pin button 96 has been selected with respect to the selected location, the mobile application 10 may save 214 the location as a pinned location in the rules engine database 12 (e.g., in the personal settings database 20) or in any other suitable database. When the pin button 96 is not selected and/or after saving a location as a pinned location, the mobile application 10 may return to the step of receiving 210 a selection of a location.

Figure 11:
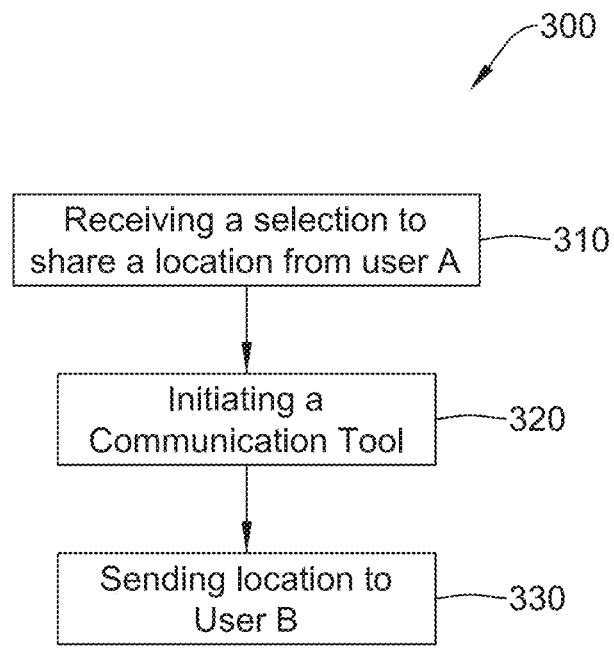
FIG. 11 is a schematic diagram of an illustrative method for sending a location from a first user to a second user.

FIG. 11 is a schematic flow diagram of an illustrative method 300 that the mobile application 10 may follow to share a current location or pinned location identified in the mobile application 10. The mobile application may be programmed to receive a selection 310 to share a location from a first user (e.g., a user A). The first user may initiate a location share function of the mobile application 10 by selecting a share button via the navigational display 18 and/or initiating the location share function by interacting with the user interface 32 of the computing device 26 in one or more other suitable manners. Once the mobile application 10 receives or identifies a selection to share a location, the mobile application 10 may initiate 320 a communication tool on the computing device 26. In instances when the computing device 26 is a mobile device or mobile phone, the mobile application may initiate a texting application, a phone call application, and/or initiate a display with options of communication tools selectable by the user via the user interface 32 of the computing device 26. Once the communication tool is initiated, the location to share is sent 330 to a second user (e.g., user B). In some cases, the mobile application 10 may interface with one or more communication tools via an API and initiate the communication tool and send the location automatically via the API. In other instances, the mobile application 10 may initiate the communication tool and it will be up to the first user to send the location via the communication tool.

Figure 12A:
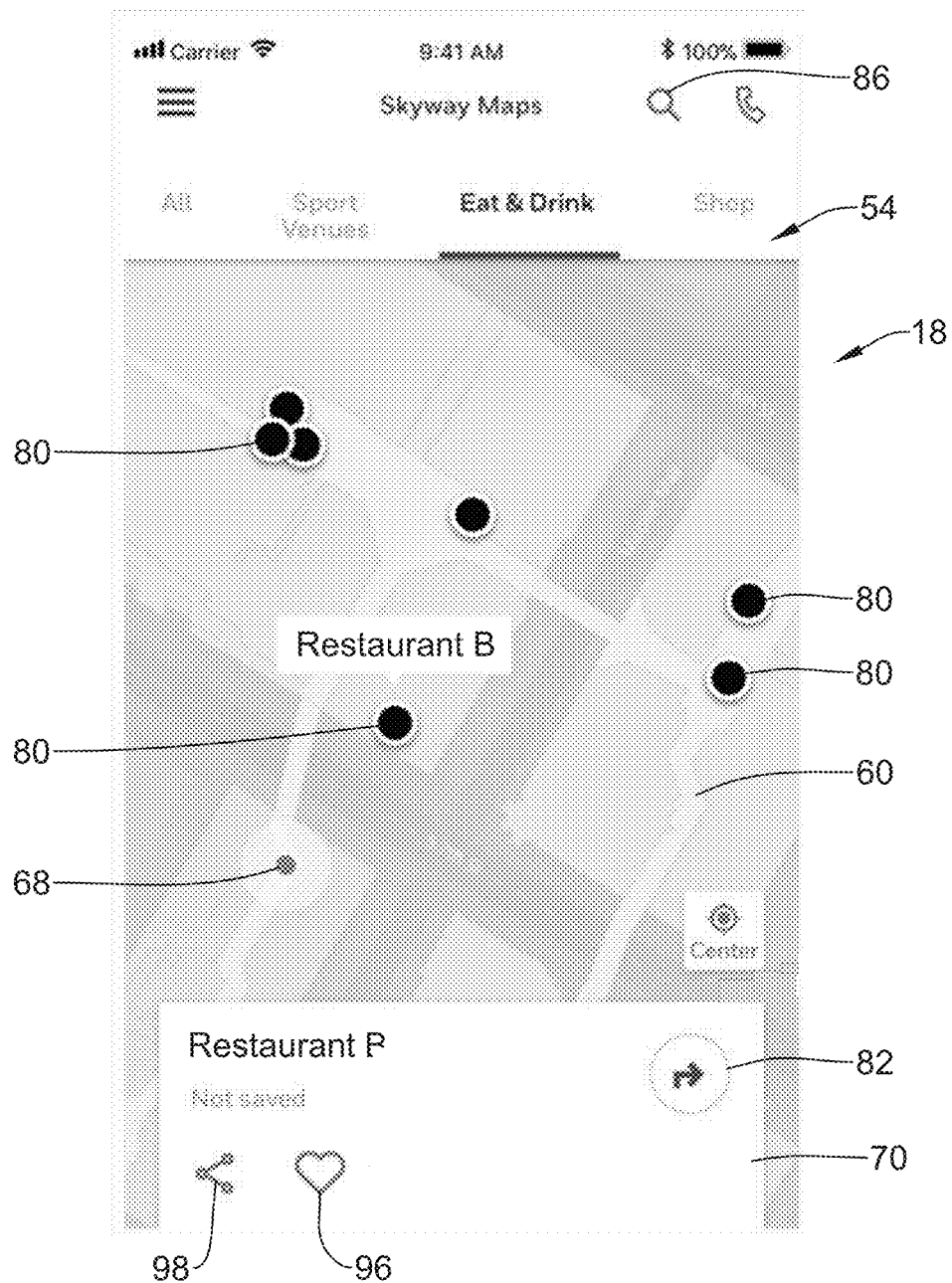
FIGS. 12A-12D are schematic diagrams of illustrative displays of a mobile application for a mobile computing device.
Figure 12B:
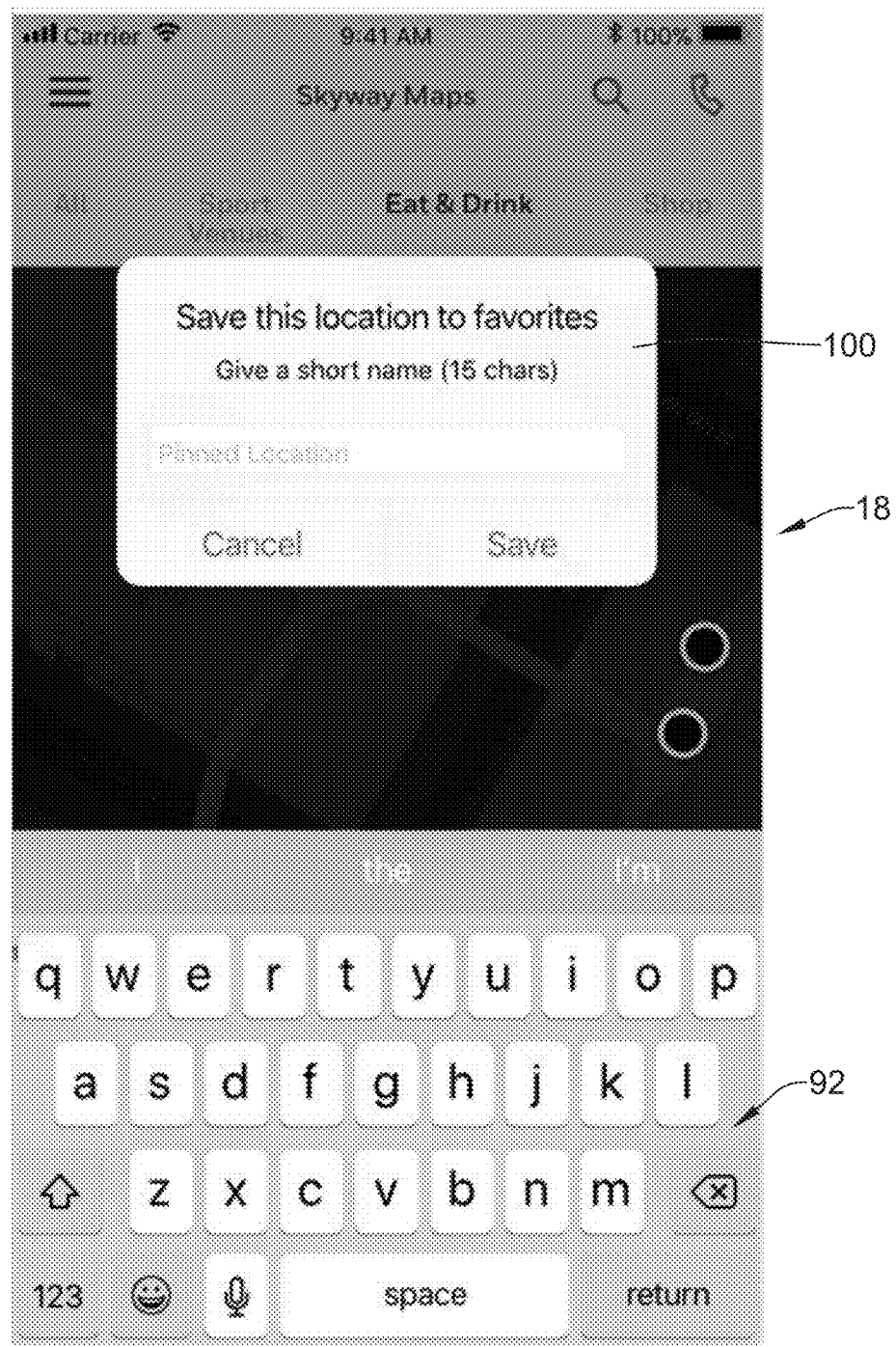
Figure 12C:
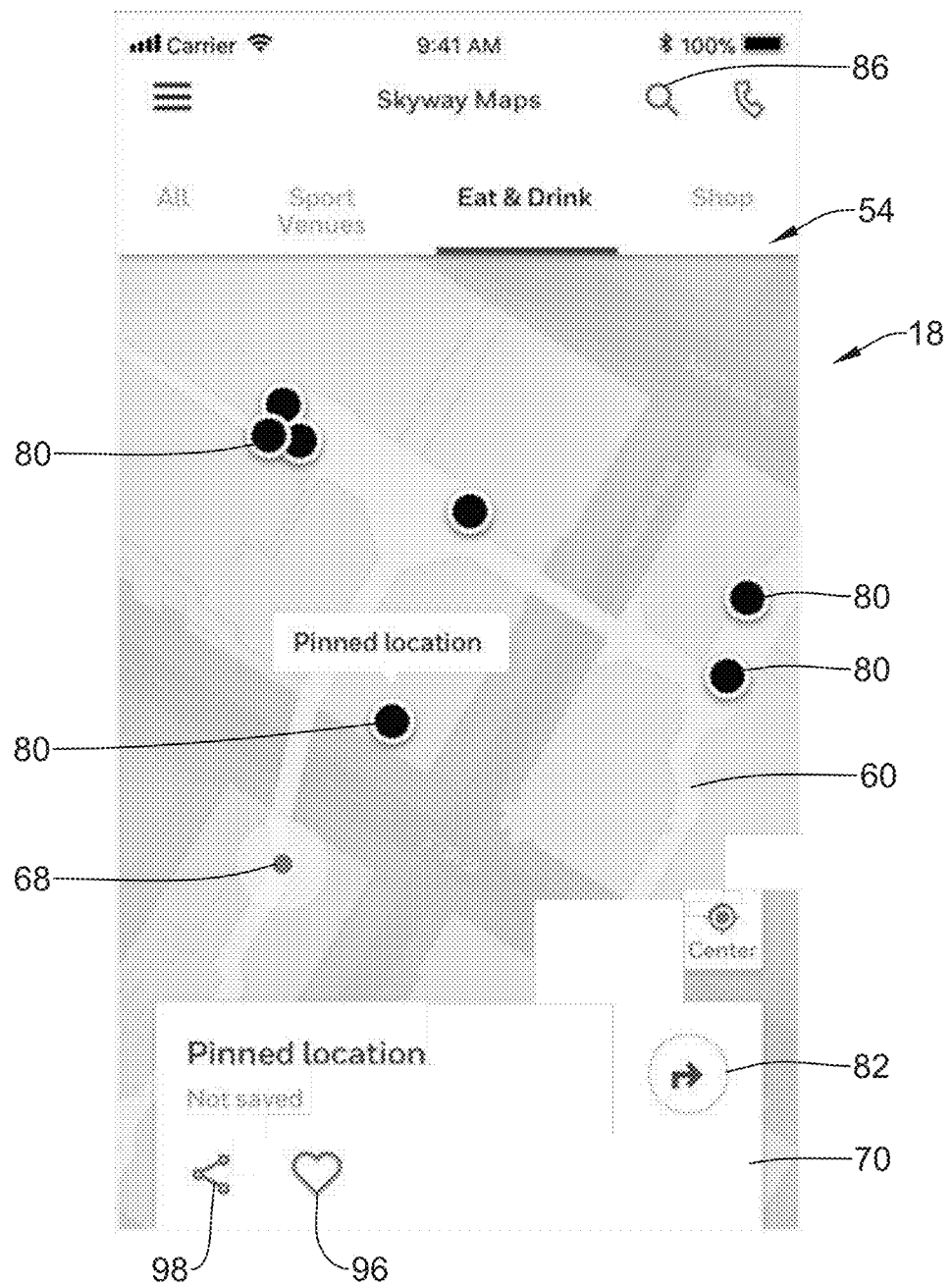
Figure 12D:
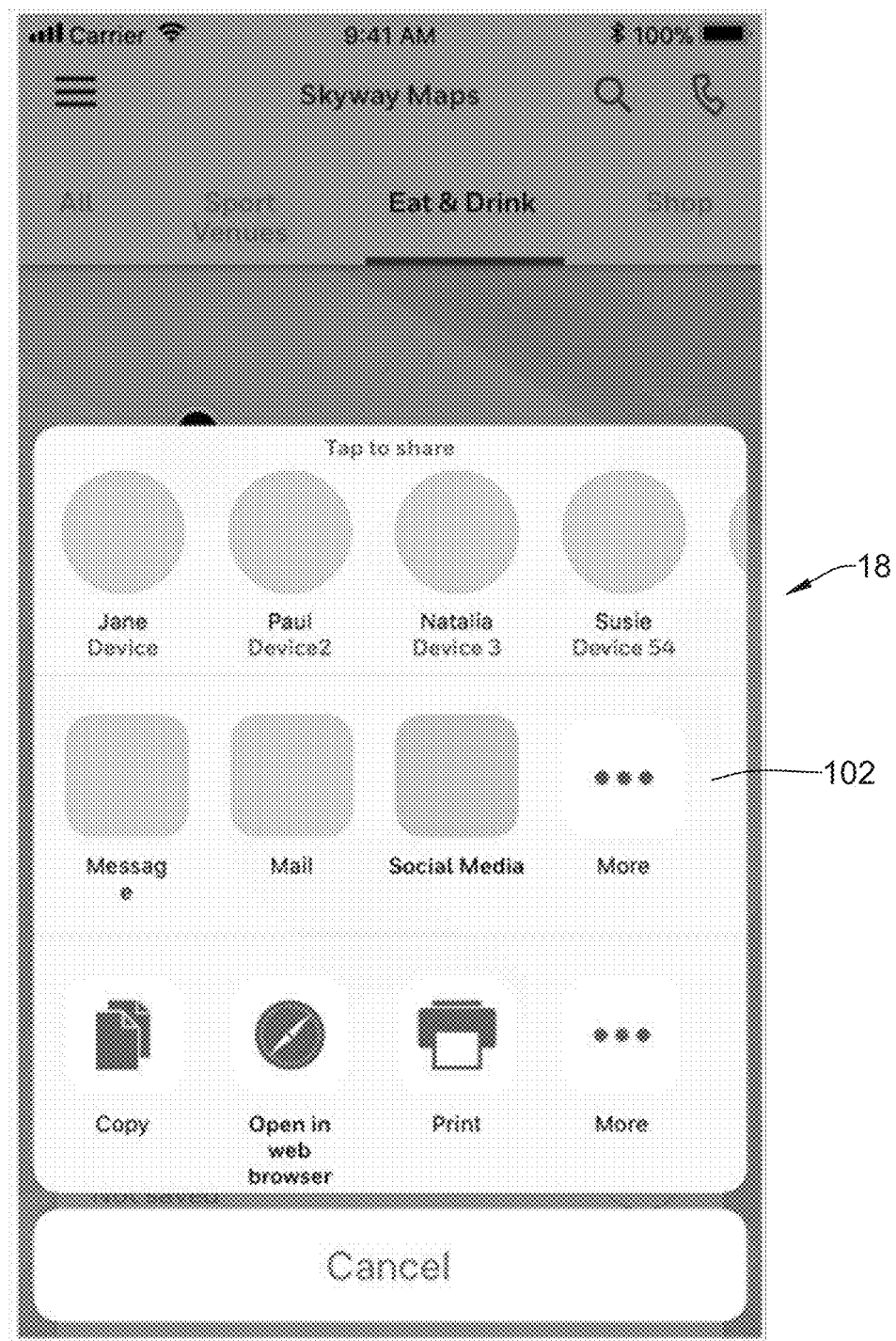

FIGS. 12A-12D depict an example of a sequence of a first user pinning a place of interest and sending the pinned place of interest to a second user via the mobile application 10. In FIG. 12A, a destination has been selected as indicated by the textual visual indicator "Restaurant B" adjacent the restaurant visual indicator 80 and the presence of the destination display 70 depicting the name of the selected destination, the directions button 82, and the pin button 96. As discussed above, the pin button 96 may be selected to initiate saving a selected location or destination as a pinned location. In some cases, once the pinning function of the mobile application has been initiated, the navigational display 18 may provide a label box 100 in which a label (e.g., "Pinned location" or other label) may be provided via the keyboard 92, as depicted in FIG. 12B, and/or otherwise provided via the user interface 32 of the computing device 26. Once a label has been provided and saved, the label may be used by the mobile application 10 to refer to the place of interest on the map and the navigational display 18 may return to the map with the destination display 70 overlaid, as depicted in FIG. 12C. To share the pinned location or other suitable location (e.g., a current location of the computing device 26), a user may select a share button 98 in the destination display 70. When a pinned location or a destination is selected, selecting the share button 98 may cause the mobile application 10 to initiate sharing the selected location or destination. When no location is selected, selecting the share button 98 may cause the mobile application 10 to initiate sharing the current location of the computing device 26 and/or one or more previously pinned locations.

Once a share location function of the mobile application 10 has been initiated, the mobile application 10 may initiate a communication tool on the computing device. As discussed above, initiating a communication tool may initiate a specific communication tool or may initiate a communication selection box (e.g., selection box 102). In some cases, a user may be able to select a communication tool (e.g., a messaging application, an email application, a social media application, etc.) from which to share a location. Once a desired communication tool is selected, the mobile application 10 may automatically send the location or a user may finish sending the location, as discussed with respect to FIG. 11. Such location share features and/or other share features of the mobile application 10 may facilitate locating (e.g., finding) friends, family, and/or other acquaintances of the user of the computing device 26.

FIGS. 13A-13D depict an example of a sequence of tracking family, friends, or other acquaintances, such as, for instance, during a high density event inside a building of the skyway system 60 via the mobile application 10. In some cases, the navigational display 18 and/or the mobile application 10 via the user interface 32 of the computing device 26 may provide alerts if others move too far away or out of the building and/or for other suitable reasons.

Figure 13A:
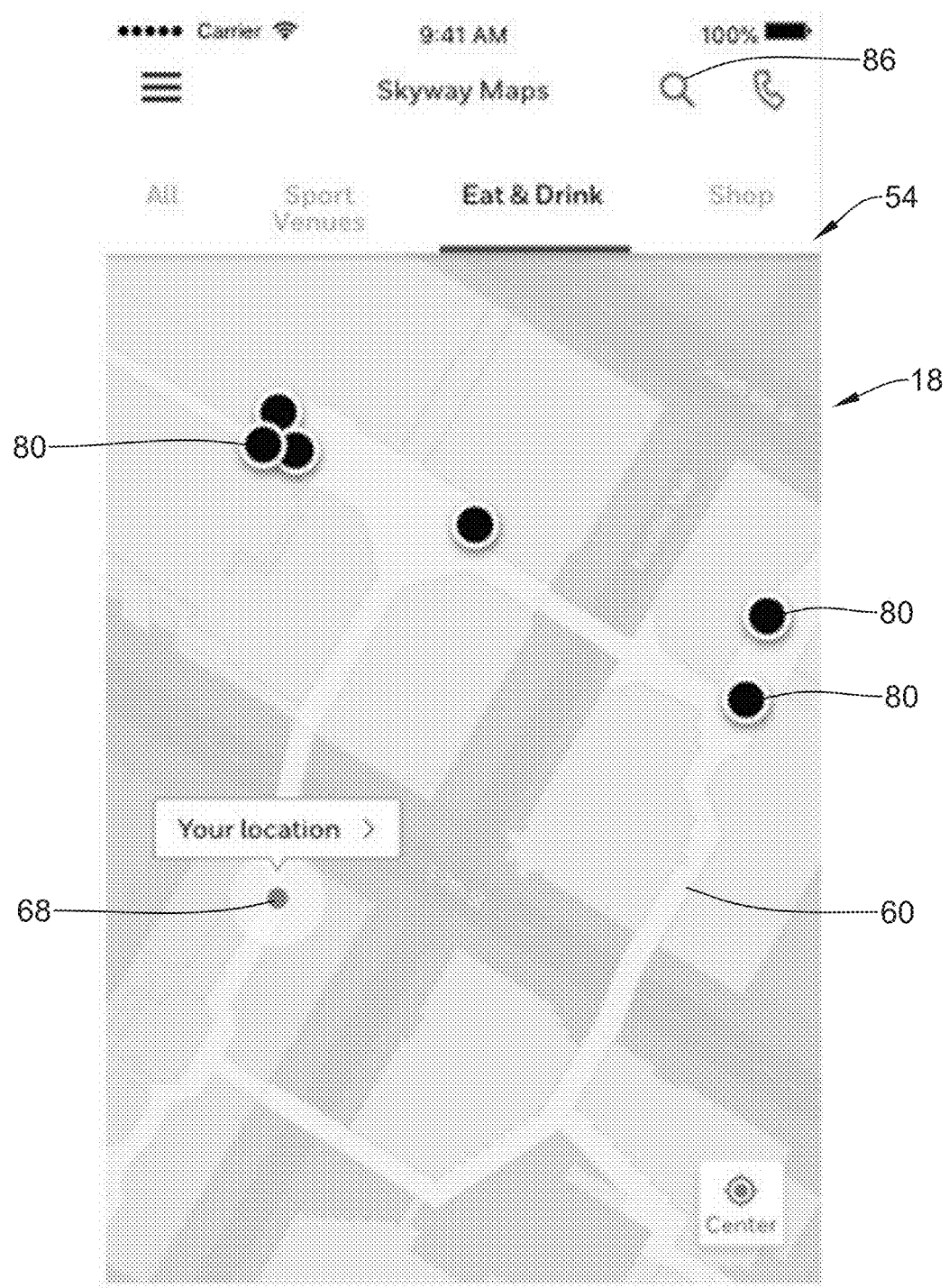
FIGS. 13A-13D are schematic diagrams of illustrative displays of a mobile application for a mobile computing device.
Figure 13B:
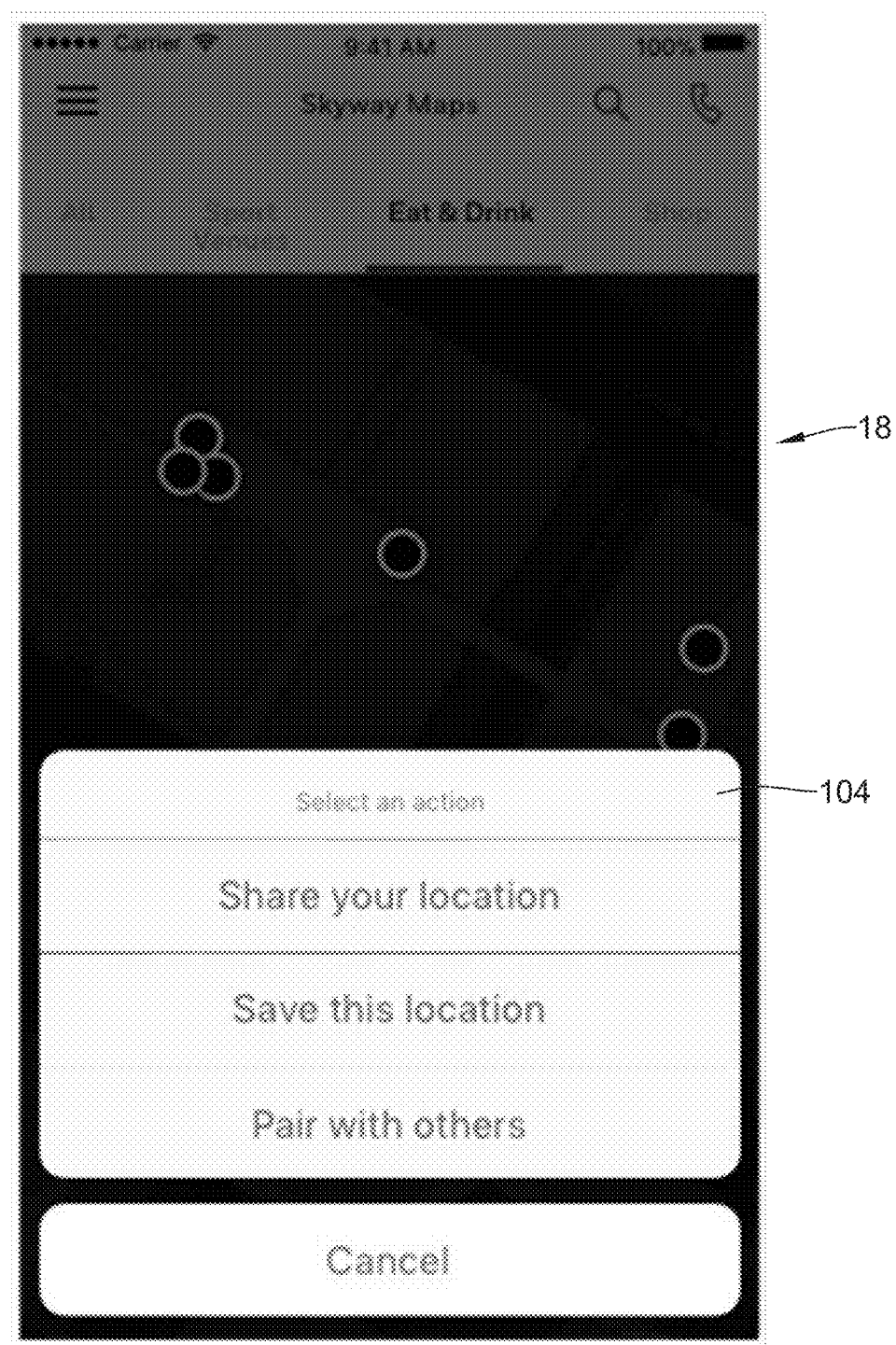

FIG. 13A depicts a map of the skyway system 60 in the navigational display 18, with the restaurant visual indicators 80 visible due to Eat & Drink being selected from the scrollable list 54 and the current location of the computing device 26 indicated by the current location visual indicator 68. By selecting the textual visual indicator (e.g., "Your location>"), the navigational display may display a location options menu 104, as is depicted in FIG. 13B. The location options menu 104 may display a "Share your location" option to share a current location of the computing device 26 with others, a "Save this location" option to save or pin a current location of the computing device 26 (e.g., save in the personal settings database 20), a "Pair with others" option to pair a current location of the computing device 26 with others, a "Cancel" option to close out of the location options menu 104, and/or one or more other suitable options.

Figure 13C:
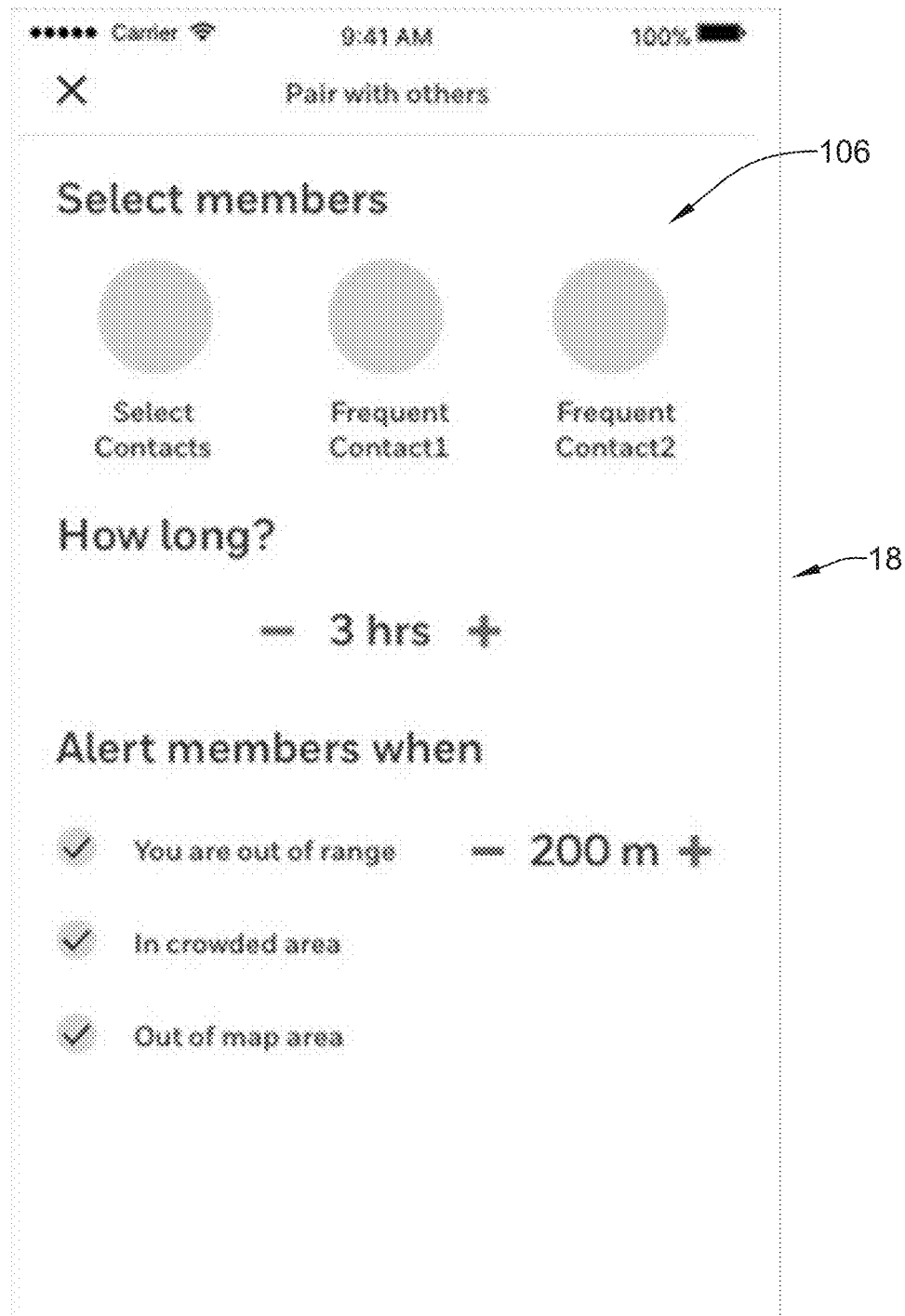

In response to selecting the "Pair with others" option from the location options menu, the mobile application 10 may initiate a pair options menu 106 that may be displayed on the navigational display 18, as depicted in FIG. 13C. The pair options menu 106 may display a variety of selectable options for configuring a pairing function of the mobile application with users of the application (e.g., as installed on computing devices of other users). For example, from the pair options menu 106, the user may select people with whom he or she would like to pair (e.g., from contacts on the user's mobile device, contacts on a social media account, contacts associated with the mobile application 10, etc.), select the length of time for which he or she would like to be paired, select the conditions for when the user would like to receive alerts and/or have alerts provided to the others (e.g., when the user is out of a particular range from the other users, when the user is in a crowded area (e.g., as determined by data of other current users of the mobile application 10 in an area and/or from third-party or external sources), when the user or the others are outside the map area, and/or at other suitable times), and/or the user may have other options from which to select and set up the pair feature of the mobile application 10. In some cases, other users may have to confirm a pair request before the user may view their paired user visual indicator 108 on the navigational display.

Figure 13D:
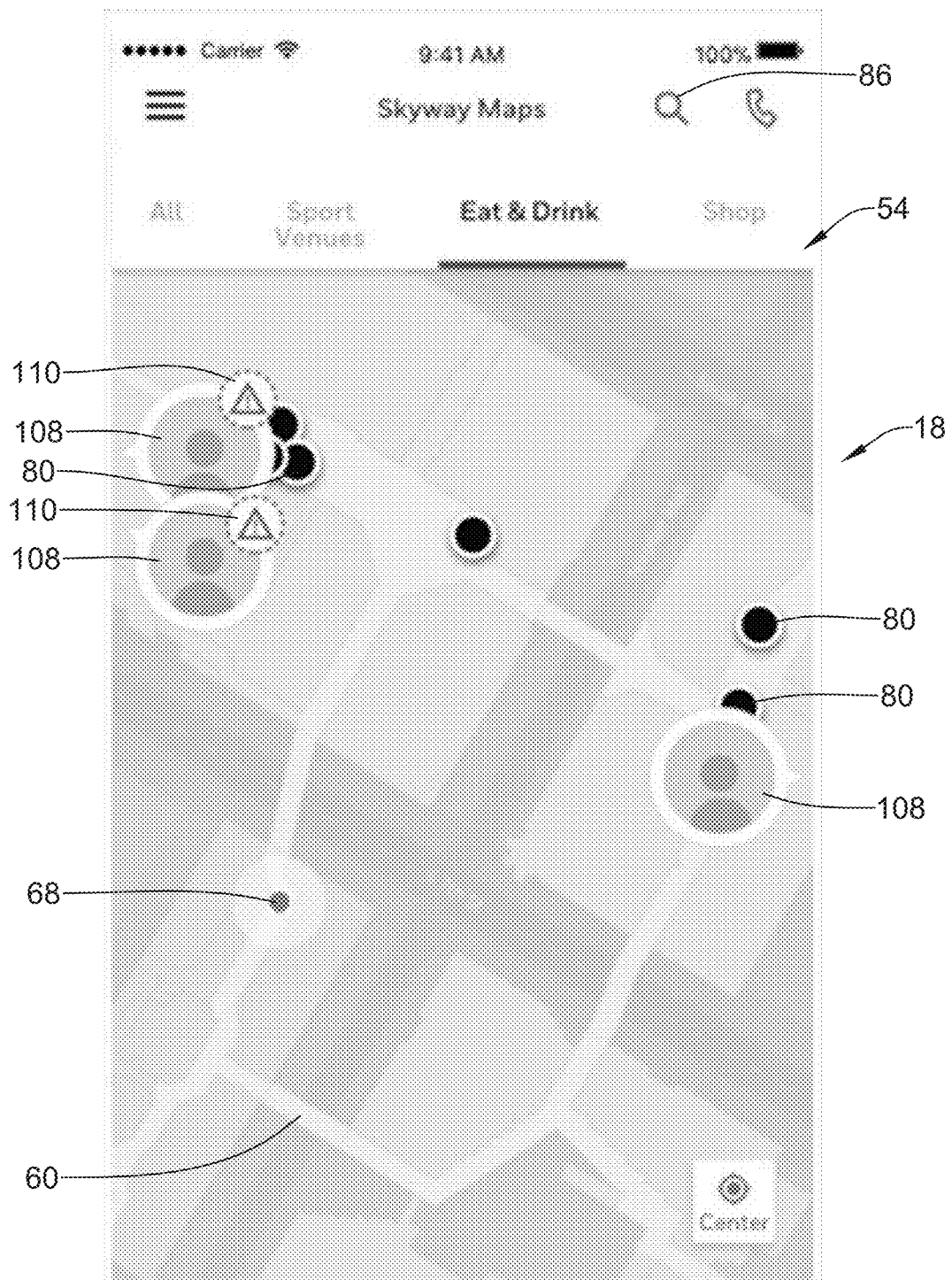

After configuring the pair feature via the pair options menu 106 of the mobile application 10, the navigational display 18 may depict the map with the location of other paired users as shown and labelled in the display depicted in FIG. 13D. The users with whom the user is paired may be identified by a paired user visual indicator 108. Although the paired user visual indicator 108 is depicted as a circle with a sketched person therein, the paired user visual indicator 108 may take on one or more other suitable configurations including, but not limited to, user personalized configurations, profile images, etc.

Further, an alert may be provided in the navigational display 18 based on alert conditions set when configuring the pair feature of the mobile application 10. As shown in FIG. 13D, two of the paired user visual indicators 108 may have an alert visual indicator 110 associated therewith indicating an alert is active for those paired users. In some cases, when the mobile application 10 receives a selection of the alert visual indicator 110, the mobile application may indicate on the navigational display 18 a reason for the alert with respect to that user.

Figure 14:
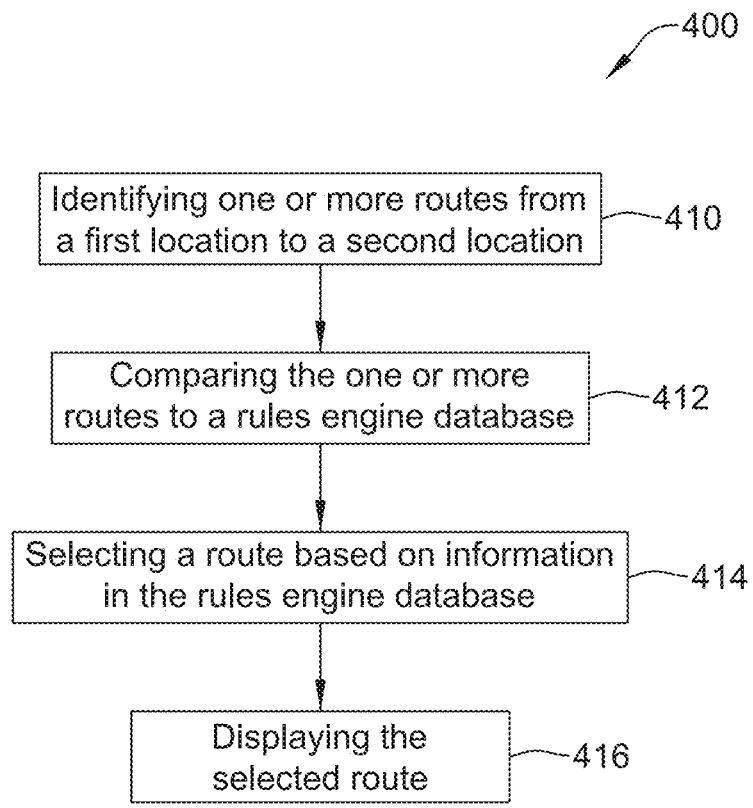
FIG. 14 is a schematic diagram of an illustrative method for displaying a route on a map.

FIG. 14 is a schematic flow diagram of an illustrative method 400 that the mobile application 10 may follow when implemented on the computing device (e.g., the computing device 26) to provide a route from a first location or destination to a second location or destination. After receiving the first location and the second location, the mobile application 10 may identify 410 one or more routes from a first location to a second location based on map data in a map sub-system (e.g., the map sub-system 16 or other suitable map sub-system). The map sub-system may contain map data usable for routing between two locations on the map. The one or more routes that are identified may be compared 412 to information and data in a rules engine database (e.g., the rules engine database 12 or other rules engine database) or other information and data. Based on the information and data in the rules engine and/or other information and data, one or more route from the first location to the second location may be selected 414. In one example, only the routes that meet the requirements in the information and data to which the routes are compared are selected. In another example, one or more routes that do not meet the requirements in the information and data to which the possible routes are compared may be selected in addition to the routes that do meet the requirements in the information and data. After selecting the desired one or more routes, the mobile application 10 may display 416 the selected one or more routes on the navigational display 18. If the selected routes include one or more routes that did not meet the requirement information and data to which the possible routes were compared, such routes may be displayed on the navigational display 18 with an indication that the route did not meet the requirements of the information and data. In some cases, if there is a large number of possible routes, the mobile application 10 may be configured to display just the top two or three routes based on distance, estimated time to arrival, and/or other suitable factors.

Figure 15:
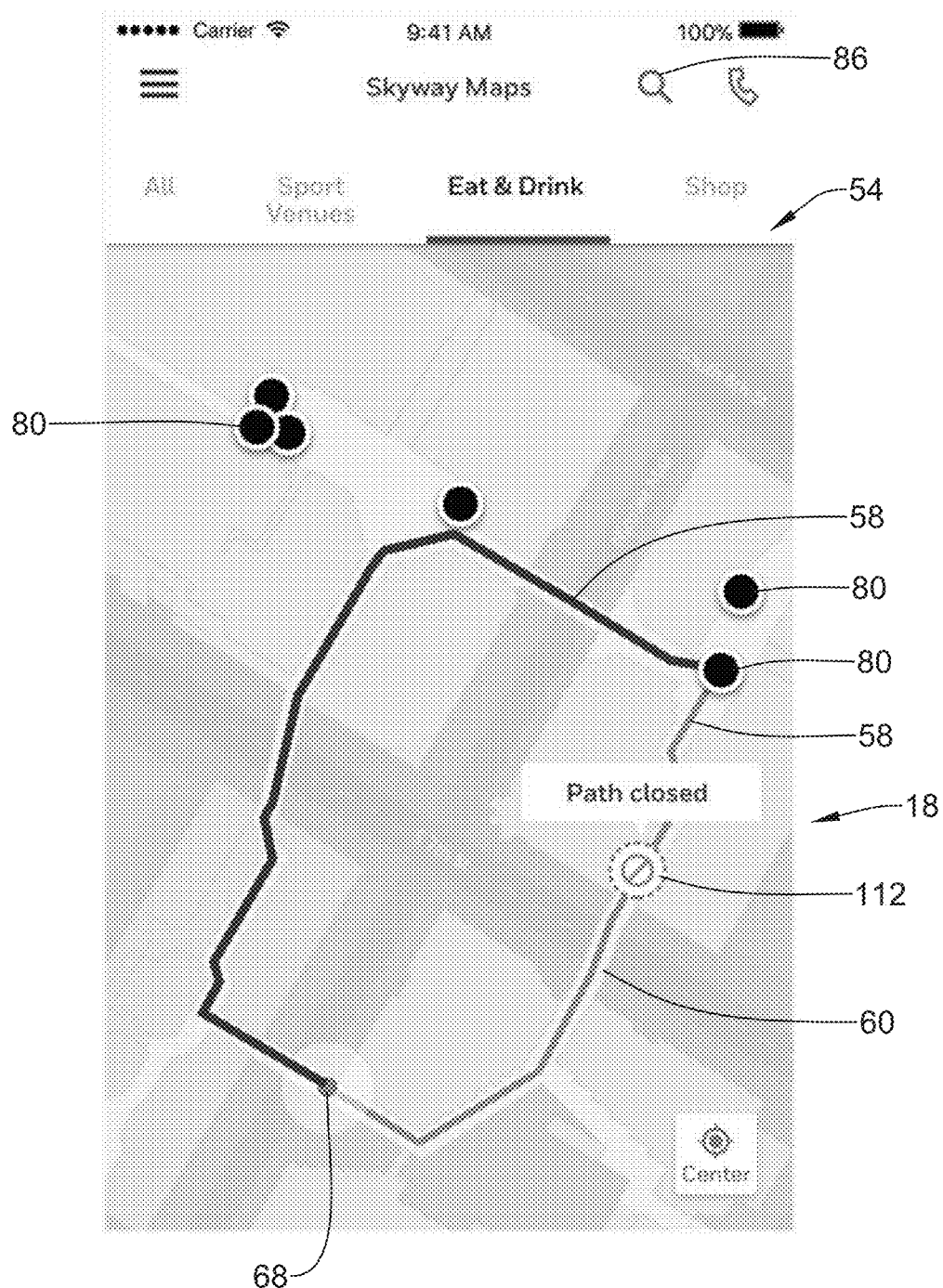
FIG. 15 is a schematic diagram of an illustrative display of a mobile application for a mobile computing device.

FIG. 15 depicts the navigational display 18 with two routes 58 displayed thereon. The route 58 depicted in gray is a route that did not meet the requirement information and data to which possible routes were compared. For example, the route 58 depicted in gray may have failed to meet the requirement information and data due to a door being locked or closed at an estimated time of traveling the route 58, as indicated by building closure information stored in the facility database 24 in the rules engine database 12 or other suitable data and information source. As depicted in FIG. 15, the route 58 in gray may include a path closed visual indicator 112 at any suitable location along or adjacent the closed route 58. In some cases, the path closed visual indicator 112 may be located at or adjacent the portion of the path that is closed. The mobile application 10 may dynamically route a user and may provide at least a second route 58 when a primary route or other route is closed or otherwise does not meet requirement information and data. In FIG. 15, an alternative route 58 is depicted in black and meets the requirement information and data to which it was compared. As such, the mobile application 10 may be configured to dynamically route users from a first location to a second location based on obtained or received requirement information and data, including facility data.

Figure 16:
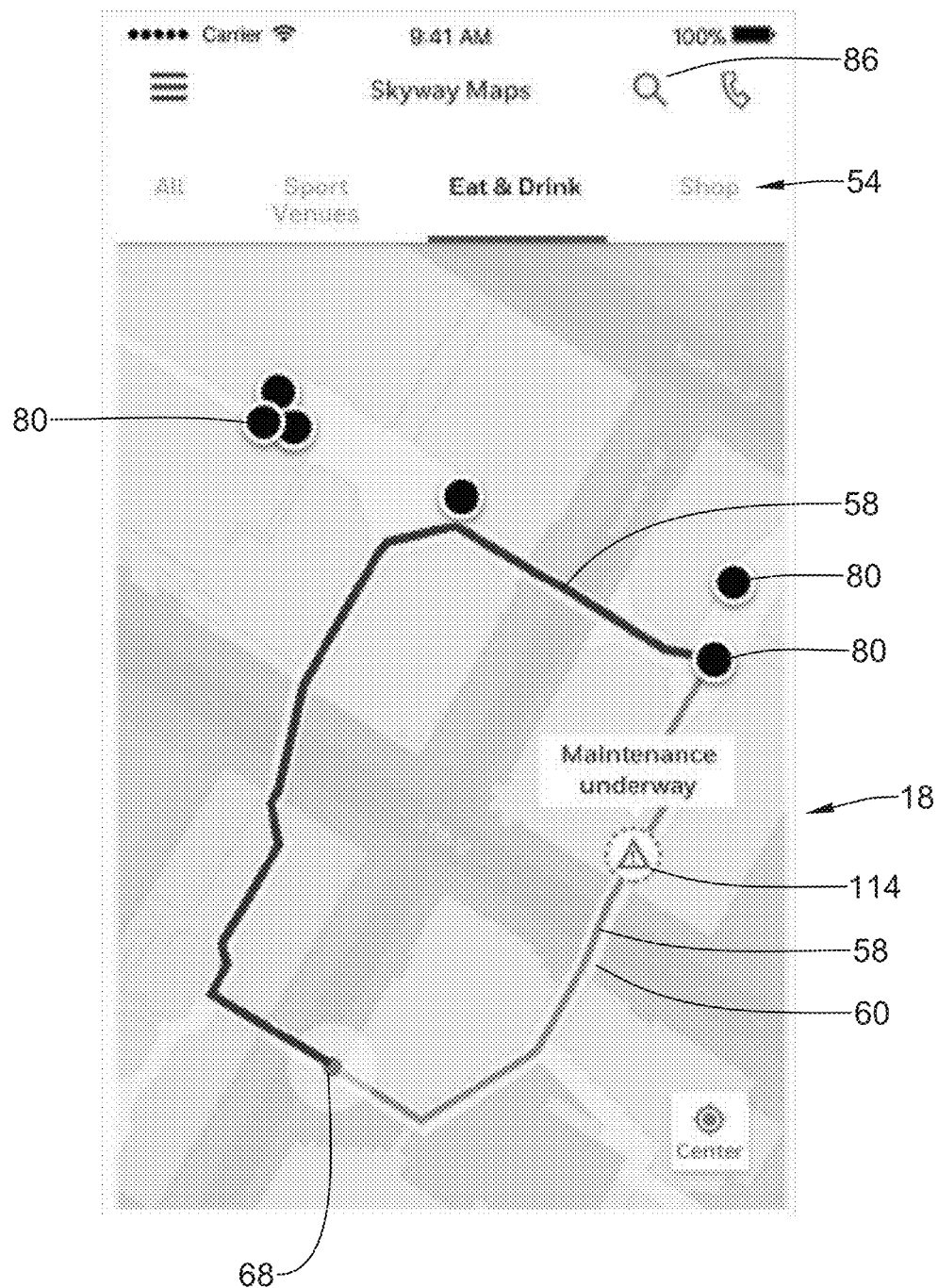
FIG. 16 is a schematic diagram of an illustrative display of a mobile application for a mobile computing device.

FIG. 16 depicts the navigational display 18 with two routes 58 displayed thereon. The route 58 depicted in gray is a route that did not meet the requirement information and data to which possible routes were compared. For example, the route 58 depicted in gray may have failed to meet the requirement information and data due to a safety incident occurring (e.g., maintenance is occurring at a location along the route, and/or other safety issue is occurring) in the skyway system 60 at an estimated time of traveling the route 58, as indicated by external source or third party information stored in the external sources database 22 in the rules engine database 12 or other suitable data and information source. As depicted in FIG. 16, the route 58 in gray may include a safety/maintenance visual indicator 114 at any suitable location along or adjacent the closed route 58. In some cases, the safety/maintenance visual indicator 114 may be located at or adjacent the portion of the path at which the safety issue or maintenance is occurring. The mobile application 10 may dynamically route a user and may provide at least a second route 58 when a primary route or other route is closed or otherwise does not meet requirement information and data. In FIG. 16, an alternative route 58 is depicted in black and meets the requirement information and data to which it was compared. As such, the mobile application may be configured to dynamically route users from a first location to a second location based on obtained or received requirement information and data, including third party and/or external source data.

In some cases, part of the indoor transit system may be closed based on a schedule. For example, some doors along the indoor transit system may be locked at 9:00 PM-5:00 AM on weekdays, and 11:00 PM-8:00 AM on weekends. The computed route may take into account the schedule such that the computed route does not traverse through those parts of the indoor transit system when they are scheduled to be closed, but may include those same parts when they are scheduled to be open.

Figure 17:
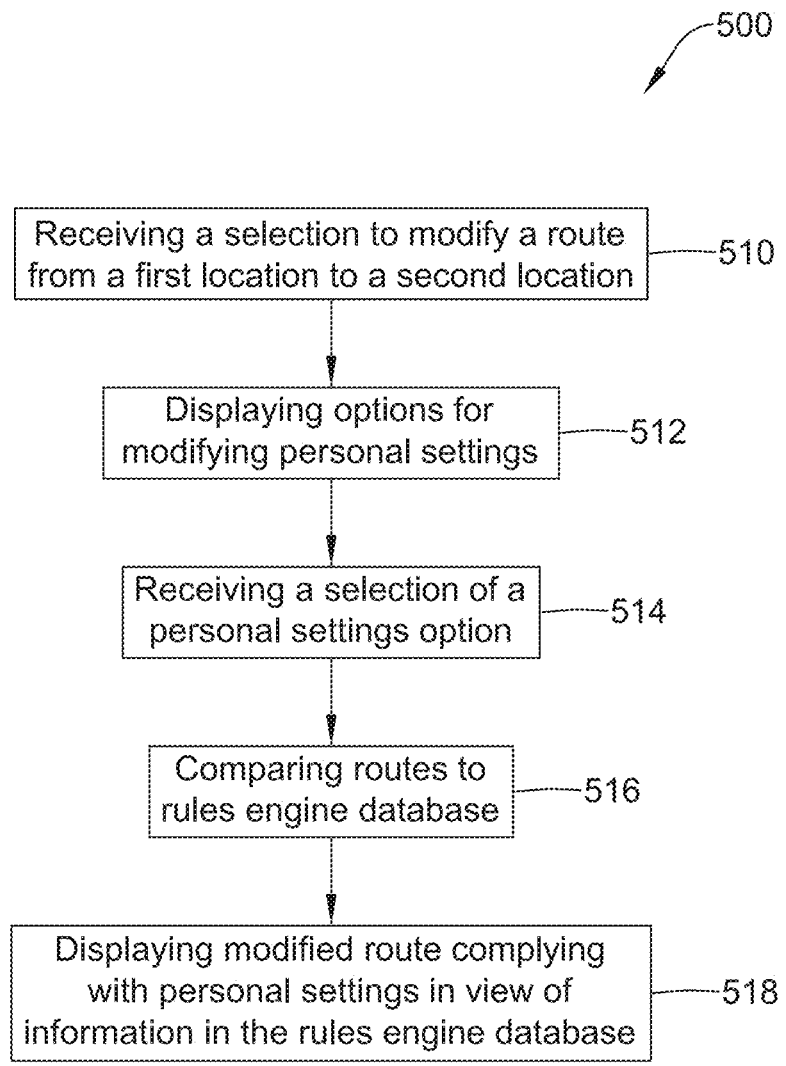
FIG. 17 is a schematic diagram of an illustrative method for modifying a route between a first location and a second location.

FIG. 17 is a schematic flow diagram of an illustrative method 500 that the mobile application 10 may follow when implemented on the computing device 26 to dynamically modify a route from a first location to a second location that is displayed on the navigational display 18. The method 500 may include receiving 510 a selection to modify a route between a first location and a second location. In some cases, a user may initiate a route modification feature of the mobile application 10 by interacting with the user interface 32 of the computing device 26. In response to receiving a selection to modify a route, options for modifying personal settings of a user may be displayed 512 to a user via the navigational display 18 or other suitable display. The method may include receiving 514 a selection of a personal setting option. Once a selection of a personal setting is received, the personal setting selection may be saved (e.g., saved permanently or for a single use in the personal settings database 20). Then, possible routes from the first location to the second location may be compared to the rules engine database 12 or other requirement information and data updated in view of the selected update to a user's personal settings for the mobile application 10. Once an updated or modified route is identified, the updated or modified route(s) that meet the updated requirement information and data in view of the selected personal settings may be displayed 518 on the navigational display 18.

Figure 18A:
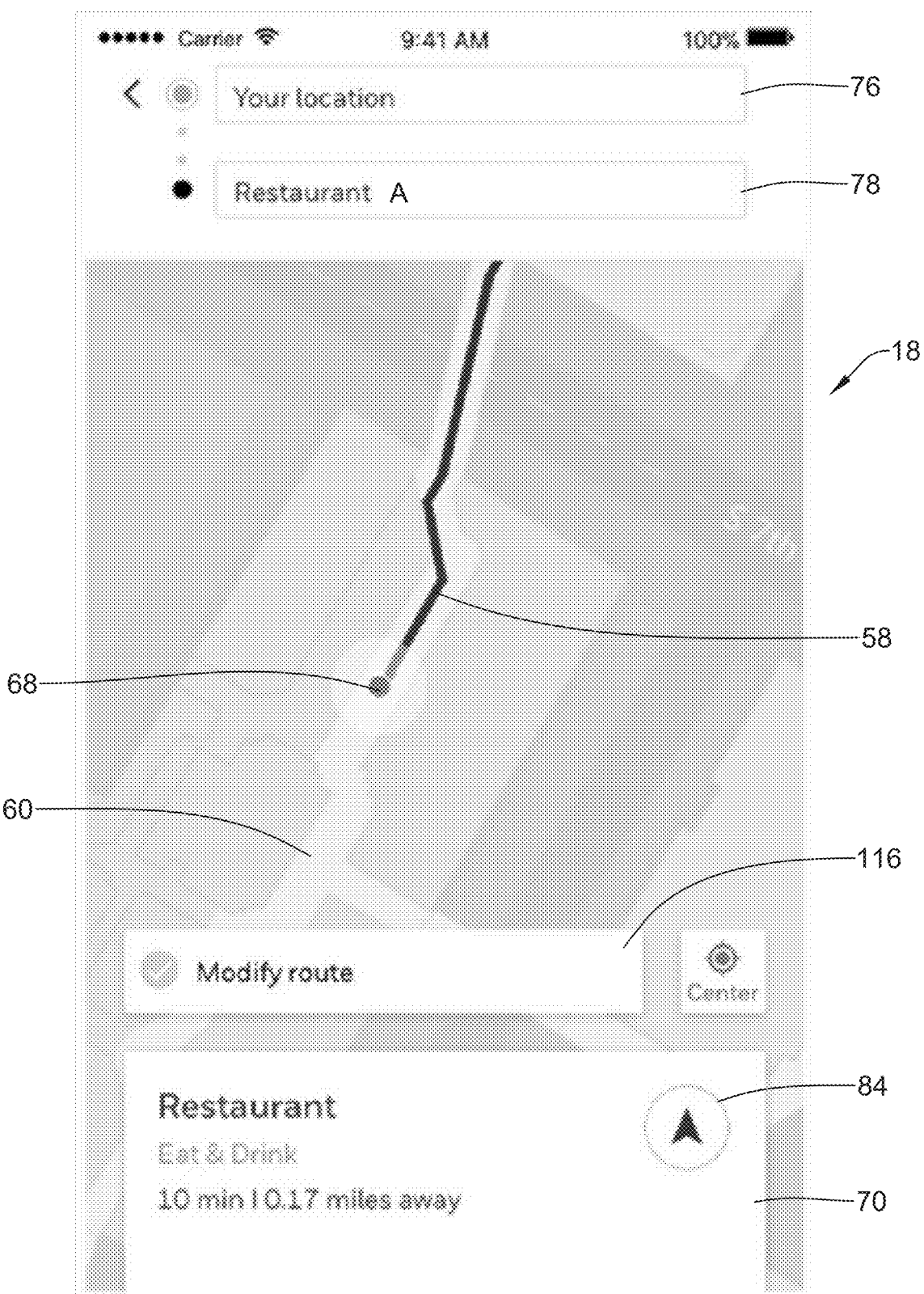
FIGS. 18A-18C are schematic diagrams of illustrative displays of a mobile application for a mobile computing device.
Figure 18B:
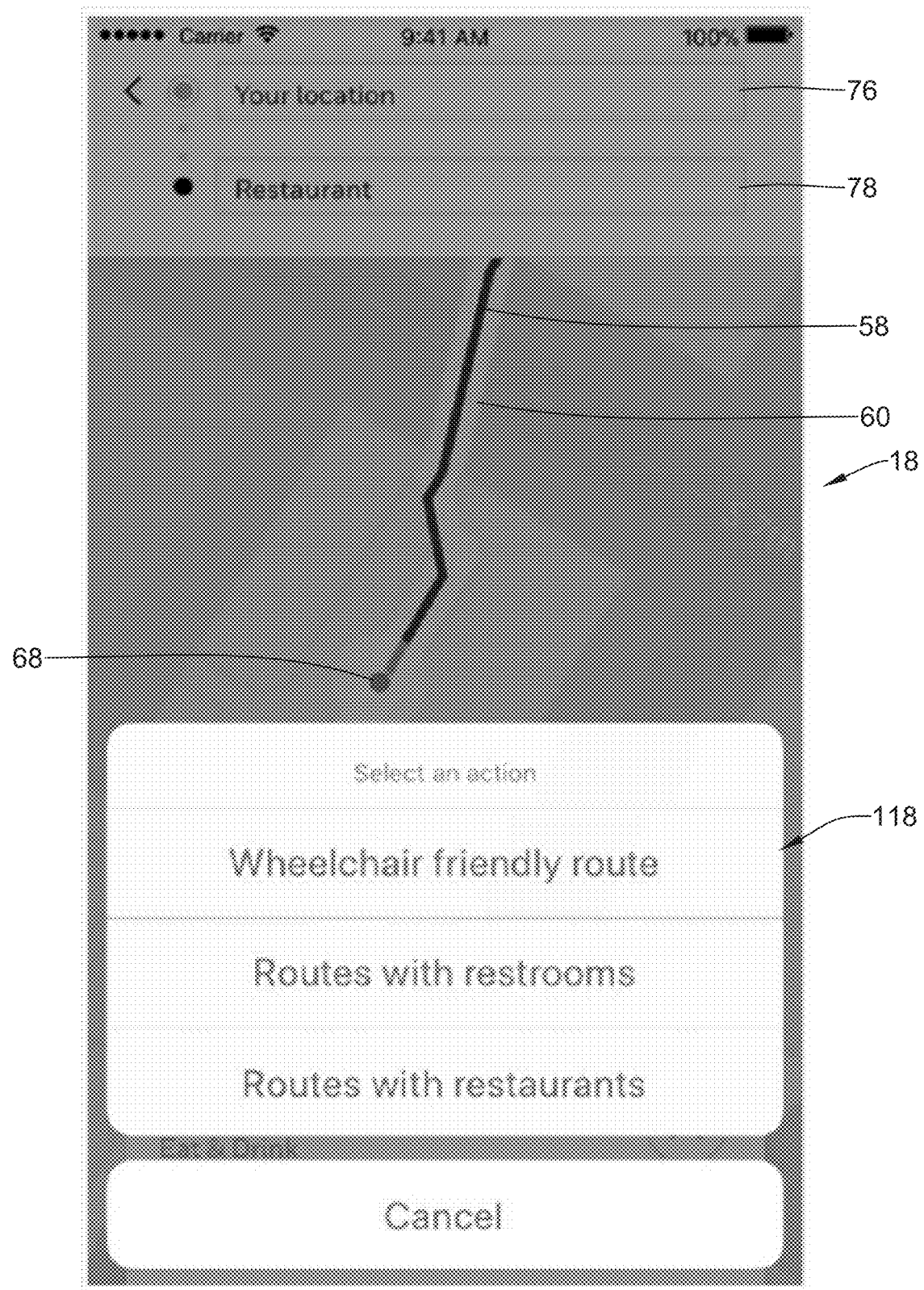
Figure 18C:
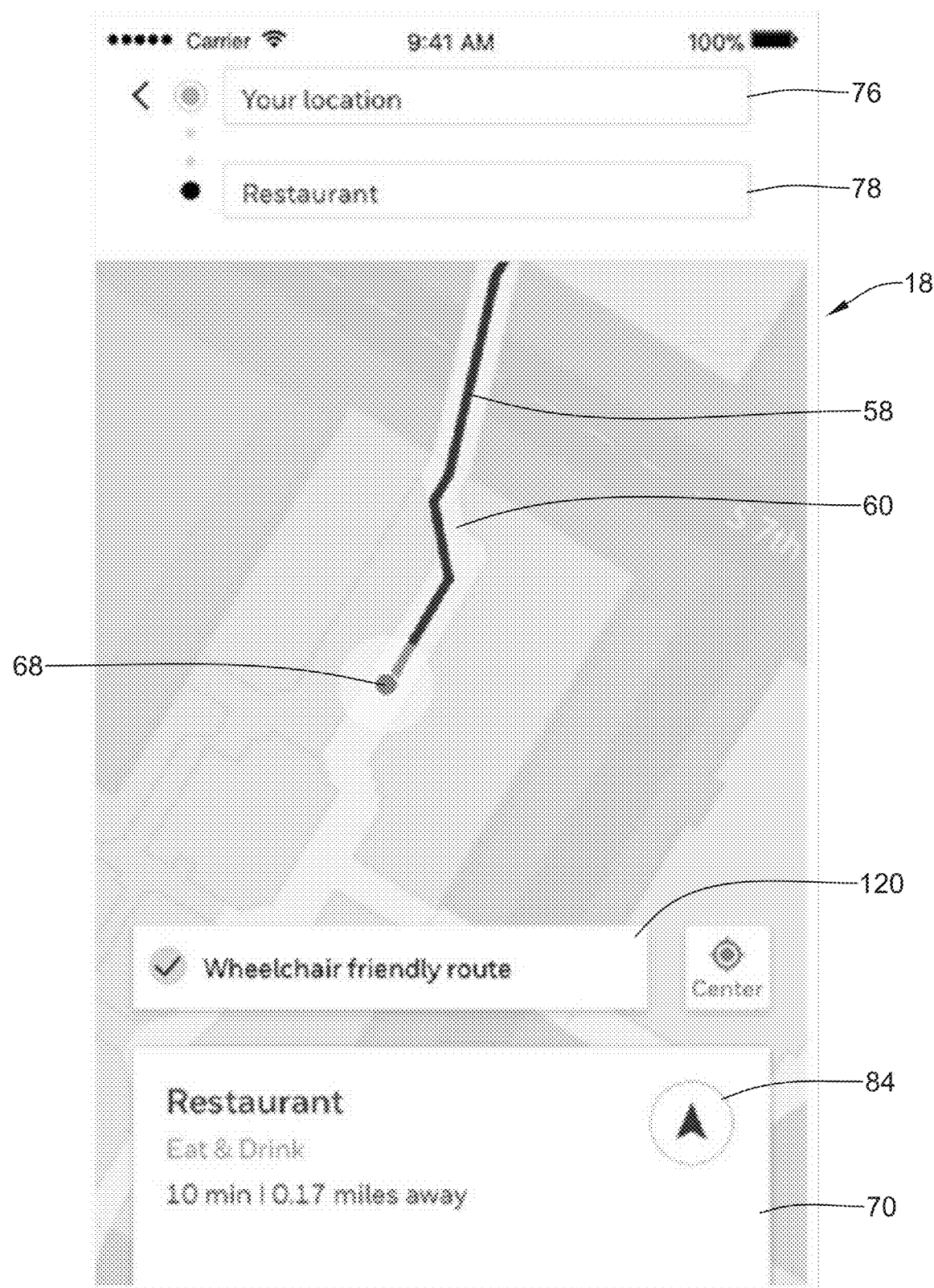

FIGS. 18A-18C depict an example of a sequence (e.g., flow) of modifying a route through the skyway system 60 based on a personal settings selection by a user. In one example, a user may update or modify its personal settings selection by changing settings for wheelchair accessible routes, locations of restrooms, locations of restaurants, and/or one or more other suitable settings.

FIG. 18A depicts a navigational display 18 with a route on a map from a first location (e.g., the current location, as entered in the starting location box 76) to a second location (e.g., Restaurant A, as entered in the destination location box 78). The navigation display 18 may also include the destination display 70 with the navigation button 84 and a distance and estimated time until arrival at the destination. Further, the navigational display 18 may include a modify route box 116 overlaid on the map depicted in the navigational display 18. When a user selects (e.g., taps or otherwise selects via the user interface 32 of the computing device 26) the modify route box 116, the navigational display 18 may display a modification options box 118, as depicted in FIG. 18B. The modification options box 118 may include a "Wheelchair friendly route" option for selecting a personal setting that requires routes to be wheelchair friendly, a "Routes with restrooms" option for selecting a personal setting that requires routes to include at least one publicly accessible restroom along the route, a "Routes with restaurants" option for selecting a personal setting that requires routes to include at least one restaurant along the route, a "Cancel" option to exit out of the modification options box 118, and/or one or more other suitable selectable options.

Selecting one or more options may result in the mobile application 10 dynamically updating a route to reflect the updated personal settings and displaying the updated route in the navigational display 18. FIG. 18C depicts an updated route in view of the updated personal setting. Although the updated route 58 depicted in FIG. 18C does not appear to be different than the route 58 in FIG. 18A, a user may know the route 58 has been updated to reflect personal setting selections because an updated personal settings box 120 may be overlaid on the map in the navigational display 18 indicating selected personal settings. In the example of FIG. 18C, the updated personal settings box 120 indicates the route 58 is a wheelchair friendly route.

Figure 19:
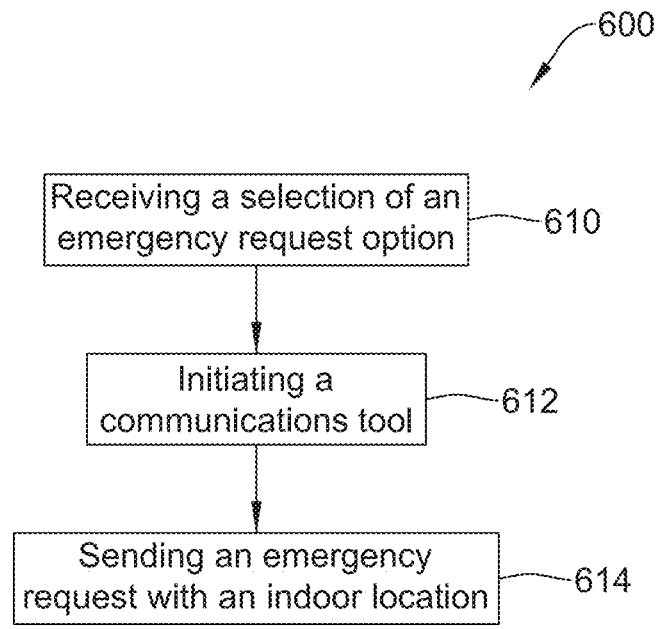
FIG. 19 is a schematic diagram of an illustrative method for requesting emergency assistance.

FIG. 19 is a schematic flow diagram of an illustrative method 600 that the mobile application 10 may follow when implemented on the computing device 26 to initiate emergency assistance. The method 600 may include receiving 610 a selection of an emergency request option. A user may be able to initiate an emergency request option in one or more manner. In one example, a user may initiate an emergency request option on the computing device 26 independent from the mobile application 10 (e.g., through selecting a button or sequence of actions to initiate emergency assistance). In another example, a user may initiate an emergency request option via the mobile application 10 (e.g., through selecting a button or a sequence of actions integrated into the mobile application). Even when an emergency request has been initiated independent of the mobile application 10, the location of the computing device 26 may be obtained from the mobile application via an API or other mechanism and sent to the appropriate emergency response providers. In response to receiving a selection of an emergency request option, the mobile application 10 may initiate 612 a communications tool. Once a communication tool has been initiated, an emergency request may be sent 614 to emergency response providers along with an indoor location, as determined through the mobile application 10. In some cases, the mobile application 10 may automatically populate an emergency response request and send it via text message or a voice call without waiting for a user to select a communication tool, but this is not required. Settings (e.g., auto populate, auto send, which communication tool to use, etc.) for the emergency request feature of the mobile application may be saved in the personal settings database 20, but this is not required.

Figure 20A:
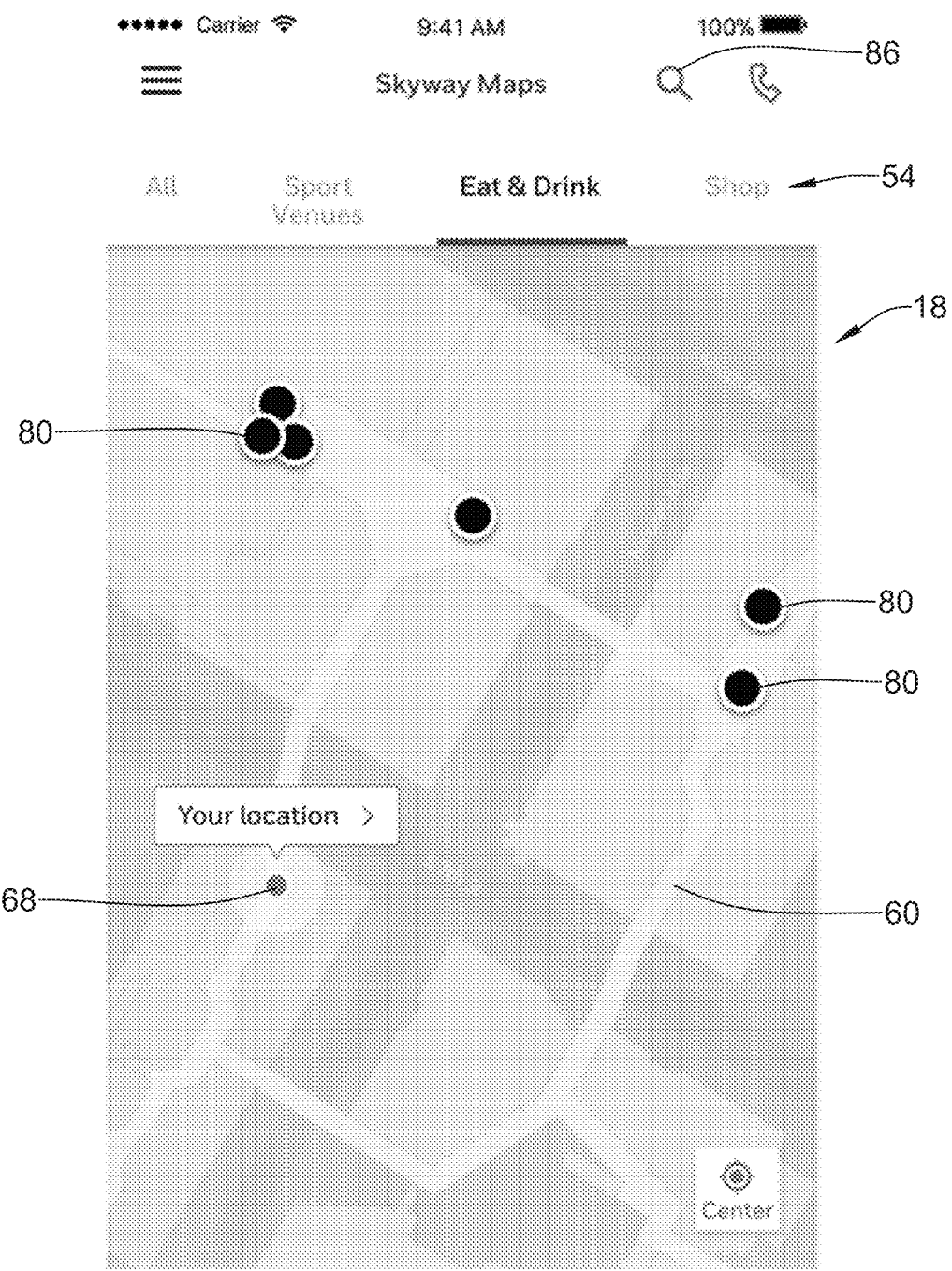
FIGS. 20A and 20B are schematic diagrams of illustrative displays of a mobile application for a mobile computing device.
Figure 20B:
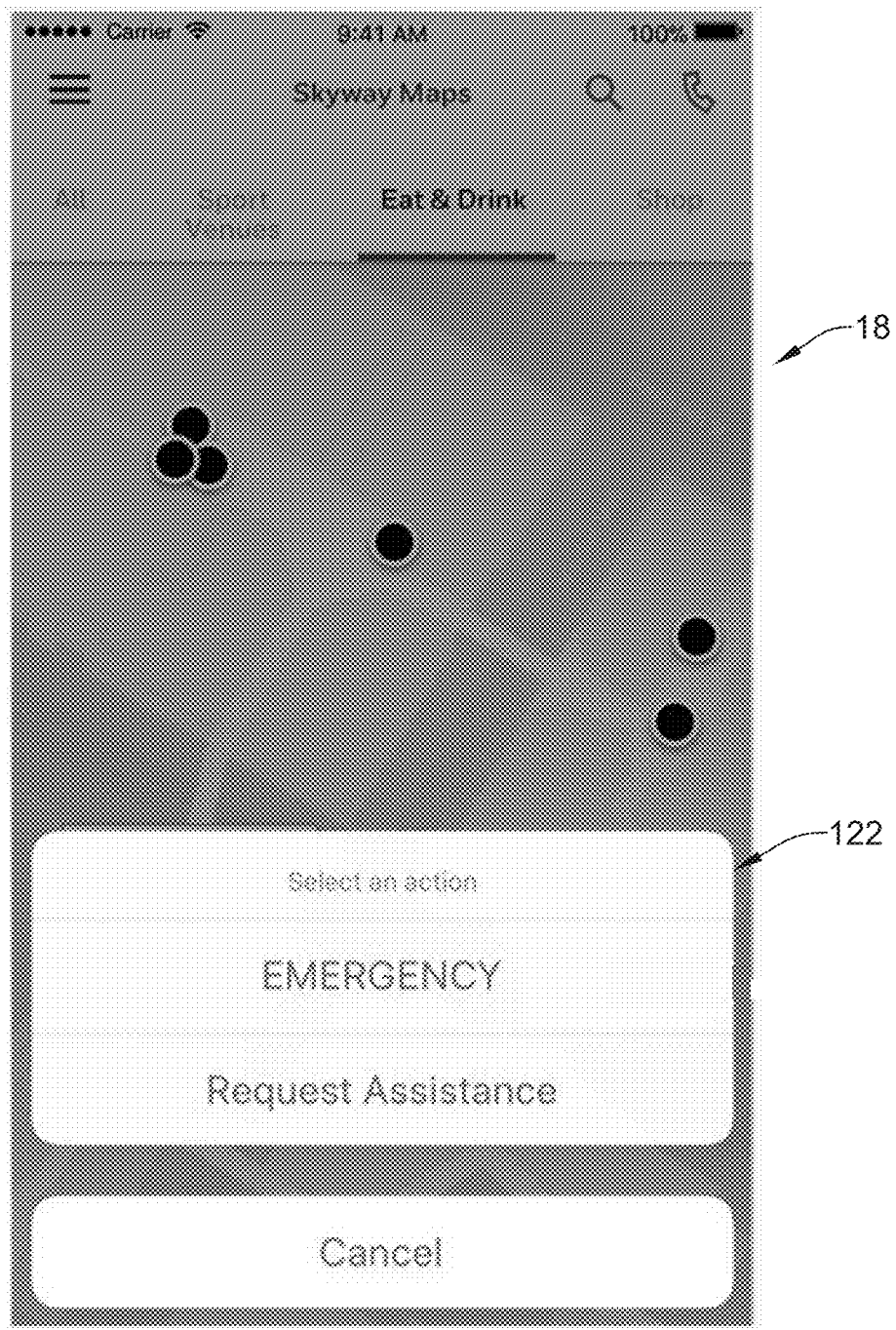

FIGS. 20A and 20B depict an example of a sequence (e.g., flow) of navigational displays 18 of the mobile application 10 that may be provided when requesting emergency assistance. FIG. 20A depicts a navigational display 18 with a map of the skyway system 60 depicted thereon and a current location visual indicator 68 on the map. A user may select an emergency request option by interacting with the user interface 32 of the computing device 26 in one or more manners. In one example, a user may select and hold a button of the user interface to initiate the emergency request option of the mobile application 10 and/or perform one or more other actions to initiate the emergency request option. Once an emergency request option has been initiated, the navigational display 18 may depict an emergency request box 122, as depicted in FIG. 20B. The emergency request box 122 may include an "EMERGENCY" option for indicating an emergency is occurring at a location of the computing device 26, a "Request assistance" option for indicating assistance is needed, but that it may not be due to an emergency situation, a "Cancel" option to exit out of the emergency request box 122, and/or one or more other suitable selectable options. In one example, when the mobile application 10 receives a selection of the "EMERGENCY" option, the mobile application 10 may initiate a communication tool and automatically send an indoor location of the computing device 26 to emergency response providers and request help, but this is not required. In another example, when the mobile application receives a selection of the "Request assistance" option, the mobile application 10 may request further input from a user including, but not limited to, input concerning what type of assistance may be needed, is assistance time sensitive, what communication tool to use to request assistance, additional information to provide with the request for assistance, and/or other types of input concerning requested assistance, but this is not required.

Figure 21:
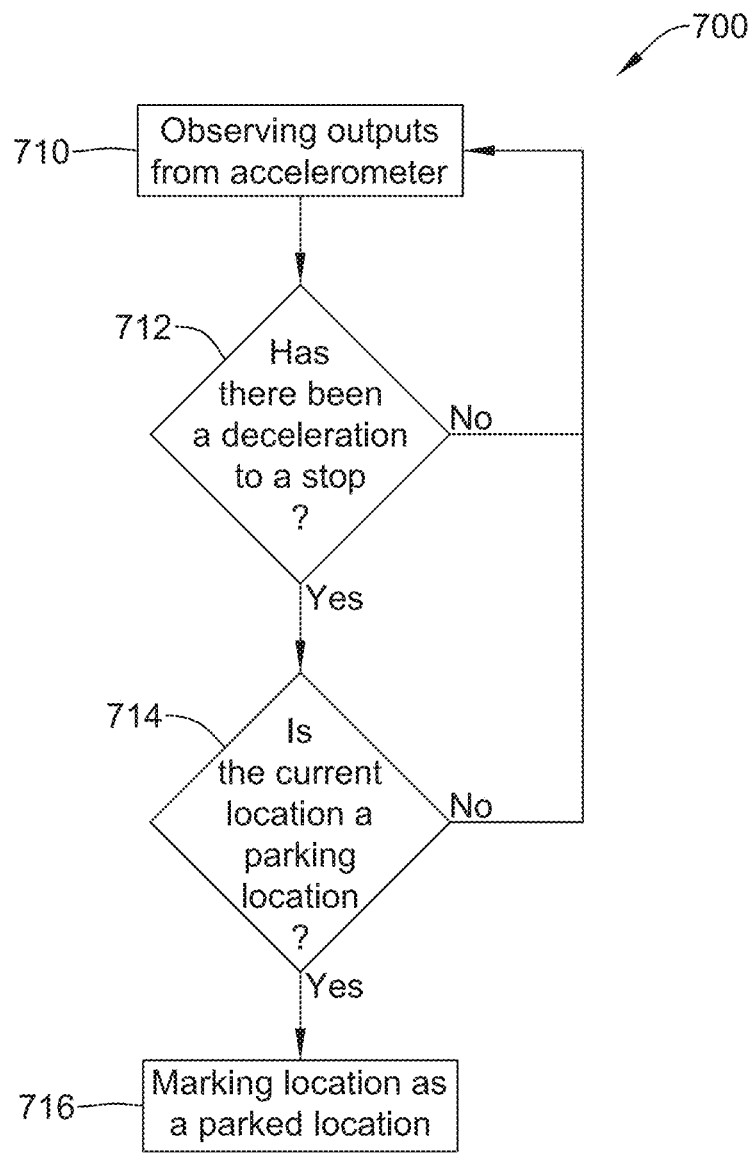
FIG. 21 is a schematic diagram of an illustrative method for identifying a parking location.

FIG. 21 is a schematic flow diagram of an illustrative method 700 that the mobile application 10 may follow when implemented on the computing device 26 to identify a location of a parked vehicle (e.g., a car, a bike, a boat, and/or other suitable means for transportation) within which the computing device 26 may be traveling. The method 700 may include the mobile application 10 observing 710 an accelerometer of the computing device 26 or other suitable accelerometer. The mobile application 10 may observe the accelerometer readings (e.g., outputs or measurements) through an API, but this is not required. As the accelerometer readings are being read and/or otherwise observed, the mobile application 10 may be computing whether 712 there has been a deceleration to a stop in the data output from the accelerometer. If the answer is no there has been no detected deceleration to a stop, the method 700 returns to observing 710 outputs from the accelerometer. If there has been a deceleration to a stop, the mobile application 10 may determine whether 714 the computing device 26 is located in a parking location. If the answer is no the computing device 26 is not located at a parking location, the method 700 may return to observing 710 outputs form the accelerometer. If there has been a deceleration to a stop and the computing device 26 is located in a parking location, the mobile application 10 may mark 716 the current location of the computing device 26 the location of a parked vehicle.

Although the method 700 describes a technique of monitoring readings from an accelerometer to determine when a vehicle has been parked, techniques using additional or alternative measurements may be utilized by the mobile application 10 to determine when a vehicle has been parked. In one example, in addition to or as an alternative to monitoring accelerometer readings, GPS signals, cellular signals, WiFi signals, and/or other signals may be monitored over time to facilitate determining when a computing device 26 is in a vehicle and when the vehicle has been parked. In another example, in addition to or as an alternative to monitoring accelerometer readings, the mobile application 10 may identify a vehicle has been parked by interfacing with a third-party application (e.g., a third party application that obtains GPS signals, Cellular signals, WiFi signals, makes a parked vehicle determination, and/or otherwise contains information and/or data related to movement of a vehicle) and receiving or obtaining an indication from the third-party application that a vehicle in which the computing device 26 may be traveling has parked. Other techniques are contemplated.

The mobile application 10 may identify a parking location via sensed beacons 42 and by comparing sensed beacon data to facility data in a facility database 24. Additionally or alternatively, the mobile application 10 communicate with other mobile applications or third party mobile applications (e.g., applications that provide a different function than the mobile application 10, even if the applications are provided by the same entity as provides the mobile application 10) via an API or other suitable communication mechanism to identify a parking location and/or for other suitable purposes.

The process of detecting when a vehicle is parked and/or a location of a parked vehicle may be performed in the background by the mobile application 10, without initiation by a user. Alternatively, a user may initiate a vehicle park monitoring feature in the mobile application 10 (e.g., in a personal settings database and/or at one or more other locations). In some cases, the mobile application 10 may continually monitor readings from the accelerometer and initiate a process for detecting a location of a parked vehicle (e.g., the method 700 or other suitable method for detecting a location of a parked vehicle) in response to detecting an increase in acceleration of the computing device 26 and/or other pattern in accelerometer readings that may be associated with the computing device 26 being in vehicle. Alternatively or in addition, the mobile application 10 may continually monitor third-party apps for indications that the computing device 26 may be in a moving vehicle and initiate a process for detecting a location of a parked vehicle in response to receiving or obtaining an indication that the computing device 26 may be in a moving vehicle.

Figure 22:
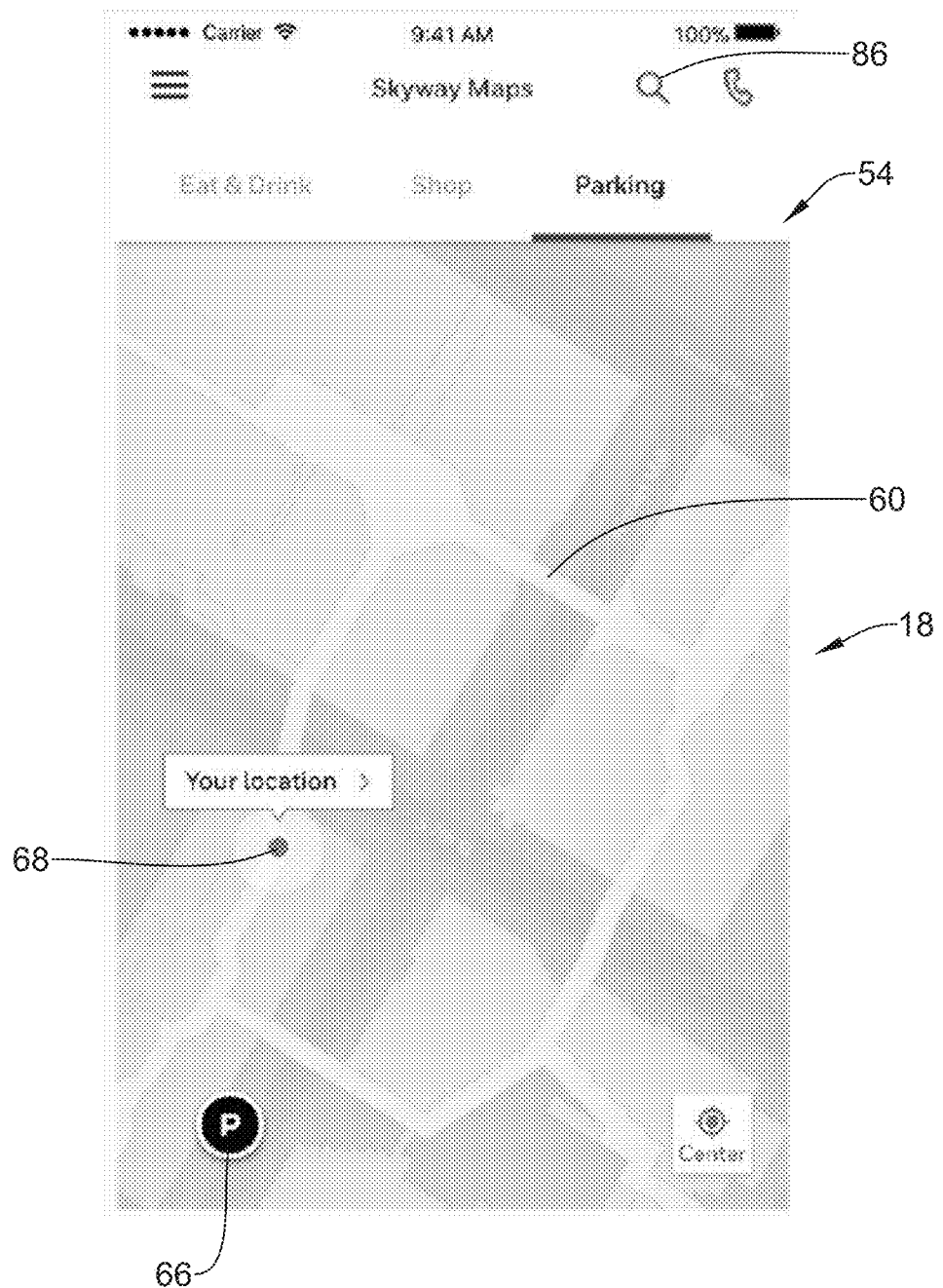
FIG. 22 is a schematic diagram of an illustrative display of a mobile application for a mobile computing device.

FIG. 22 depicts the navigational display 18 with a map of the skyway system 60 and a current location of the computing device 26 indicated by the current location visual indicator 68. Additionally, the navigational display 18 may display the location of a parked vehicle as indicated by the parking visual indicator 66. In some cases, the parking visual indicator 66 indicating a location of a parked vehicle may only be visible when parking is selected from the scrollable list 54 and in other cases, the parking visual indicator 66 indicating a location of a parked vehicle may be displayed on the navigational display 18 without parking being selected from the scrollable list 54. Further, although the parking visual indicator 66 indicating a location of a parked vehicle are depicted in the figures as a same element or configuration as that indicating a parking location, this is not required. If the parking visual indicators 66 indicating a location of a parked vehicle and the parking visual indicators 66 indicating a parking location are the same shape, the respective parking visual indicators 66 may have different features or indicators (e.g., different colors, added symbols, added shapes, etc.) to indicate their separate meanings to users. Alternatively or in addition, the parking visual indicators 66 indicating a location of a parked vehicle and the parking visual indicators 66 indicating a parking location may be different shapes or distinct objects.

Figure 23:
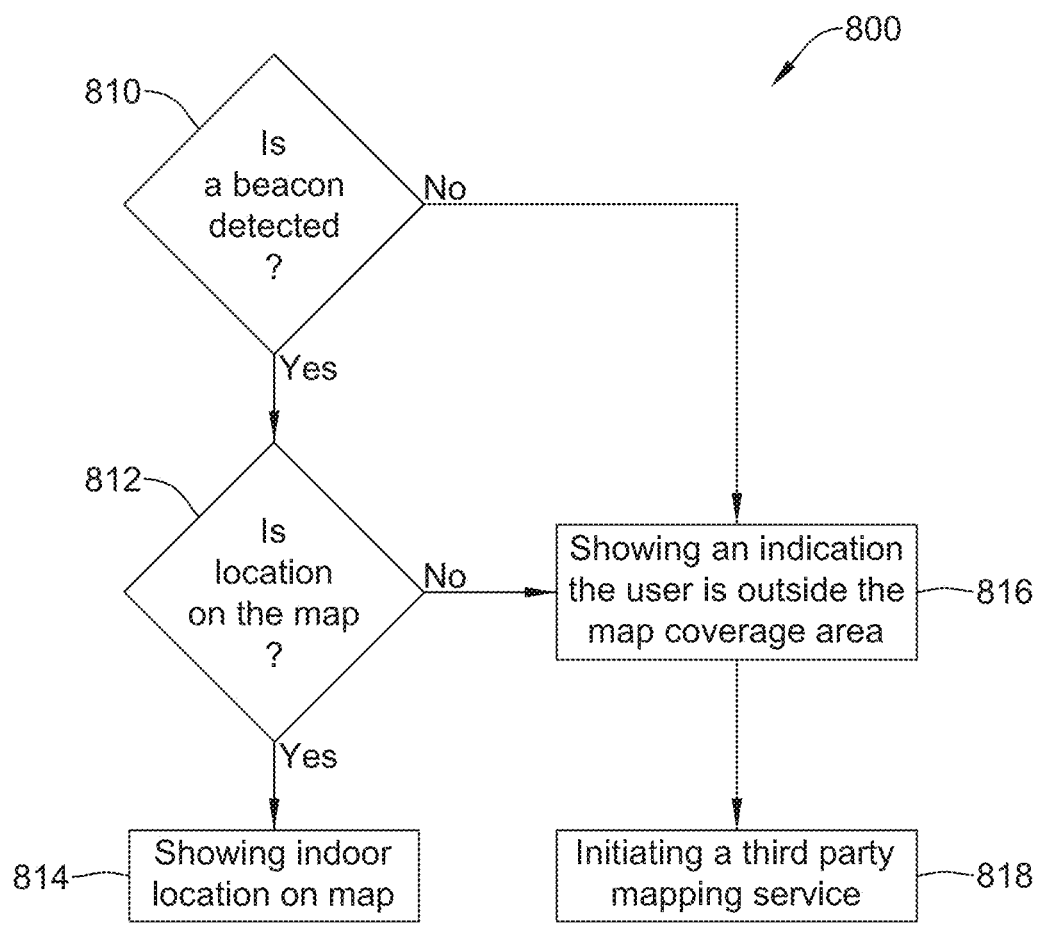
FIG. 23 is a schematic diagram of an illustrative method for switching between mobile mapping applications.

FIG. 23 is a schematic flow diagram of an illustrative method 800 that the mobile application 10 may follow when implemented on the computing device 26 to switch between an indoor map and an outdoor map (e.g. third party mapping application). In some cases, a single application may have access to an indoor map and an outdoor map. In other applications, one application may have access to the indoor map and another application may have access to an outdoor map. In some cases, the mobile application 10 may create routes that extend between the indoor map and the outdoor map. In some cases, the mobile application 10 may be in communication with an outdoor mapping application (e.g. Google maps) via an API or other suitable mechanism. The mobile application 10 may be configured to detect when the computing device 26 is outside the indoor transit system (e.g. not detecting beacons 42 of the indoor transit system). When the computing device 26 is outside the indoor transit system, the mobile application 10 may automatically reference an outdoor map and/or initiate an outdoor mapping application. When the mobile application 10 detects it is inside the indoor transit system, the mobile application 10 may automatically reference the indoor map and/or initiate an indoor mapping application.

The method 800 may include determining whether a beacon 42 is detected by determining if the computing device 26 has received a signal from or is in connection with a beacon 42 of an indoor transit system, as shown at 810. When a beacon 42 is detected, the method 800 may include determining whether the location of the computing device 26 is in a mapped region of the indoor transit system. Sometimes, maps may only be available for part of the indoor transit system. In some cases, a location of the computing device 26 may be determined based on the detected beacon 42 and/or the signal strength from the detected beacon(s) (e.g. using the location identification sub-system 14 or other suitable system). When the beacon 42 is detected and the location of the computing device 26 is located in a mapped region, the method 800 may include depicting or showing 814 a determined indoor location of the computing device 26 on the indoor map on the navigational display 18 using the mobile application.

When it is determined that a beacon 42 has not been detected or a location of the computing device 26 relative to the detected beacon 42 is not located on the indoor map, an indication the that user is outside a map coverage area may be shown, as shown at 816 (e.g., shown in the navigational display 18 of the mobile application 10). When showing the indication that the user is outside of a coverage area, an outdoor map may be automatically referenced and/or an outdoor (e.g., a third-party) mapping service application may be initiated as shown at 818.

In some cases, switching between the indoor map and an outdoor map, or between an indoor mapping service (e.g., the mobile application 10) and an outdoor mapping service (e.g., third-party mapping applications displaying an outdoor map), may be automatically performed by the mobile application 10 (e.g., using the location and identification sub-system 14) without initiation by a user. In one example, a user may exit a mapped indoor area or interior of one or more structures while following an indoor route on the mobile application 10 and as the user exits the network of beacons (e.g., exits the indoor transit system, such as the skyway system 60), the mobile application 10 may automatically reference an outdoor map and/or initiate an outdoor mapping service to the same destination that the route in the mobile application 10 was directing the user, and cause an outdoor map to display a current location of the computing device 26. Similarly, when a user is following a route on an outdoor mapping service, the mobile application 10 may recognize a computing device 26 on which the mobile application 10 is located has entered a network of beacons 42, and may then automatically reference an indoor map and provide a route to the same destination the outdoor mapping service was taking the user. In another example, when a user is following a route on an outdoor mapping service, the mobile application 10 may indicate a closest entry point to a mapped indoor area or interior of one or more structures. In some cases, the mobile application may utilize information or data (e.g., weather data or other suitable data) to indicate the user should be routed inside at a particular location or entry point due to a street riot, a change in weather conditions, or other undesirable condition outdoors.

Figure 24:
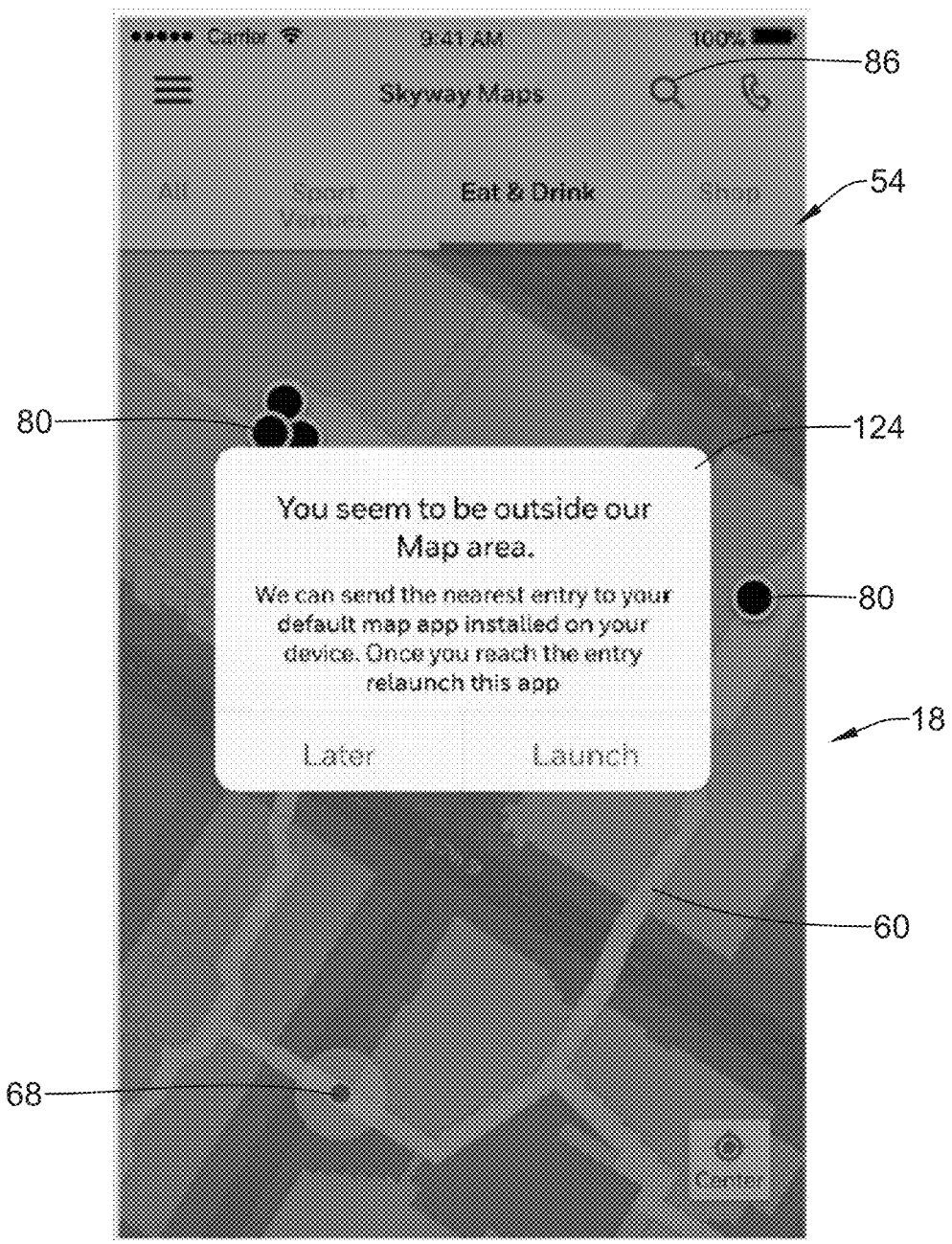
FIG. 24 is a schematic diagram of an illustrative display of a mobile application for a mobile computing device.

FIG. 24 depicts the navigational display 18 with a map of the skyway system 60 and a current location of the computing device 26 indicated by the current location visual indicator 68. Additionally, the navigational display 18 may include an outside area box 124 indicating to a user that the computing device 26 is outside of a network of beacons 42. In some cases, the outside area box 124 may include a text description such as "YOU SEEM TO BE OUTSIDE OUR MAP AREA" and "We can send the nearest entry to your default map app installed on your device. Once you reach the entry point, relaunch this app.", but other text descriptions may be utilized. Although FIG. 24 depicts the current location visual indicator 68 in the skyway system 60, such a location may be a last mapped location of the computing device 26. In some cases, the mobile application 10 may be configured to depict a location of a computing device 26 or user on its map using other location techniques (e.g., GPS, cellular triangulation, etc.) when the computing device 26 has been determined to be outside of the network of beacons 42.

Figure 25A:
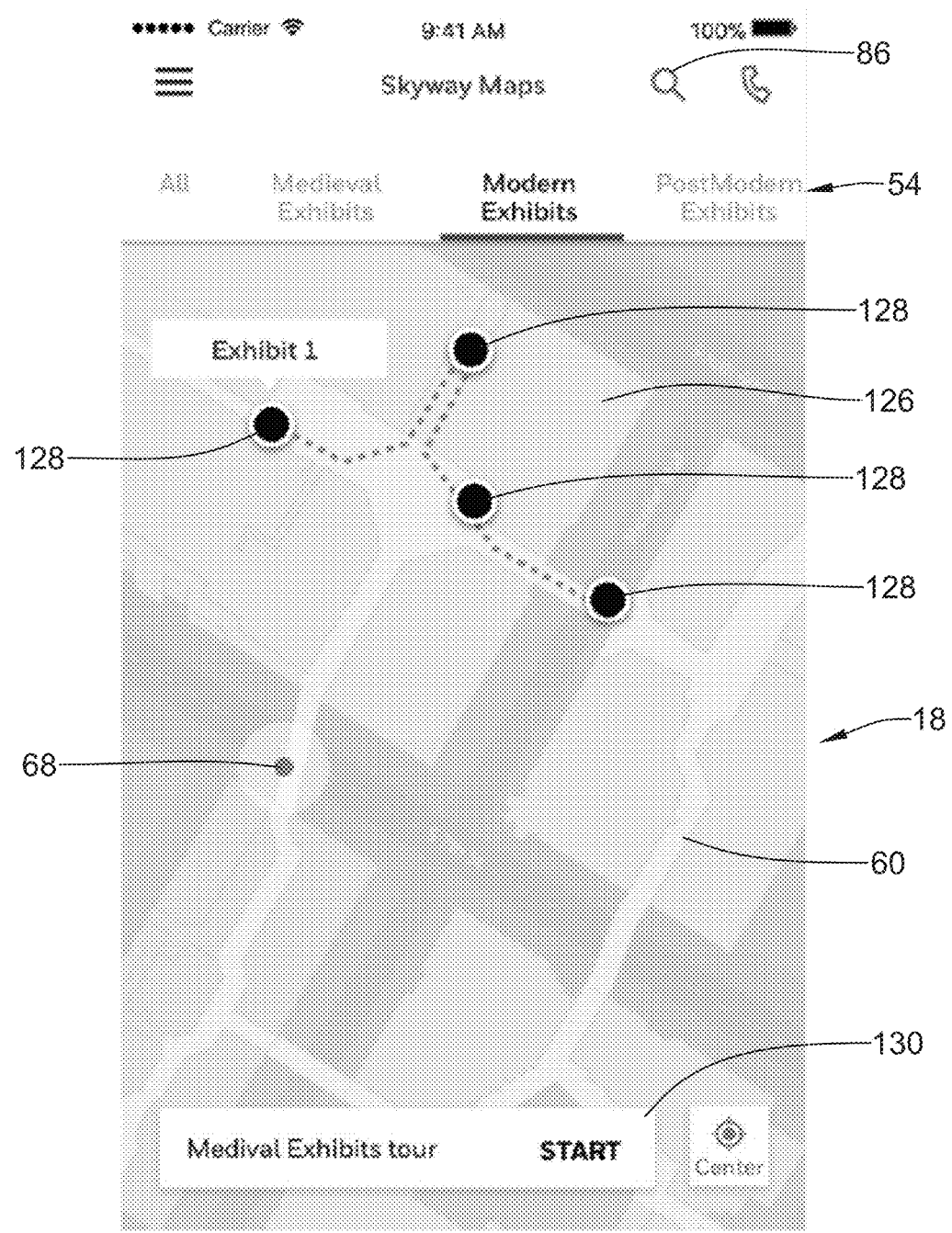
FIGS. 25A and 25B are schematic diagrams of illustrative displays of a mobile application for a mobile computing device.
Figure 25B:
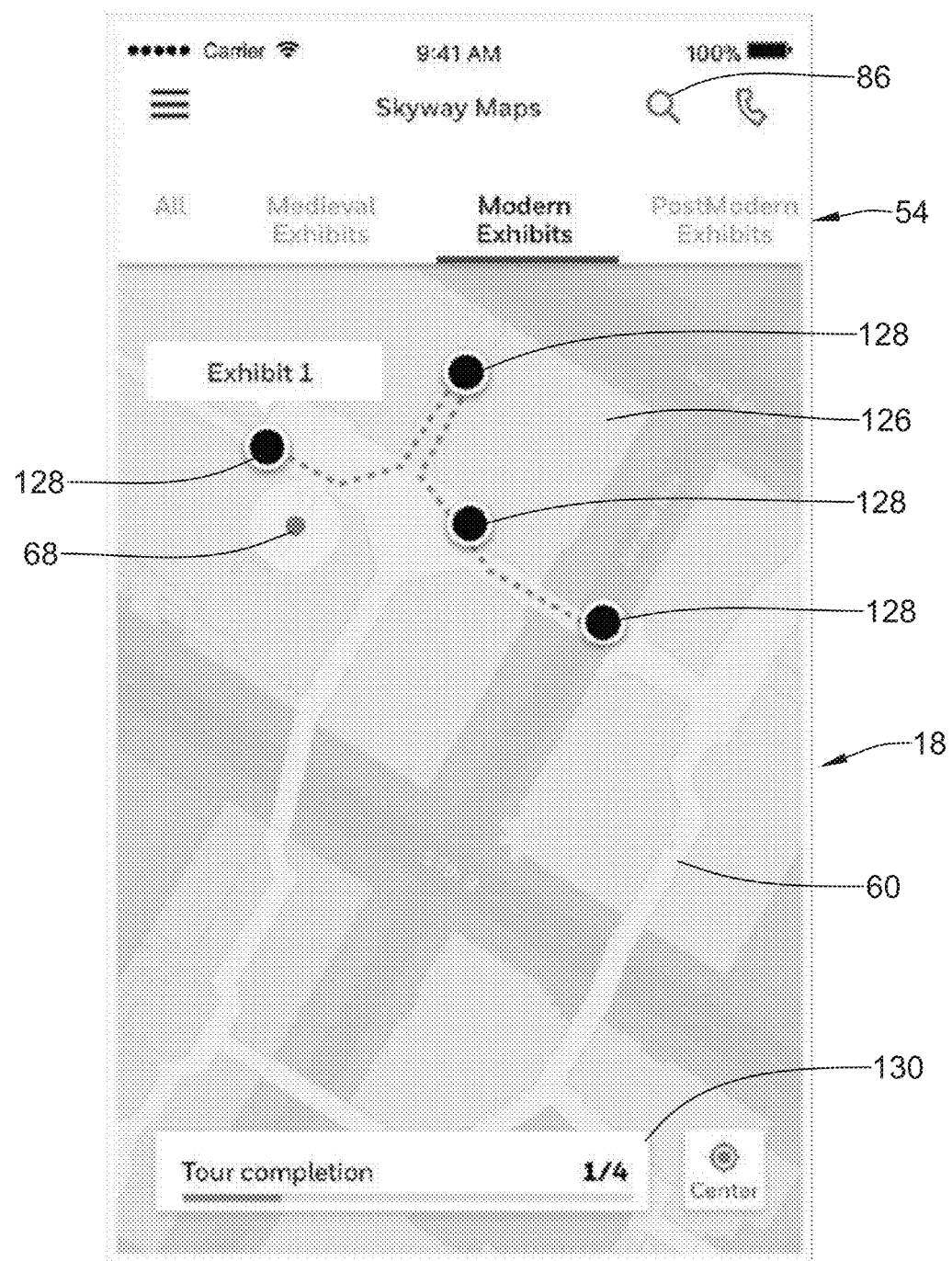

FIGS. 25A and 25B depict an example of a sequence (e.g., flow) of following an exhibit or tour through an indoor area or interior of one or more structures. Further, the navigational display 18 may depict a tour through an indoor area or interior of one or more structures that may be set up as a sequence (e.g., a series) of places of interest, such as exhibits for a museum, guided tours, or orientations of a building (e.g., for new hires of an organization), etc. A user may scroll through the scrollable list 54 to access a desired exhibit or tour with which to participate.

FIG. 25A depicts the navigational display 18 with a map of the skyway system 60 and a current location of the computing device 26 indicated by the current location visual indicator 68. Further, FIG. 25A depicts the current location visual indicator 68 near a museum 126 that includes a plurality of exhibits as indicated by exhibit visual indicators 128 connected by a path (e.g., gray dashes connecting the exhibit visual indicators 128 and/or other suitable paths in the navigational display 18). When a user passes by an exhibit or a place of interest in a tour (e.g., like a checkpoint), the navigational display 18 may be updated accordingly. In some cases, when a user passes by an exhibit or place of interest in a tour, a textual description (e.g., "Exhibit 1" or other suitable textual description) may be displayed on the navigational display 18 based on information and data in the rules engine database and/or other suitable information and data. In some cases, the navigational display 18 may include an exhibit description box 130 that may be selected by a user (e.g., by tapping on the box and/or interacting with the user interface 32 of the computing device 26) to begin the tour and/or exhibit. In some cases, a title of the exhibit and/or tour may be provided in the exhibit description box 130 (e.g., "Medieval Exhibits Tour", as depicted in FIG. 25A, or other suitable title or description).

FIG. 25B depicts a navigational display 18 similar to that in FIG. 25A, but with the current location visual indicator 68 within the museum 126 adjacent Exhibit 1. As the computing device traverses from exhibit-to-exhibit or place of interest to place of interest, an exhibit counter or tour counter in the exhibit description box 130 may provide a visual indication of where the computing device 26 and associated user is at with respect to the overall exhibit and/or tour. For example, in FIG. 25B, the positioning of the current location visual indicator is one fourth (¼) of the way done with the exhibit/tour. Such a feature may facilitate a user identifying how long an exhibit or tour might take to complete.

A recap may be provided in the following. The present disclosure generally relates to navigating an indoor area such as an indoor transit system, using a computing device. In one example configuration a method of navigating an indoor transit system may be provided. The indoor transit system may include a network of indoor pathways, a plurality of access points for entering/exiting the indoor transit system, and a plurality of beacons distributed at designated locations throughout the indoor transit system. The method may include detecting one or more of the beacons of the indoor transit system using a mobile computing device and determining when the mobile computing device is inside the indoor transit system based on the detected one or more of the beacons. The method may further include identifying the location of the mobile computing device within the indoor transit system based on which of the plurality of beacons are detected by the mobile computing device and displaying an indoor map of at least part of the indoor transit system on a user interface of the mobile computing device, including the identified location of the mobile computing device. Further, the method may include receiving a destination accessible by the indoor transit system via the user interface of the mobile computing device, computing a route through the indoor transit system to the destination, and displaying on the user interface of the mobile computing device the computed route on the indoor map. In some cases, the indoor transit system comprises one or more of a skyway system and a subway system.

The destination may be received as a street address. The destination may be received as a business name.

The indoor transit system may be situated in a geographic region. The outdoor map may be defined for the geographic region and the outdoor map may identify the geographic location of at least some of the plurality of access points of the indoor transit system.

Switching from displaying the indoor map of at least part of the indoor transit system on the user interface of the mobile computing device to displaying the outdoor map may occur when the mobile computing device determines that the mobile computing device is no longer inside the indoor transit system based on the detected one or more of the beacons.

The route may extend along at least part of the indoor transit system and at least part of the outdoor map. The route may extend from inside the indoor transit system, through an access point to outside of the indoor transit system, along at least part of the outdoor map, through a different access point of the indoor transit system, and back into the indoor transit system to the destination. The route may extend from a location outside of the indoor transit system, along at least part of the outdoor map, through an access point of the indoor transit system and back into the indoor transit system to the destination. The route may extend from a location outside of the indoor transit system, along at least part of the outdoor map, through an access point of the indoor transit system and back into the indoor transit system to the destination.

The methods discussed herein may include displaying turn-by-turn instructions as the mobile computing device traverses the computed route.

The destination may be received as a nearest bathroom. The bathroom nearest to the identified location of the mobile computing device may be determined and entered as the destination.

At least part of the indoor transit system may be closed based on a schedule. The computed route may take into account the schedule such that the computed route does not traverse through those parts of the indoor transit system when they are scheduled to be closed but may include those same parts when they are scheduled to be open.

Computing the route through the indoor transit system to the destination may include checking to see if a wheelchair accessible route setting is set, and if so, computing the route through the indoor transit system to the destination using only wheelchair accessible parts of the indoor transit system.

In another example configuration, a method of navigating an indoor transit system may be provided. The indoor transit system may include a network of indoor pathways, a plurality of access points for entering/exiting the indoor transit system, and a plurality of beacons distributed at designated locations throughout the indoor transit system. The indoor transit system may be situated in a geographic region, where an outdoor map is defined for the geographic region and the outdoor map identifies the geographic location of at least some of the plurality of access points of the indoor transit system. The method may comprise detecting one or more of the beacons of the indoor transit system using a mobile computing device and determining when the mobile computing device is inside the indoor transit system or outside of the indoor transit system based on the detected one or more of the beacons. When it is determined that the mobile computing device is inside of the indoor transit system, the method may include identifying the location of the mobile computing device within the indoor transit system based on which of the plurality of beacons are detected by the mobile computing device and displaying an indoor map of at least part of the indoor transit system on a user interface of the mobile computing device, including the identified location of the mobile computing device. When it is determined that the mobile computing device is outside of the indoor transit system, the method may include identifying the location of the mobile computing device in the geographic region based on location services of the mobile computing device and displaying the outdoor map of at least part of the geographic region on the user interface of the mobile computing device, including the identified location of the mobile computing device. The method may further include receiving a destination accessible using at least part of the indoor transit system via the user interface of the mobile computing device, computing a route to the destination that includes at least part of the indoor transit system, and displaying on the user interface of the mobile computing device the computed route.

The methods disclosed herein may include switching from displaying the indoor map of at least part of the indoor transit system on the user interface of the mobile computing device to displaying the outdoor map when the mobile computing device determines that the mobile computing device is no longer inside the indoor transit system based on the detected one or more of the beacons.

The route may extend along at least part of the indoor transit system and at least part of the outdoor map. The route may extend from inside the indoor transit system, through an access point to outside of the indoor transit system, along at least part of the outdoor map, through a different access point of the indoor transit system, and back into the indoor transit system to the destination. The route extends from a location outside of the indoor transit system, along at least part of the outdoor map, through an access point of the indoor transit system and back into the indoor transit system to the destination. The route extends from a location outside of the indoor transit system, along at least part of the outdoor map, through an access point of the indoor transit system and back into the indoor transit system to the destination.

In further example configuration, a computer readable medium having stored thereon in a non-transitory state a program code for use by a mobile computing device connectable to a network may be provided, where the program code may cause the mobile computing device to execute a method of navigating one or more of a skyway system or a subway system. The method may include detecting one or more of a plurality of beacons of the indoor transit system by the mobile computing device and determine when the mobile computing device is inside the indoor transit system based on the detected one or more of the beacons. The method may further include identifying the location of the mobile computing device within the indoor transit system based on which of the plurality of beacons are detected by the mobile computing device and displaying an indoor map of at least part of the indoor transit system on a user interface of the mobile computing device, including the identified location of the mobile computing device. Further, the method may include receiving a destination accessible by the indoor transit system via the user interface of the mobile computing device, computing a route through the indoor transit system to the destination, and displaying on the user interface of the mobile computing device the computed route on the indoor map.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, inventive subject matter lies in less than all features of a single disclosed embodiment.

What is claimed is:

1. A mobile device comprising:
   a wireless transceiver for communicating with a remote device over a network;
   a first location service for determining a location of the mobile device;
   a second location service for determining the location of the mobile device;
   a user interface including a display;
   a controller operatively coupled to the wireless transceiver, the user interface, the first location service and the second location service, the controller configured to:
   receive via the wireless transceiver a route from a first location to a second location, wherein the route traverses from an interior of a first interior space, through an exit point of the first interior space to an outdoor space, through at least part of the outdoor space to an entry point of a second interior space, and into the second interior space;

identify the location of the mobile device along at least part of the route that traverses the first interior space using the first location service;

identify the location of the mobile device along at least part of the route that traverses the outdoor space using the second location service;

identify the location of the mobile device along at least part of the route that traverses the second interior space using the first location service; and display on the display of the user interface of the mobile device the identified location of the mobile device as the mobile device travels along at least part of the route from the first location to the second location.

2. The mobile device of claim 1, wherein:

the first location service is configured to:

identify the location of the mobile device along the part of the route that traverses the first interior space by sensing one or more signals from one or more beacons positioned at predetermined locations along the route in the interior of the first interior space;

identify the location of the mobile device along the part of the route that traverses the second interior space by sensing one or more signals from one or more beacons positioned at predetermined locations along the route in the interior of the second interior space; and the second location service is configured to:

identify the location of the mobile device along the part of the route that traverses the outdoor space using GPS, cellular triangulation and/or one or more WiFi hotspots.

3. The mobile device of claim 1, wherein the controller is configured to display on the display of the user interface of the mobile device a map view with at least part of the route overlaid on the map view.

4. The mobile device of claim 3, wherein the map view is an indoor map view when the mobile device is in the first interior space and/or the second interior space, and is an outdoor map view when the mobile device is in the outdoor space, wherein the indoor map view is differentiated from the outdoor map view.

5. The mobile device of claim 3, wherein the controller is further configured to overlay on the map view at least one of:
   a navigational aid that displays turn-by-turn directions as the mobile device travels along at least part of the route from the first location to the second location;
   one or more visual indicators including one or more of:
      a location of an entry into the first interior space;
      a location of an exit from the first interior space;
      a location of an entry into the second interior space;
      a location of an exit from the second interior space;
      a location of each of one or more parking lots;
      a location of each of one or more hotels;
      a location of each of one or more restaurants;
      a location of each of one or more restrooms;
      a location of each of one or more escalators;
      a location of each of one or more subway stations;
      a location of each of one or more skyway systems;
      a location of a parked vehicle; and
      an estimated time to travel along the route to the second location.

6. The mobile device of claim 1, wherein the controller is configured to:

receive via the user interface of the mobile device one or more personal settings of a user of the mobile device, wherein the one or more personal settings include special route preferences; and send the one or more personal settings via the wireless transceiver to the remote device, wherein the remote device is configured to determine the route from the first location to the second location based at least in part on one or more of the special route preferences.

7. The mobile device of claim 6, wherein the special route preferences include one or more of:
   routes that are wheelchair friendly;
   routes with elevators;
   routes with restrooms; and
   routes with restaurants.

8. The mobile device of claim 1, wherein the route is dependent on one or more of outdoor weather conditions, indoor and/or outdoor traffic, time-of-day, availability of public and/or private transportation, and known safety concerns.

9. A system for navigating from a first location to a second location using a mobile device, the system comprising:
   a server;
   a mobile device;
   the server including:
      an I/O port for communicating with the mobile device;
      a controller operatively coupled to the I/O port, the controller of the server configured to:
         determine at least part of a route from a first location to a second location, wherein the route traverses from a first outdoor space, through an entry point of and into an interior space, through an exit point of the interior space and to a second outdoor space;
   a mobile device that includes:
      a wireless transceiver for communicating with the server via the I/O port of the server;
      a location service;
      a user interface including a display;
      a controller operatively coupled to the wireless transceiver of the mobile device, the user interface, and the location service, the controller of the mobile device configured to:
         receive the route via the wireless transceiver of the mobile device;
         identify a location of the mobile device along at least part of the route that traverses the first outdoor space using the location service;
         identify the location of the mobile device along at least part of the route that traverses the interior space using the location service;
         identify the location of the mobile device along at least part of the route that traverses the second outdoor space using the location service; and
         display on the display of the user interface of the mobile device the identified location of the mobile device as the mobile device travels along at least part of the route from the first location to the second location.

10. The system of claim 9, wherein the location service of the mobile device comprises:
   a first location service for determining a location of the mobile device in the interior space; and
   a second location service for determining the location of the mobile device in the first outdoor space and the second outdoor space.

11. The system of claim 9, wherein the controller of the mobile device is configured to:

reference an outdoor mapping application when the location of the mobile device is identified as being in the first outdoor space or the second outdoor space; and reference in indoor mapping application when the location of the mobile device is identified as being in the interior space.

12. The system of claim 9, wherein the controller of the mobile device is configured to display on the display of the user interface of the mobile device a map view with at least part of the route overlaid on the map view.

13. The system of claim 12, wherein the map view is an indoor map view when the mobile device is in the interior space, and is an outdoor map view when the mobile device is in the first outdoor space or the second outdoor space, wherein the indoor map view is differentiated from the outdoor map view.

14. The system of claim 9, wherein the controller of the server is configured to:

access one or more first attributes relating to the interior space, wherein the one or more first attributes include one or more of a location of the entry point of the interior space and hours during which the entry point of the interior space is open, and determine the route from the first location to the second location based at least in part on one or more of the one or more first attributes; and/or access one or more second attributes relating to the interior space, wherein the one or more second attributes include one or more of a location of the exit point of the interior space and hours during which the exit point of the interior space is open, and determine the route from the first location to the second location based at least in part on one or more of the one or more second attributes.

15. The system of claim 9, wherein the controller of the server is configured to:

access one or more outdoor attributes relating to the first outdoor space and/or the second outdoor space, wherein the one or more outdoor attributes include one or more of weather reports, traffic reports, news reports, availability of public and/or private transportation, crowd drawing events and safety incidents; and determine the route from the first location to the second location based at least in part on one or more of the one or more outdoor attributes.

16. The system of claim 9, wherein the controller of the mobile device is configured to:

detect a beacon near a current location of the mobile device;

determine through the detected beacon a designated location within one of a plurality of known mapped interior spaces each having a corresponding indoor map;

determine that the designated location is within one of the plurality of known mapped interior spaces;

select the corresponding indoor map that includes the detected beacon;

display the selected indoor map on the display of the mobile device; and display the current location of the mobile device on the selected indoor map.

17. The system of claim 16, wherein the controller of the mobile device is configured to issue an alert via the user interface of the mobile device when a corresponding indoor map is available at their current location.

18. A non-transitory computer readable medium having stored thereon a program code for use by a mobile device connectable to a network, the program code causing the mobile device to:

receive via the network a route from a first location to a second location, wherein the route traverses from an interior of a first interior space, through an exit point of the first interior space to an outdoor space, through at least part of the outdoor space to an entry point of a second interior space, and into the second interior space;

identify a location of the mobile device along at least part of the route that traverses the first interior space;

identify the location of the mobile device along at least part of the route that traverses the outdoor space;

identify the location of the mobile device along at least part of the route that traverses the second interior space; and display on a display of mobile device the identified location of the mobile device as the mobile device travels along at least part of the route from the first location to the second location.

19. The non-transitory computer readable medium of claim 18, wherein the program code causing the mobile device to:

display on the display of the mobile device a map view with at least part of the route overlaid on the map view; and a navigational aid that displays turn-by-turn directions as the mobile device travels along at least part of the route from the first location to the second location.

20. The non-transitory computer readable medium of claim 18, wherein the program code causing the mobile device to:

using a first location service of the mobile device to identify the location of the mobile device along at least part of the route that traverses the first interior space;

using a second location service of the mobile device to identify the location of the mobile device along at least part of the route that traverses the outdoor space;

using the first location service of the mobile device to identify the location of the mobile device along at least part of the route that traverses the second interior space; and wherein the first location service uses beacons placed in the first interior space and the second interior space, and the second location service uses GPS, cellular triangulation and/or one or more WiFi hotspots.

* * * * *